US011875747B2

(12) United States Patent
Huangfu et al.

(10) Patent No.: US 11,875,747 B2
(45) Date of Patent: Jan. 16, 2024

(54) PIXEL DRIVING CIRCUIT, DRIVING METHOD FOR THE SAME, DISPLAY PANEL, AND DISPLAY APPARATUS

(71) Applicant: BOE TECHNOLOGY GROUP CO., LTD., Beijing (CN)

(72) Inventors: Lujiang Huangfu, Beijing (CN); Li Wang, Beijing (CN); Can Zheng, Beijing (CN); Tian Dong, Beijing (CN); Libin Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/793,841

(22) PCT Filed: May 17, 2021

(86) PCT No.: PCT/CN2021/094183

§ 371 (c)(1),
(2) Date: Jul. 19, 2022

(87) PCT Pub. No.: WO2021/258915

PCT Pub. Date: Dec. 30, 2021

(65) Prior Publication Data

US 2023/0042966 A1 Feb. 9, 2023

(30) Foreign Application Priority Data

Jun. 24, 2020 (CN) ......................... 202010594547.4

(51) Int. Cl.
*G09G 3/3258* (2016.01)
*G09G 3/3233* (2016.01)

(52) U.S. Cl.
CPC ......... *G09G 3/3258* (2013.01); *G09G 3/3233* (2013.01); *G09G 2300/0819* (2013.01);
(Continued)

(58) Field of Classification Search
CPC ............... G09G 3/3258; G09G 3/3233; G09G 2300/0819; G09G 2300/0852;
(Continued)

(56) References Cited

U.S. PATENT DOCUMENTS 9,406,705 B2 8/2016 Kwon et al.
9,412,303 B2 8/2016 Kim et al.
(Continued)

FOREIGN PATENT DOCUMENTS

CN 104050917 A 9/2014
CN 104751779 A 7/2015
(Continued)

OTHER PUBLICATIONS

First office Action Issued by the Chinese Patent Office for application No. 202010594547.4 dated Jan. 20, 2022.
(Continued)

*Primary Examiner* — Tom V Sheng
(74) *Attorney, Agent, or Firm* — IP & T GROUP LLP

(57) ABSTRACT

A pixel driving circuit includes: an energy storage sub-circuit, a reset sub-circuit, a compensation sub-circuit, a driving sub-circuit, and a current leakage suppression sub-circuit. The energy storage sub-circuit is coupled to a first node and a second node. The reset sub-circuit is coupled to the second node, a first scan timing signal terminal, and an initialization signal terminal. The compensation sub-circuit is coupled to the second node, a third node, and a second scan timing signal terminal. The driving sub-circuit is coupled to the second node, the third node, and a first voltage signal terminal. The current leakage suppression sub-circuit is coupled to the energy storage sub-circuit, the reset sub-circuit, and the compensation sub-circuit. The current leakage suppression sub-circuit is configured to suppress current leakage of the energy storage sub-circuit in
(Continued)

a process of generating and transmitting the driving signal by the driving sub-circuit.

19 Claims, 30 Drawing Sheets

(52) U.S. Cl.
CPC ............... *G09G 2300/0852* (2013.01); *G09G 2310/0251* (2013.01); *G09G 2310/0262* (2013.01); *G09G 2310/061* (2013.01); *G09G 2320/0214* (2013.01); *G09G 2320/0233* (2013.01); *G09G 2320/0238* (2013.01); *G09G 2320/0247* (2013.01); *G09G 2320/043* (2013.01)

(58) Field of Classification Search
CPC ... G09G 2310/0251; G09G 2310/0262; G09G 2310/061; G09G 2320/0214; G09G 2320/0233; G09G 2320/0238; G09G 2320/0247; G09G 2320/043
USPC .......................................................... 345/204
See application file for complete search history.

(56) References Cited

U.S. PATENT DOCUMENTS

| | | | | |
|---|---|---|---|---|
| 10,339,855 | B2 | 7/2019 | Lin et al. | |
| 10,453,392 | B2 | 10/2019 | Xu | |
| 2006/0145960 | A1* | 7/2006 | Koga | G09G 3/3233 345/76 |
| 2007/0109232 | A1* | 5/2007 | Yamamoto | G09G 3/3233 345/77 |
| 2011/0157126 | A1 | 6/2011 | Chung et al. | |
| 2011/0157144 | A1 | 6/2011 | Park et al. | |
| 2012/0019504 | A1 | 1/2012 | Han et al. | |
| 2012/0038683 | A1 | 2/2012 | Park et al. | |
| 2012/0188150 | A1* | 7/2012 | Shirouzu | G09G 3/3233 345/76 |
| 2014/0320544 | A1 | 10/2014 | Kim | |
| 2014/0347405 | A1* | 11/2014 | Kumeta | G09G 3/3233 345/82 |
| 2015/0243720 | A1* | 8/2015 | Kwon | H01L 27/1251 257/40 |
| 2016/0217741 | A1 | 7/2016 | Tseng et al. | |
| 2016/0267843 | A1 | 9/2016 | Wang et al. | |
| 2016/0275866 | A1 | 9/2016 | Liu et al. | |
| 2016/0351124 | A1* | 12/2016 | Kim | G09G 3/3241 |
| 2018/0033370 | A1* | 2/2018 | Zheng | G09G 3/3233 |
| 2018/0130410 | A1 | 5/2018 | Gao et al. | |
| 2018/0151118 | A1* | 5/2018 | Chung | G09G 3/3233 |
| 2018/0151650 | A1* | 5/2018 | Ha | H01L 29/78645 |
| 2019/0035863 | A1 | 1/2019 | Choi et al. | |
| 2019/0057648 | A1* | 2/2019 | Xu | G09G 3/3275 |
| 2019/0096336 | A1 | 3/2019 | Lee | |
| 2019/0114954 | A1 | 4/2019 | Xuan et al. | |
| 2019/0259822 | A1 | 8/2019 | Jeon et al. | |
| 2020/0234633 | A1* | 7/2020 | Wang | G09G 3/325 |
| 2020/0258452 | A1 | 8/2020 | Feng et al. | |
| 2020/0302859 | A1 | 9/2020 | Wang et al. | |
| 2021/0005143 | A1 | 1/2021 | Xuan et al. | |
| 2021/0312866 | A1* | 10/2021 | Fan | G09G 3/3233 |
| 2021/0335243 | A1* | 10/2021 | Ohara | G09G 3/3266 |
| 2021/0376041 | A1* | 12/2021 | Lee | H10K 59/131 |

FOREIGN PATENT DOCUMENTS

| | | | |
|---|---|---|---|
| CN | 105336292 | A | 2/2016 |
| CN | 106875893 | A | 6/2017 |
| CN | 106875894 | A | 6/2017 |
| CN | 106935198 | A | 7/2017 |
| CN | 107204173 | A | 9/2017 |
| CN | 107274830 | A | 10/2017 |
| CN | 107527590 | A | 12/2017 |
| CN | 107564478 | A | 1/2018 |
| CN | 105206221 | B | 6/2018 |
| CN | 108682392 | A | 10/2018 |
| CN | 108847186 | A | 11/2018 |
| CN | 106875893 | B | 3/2019 |
| CN | 109584791 | A | 4/2019 |
| CN | 111179859 | A | 5/2020 |
| CN | 111627387 | A | 9/2020 |

OTHER PUBLICATIONS

Hyun-Sang Park et al., A New Thin-Film Transistor Pixel Structure Suppressing the Leakage Current Effects on AMOLED, IEEE Electron Device Letters, vol. 30, No. 3, Mar. 2009.
Michael S. Shur et al., Analytical models for amorphous-silicon and polysilicon thin-film transistors for high-definition-display technology, Journal of SID, 1995, pp. 223-236.
Jerry G. Fossum et al., Anomalous Leakage Current in LPCVD Polysilicon MOSFET's, IEEE Transactions on Electron Devices, vol. ED-32, No. 9, Sep. 1985, pp. 1878-1884.
Huang-Fu Lu-Jiang et al., LTPS-TFT threshold voltage compensation pixel circuit for AMOLED, Chinese Journal of Liquid Crystals and Displays, vol. 32, No. 8, Aug. 2017, Beijing, China.

* cited by examiner

PIXEL DRIVING CIRCUIT, DRIVING METHOD FOR THE SAME, DISPLAY PANEL, AND DISPLAY APPARATUS

CROSS-REFERENCE TO RELATED APPLICATIONS

The present disclosure is a national phase entry under 35 USC 371 of International Patent Application No. PCT/CN2021/094183, filed on May 17, 2021, which claims priority to Chinese Patent Application No. 202010594547.4, filed on Jun. 24, 2020, which are incorporated herein by reference in their entirety.

TECHNICAL FIELD

The present disclosure relates to the field of display technologies, and in particular, to a pixel driving circuit and a driving method for the same, a display panel and a display apparatus.

BACKGROUND

At present, organic light-emitting diode (OLED) display apparatuses have been widely used due to their characteristics of self-luminescence, fast response, wide viewing angle, being capable of being manufactured on flexible substrates and so on. The OLED display apparatus include a plurality of sub-pixels, each sub-pixel includes a pixel driving circuit and a light-emitting device, and the light-emitting device is driven to emit light by the pixel driving circuit to achieve display.

SUMMARY

In an aspect, a pixel driving circuit is provided. The pixel driving circuit includes an energy storage sub-circuit, a reset sub-circuit, a compensation sub-circuit, a driving sub-circuit and a current leakage suppression sub-circuit. The energy storage sub-circuit is coupled to a first node and a second node; the reset sub-circuit is coupled to the second node, a first scan timing signal terminal and an initial signal terminal; the compensation sub-circuit is coupled to the second node, a third node and a second scan timing signal terminal; the driving sub-circuit is coupled to the second node, the third node and a first voltage signal terminal; the current leakage suppression sub-circuit is coupled to the energy storage sub-circuit, the reset sub-circuit and the compensation sub-circuit.

The reset sub-circuit is configured to transmit, in response to a first scan timing signal received at the first scan timing signal terminal, an initial signal received at the initial signal terminal to the second node to reset the second node. The compensation sub-circuit is configured to cause the driving sub-circuit to be in a self-saturation state in response to a second scan timing signal received at the second scan timing signal terminal.

The driving sub-circuit is configured to: be in the self-saturation state due to at least an action of the compensation sub-circuit; generate a compensation signal according to a first voltage signal received at the first voltage signal terminal; and transmit the compensation signal to the second node. The energy storage sub-circuit is configured to: be charged due to actions of voltages of the first node and the second node; couple the voltage of the second node according to the voltage of the first node; and maintain a coupled voltage of the second node. The driving sub-circuit is further configured to: generate a driving signal due to a coupling action of the energy storage sub-circuit; and transmit the driving signal to the third node.

The current leakage suppression sub-circuit is configured to suppress current leakage of the energy storage sub-circuit in a process of generating and transmitting the driving signal by the driving sub-circuit.

In some embodiments, the pixel driving circuit further includes: a reference voltage sub-circuit, a data writing sub-circuit and a light-emitting control sub-circuit. The reference voltage sub-circuit is coupled to the first node, the first scan timing signal terminal and a reference voltage signal terminal, or the reference voltage sub-circuit is coupled to the first node, the second scan timing signal terminal and the reference voltage signal terminal; the reference voltage sub-circuit is configured to transmit a reference voltage signal received at the reference voltage signal terminal to the first node in response to the first scan timing signal or the second scan timing signal.

The data writing sub-circuit is coupled to the first node, the second scan timing signal terminal and a data signal terminal; the data writing sub-circuit is configured to transmit a data signal received at the data signal terminal to the first node in response to the second scan timing signal. The light-emitting control sub-circuit is coupled to the third node and a light-emitting timing signal terminal, and is configure to be coupled to a light-emitting device; the light-emitting control sub-circuit is configured to transmit the driving signal from the driving sub-circuit to the light-emitting device in response to a light-emitting timing signal received at the light-emitting timing signal terminal, so as to drive the light-emitting device to emit light.

In some embodiments, the current leakage suppression sub-circuit is coupled to the second node, so that the current leakage suppression sub-circuit is coupled to the energy storage sub-circuit through the second node. The current leakage suppression sub-circuit is further coupled to a fourth node and the light-emitting timing signal terminal. The compensation sub-circuit is coupled to the fourth node, so that the compensation sub-circuit is coupled to the second node through the fourth node and the current leakage suppression sub-circuit. The reset sub-circuit is coupled to the fourth node, so that the reset sub-circuit is coupled to the second node through the fourth node and the current leakage suppression sub-circuit. The current leakage suppression sub-circuit is configured to be turned off under control of the light-emitting timing signal to suppress the current leakage of the energy storage sub-circuit; and is further configured to: transmit the initial signal from the reset sub-circuit to the second node in response to the light-emitting timing signal; be turned on under control of the light-emitting timing signal; and cause the driving sub-circuit to be in the self-saturation state due to a combined action of the current leakage suppression sub-circuit and the compensation sub-circuit that is in an on state.

In some embodiments, the reset sub-circuit, the compensation sub-circuit, the driving sub-circuit and the current leakage suppression sub-circuit each include at least one transistor. Transistors included in the reset sub-circuit, the compensation sub-circuit and the driving sub-circuit are low temperature poly-silicon thin film transistors. A transistor included in the current leakage suppression sub-circuit is an oxide-thin film transistor or an amorphous silicon thin film transistor. On/off types of the transistors included in the reset sub-circuit, the compensation sub-circuit and the driving sub-circuit are each opposite to an on/off type of the transistor included in the current leakage suppression sub-circuit.

In some embodiments, the current leakage suppression sub-circuit includes a first transistor. A control electrode of the first transistor is coupled to the light-emitting timing signal terminal, a first electrode of the first transistor is coupled to the fourth node, and a second electrode of the first transistor is coupled to the second node.

In some embodiments, the pixel driving circuit further includes an accessory current leakage suppression sub-circuit. The accessory current leakage suppression sub-circuit is coupled to the first node and the fourth node; the accessory current leakage suppression sub-circuit is configured to: be charged due to actions of voltages of the first node and the fourth node; couple, according to the voltage of the first node, the voltage of the fourth node to keep the voltage of the fourth node equal to the voltage of the second node; and maintain a coupled voltage of the fourth node to suppress an current leakage of the second node.

In some embodiments, the accessory current leakage suppression sub-circuit includes a first capacitor; a first terminal of the first capacitor is coupled to the first node, and a second terminal of the first capacitor is coupled to the fourth node.

In some embodiments, the current leakage suppression sub-circuit is coupled to the first node, so that the current leakage suppression sub-circuit is coupled to the energy storage sub-circuit through the first node. The reset sub-circuit and the compensation sub-circuit are both directly coupled to the second node. The current leakage suppression sub-circuit, the compensation sub-circuit and the reset sub-circuit are further coupled to a fifth node. The current leakage suppression sub-circuit is configured to: be charged due to actions of voltages of the first node and the fifth node; couple, according to the voltage of the first node, the voltage of the fifth node to keep the voltage of the fifth node equal to the voltage of the second node; and maintain a coupled voltage of the fifth node to suppress an current leakage of the second node.

In some embodiments, the current leakage suppression sub-circuit includes a second capacitor; a first terminal of the second capacitor is coupled to the first node, and a second terminal of the second capacitor is coupled to the fifth node.

In some embodiments, the current leakage suppression sub-circuit is coupled to the second node, so that the current leakage suppression sub-circuit is coupled to the energy storage sub-circuit through the second node. The reset sub-circuit and the compensation sub-circuit are both directly coupled to the second node. The current leakage suppression sub-circuit, the compensation sub-circuit and the reset sub-circuit are further coupled to a sixth node. The current leakage suppression sub-circuit is further coupled to a third scan timing signal terminal and a constant voltage signal terminal; the constant voltage signal terminal is configured to provide a constant voltage signal. The current leakage suppression sub-circuit is configured to: be charged due to actions of voltages of the sixth node and a constant voltage signal from the constant voltage signal terminal; and keep the voltage of the sixth node equal to the voltage of the second node in response to a third scanning timing signal received at the third scanning timing signal terminal, so as to suppress current leakage of the second node.

In some embodiments, the current leakage suppression sub-circuit includes a third capacitor and a second transistor. A first terminal of the third capacitor is coupled to the constant voltage signal terminal, and a second terminal of the third capacitor is coupled to the sixth node. A control electrode of the second transistor is coupled to the third scan timing signal terminal, a first electrode of the second transistor is coupled to the second node, and a second electrode of the second transistor is coupled to the sixth node.

In some embodiments, the reset sub-circuit includes a third transistor and a fourth transistor connected in series. A control electrode of the third transistor is coupled to the first scan timing signal terminal, a first electrode of the third transistor is coupled to the initial signal terminal, a second electrode of the third transistor is coupled to a first electrode of the fourth transistor, a control electrode of the fourth transistor is coupled to the first scan timing signal terminal, and a second electrode of the fourth transistor is coupled to the second node. The compensation sub-circuit includes a fifth transistor and a sixth transistor connected in series. A control electrode of the fifth transistor is coupled to the second scan timing signal terminal, a first electrode of the fifth transistor is coupled to the third node, a second electrode of the fifth transistor is coupled to a first electrode of the sixth transistor, a control electrode of the sixth transistor is coupled to the second scan timing signal terminal, and a second electrode of the sixth transistor is coupled to the second node.

In some embodiments, the current leakage suppression sub-circuit is further coupled to the second node and the light-emitting timing signal terminal, and the current leakage suppression sub-circuit, the compensation sub-circuit and the reset sub-circuit are all coupled to the fourth node, the second electrode of the fourth transistor is coupled to the fourth node, so that the fourth transistor is coupled to the second node via the fourth node and the current leakage suppression sub-circuit; the second electrode of the sixth transistor is coupled to the fourth node, so that the sixth transistor is coupled to the second node via the fourth node and the current leakage suppression sub-circuit. Alternatively, the current leakage suppression sub-circuit is coupled to the first node, the reset sub-circuit and the compensation sub-circuit are both directly coupled to the second node, and the current leakage suppression sub-circuit, the compensation sub-circuit and the reset sub-circuit are all coupled to a fifth node; the first electrode of the fourth transistor is further coupled to the fifth node; the first electrode of the sixth transistor is further coupled to the fifth node.

Alternatively, current leakage suppression sub-circuit is coupled to the second node, a third scan timing signal terminal and a constant voltage signal terminal, the reset sub-circuit and the compensation sub-circuit are both directly coupled to the second node, and the current leakage suppression sub-circuit, the compensation sub-circuit and the reset sub-circuit are further coupled to a sixth node; the first electrode of the fourth transistor is further coupled to the sixth node; the first electrode of the sixth transistor is further coupled to the sixth node.

In some embodiments, in a case where the reference voltage sub-circuit is coupled to the first scan timing signal terminal, the reference voltage sub-circuit is further coupled to the light-emitting timing signal terminal. The reference voltage sub-circuit is further configured to transmit the reference voltage signal to the first node in response to the light-emitting timing signal. The reference voltage sub-circuit includes a ninth transistor and a tenth transistor; a control electrode of the ninth transistor is coupled to the first scan timing signal terminal, a first electrode of the ninth transistor is coupled to the reference voltage signal terminal, and a second electrode of the ninth transistor is coupled to the first node; a control electrode of the tenth transistor is coupled to the light-emitting timing signal terminal, a first electrode of the tenth transistor is coupled to the reference voltage signal terminal, and a second electrode of the tenth transistor is coupled to the first node.

In a case where the reference voltage sub-circuit is coupled to the second scan timing signal terminal, the reference voltage sub-circuit includes an eleventh transistor; a control electrode of the eleventh transistor is coupled to the second scan timing signal terminal, a first electrode of the eleventh transistor is coupled to the reference voltage signal terminal, and a second electrode of the eleventh transistor is coupled to the first node. The reset sub-circuit, the compensation sub-circuit, the driving sub-circuit, the data writing sub-circuit and the light-emitting control sub-circuit each include at least one transistor. On/off types of transistors included in the reset sub-circuit, the compensation sub-circuit, the driving sub-circuit, the data writing sub-circuit and the light-emitting control sub-circuit are each opposite to an on/off type of the eleventh transistor.

In some embodiments, the energy storage sub-circuit includes a fourth capacitor; a first terminal of the fourth capacitor is coupled to the first node, and a second terminal of the fourth capacitor is coupled to the second node.

The driving sub-circuit includes a twelfth transistor; a control electrode of the twelfth transistor is coupled to the second node, a first electrode of the twelfth transistor is coupled to the first voltage signal terminal, and a second electrode of the twelfth transistor is coupled to the third node.

In some embodiments, the pixel driving circuit further includes: a reference voltage sub-circuit, a data writing sub-circuit, a light-emitting control sub-circuit and an accessory current leakage suppression sub-circuit. The current leakage suppression sub-circuit includes a first transistor, the first transistor is an oxide-thin film transistor or an amorphous silicon thin film transistor; the energy storage sub-circuit includes a fourth capacitor; the driving sub-circuit includes a twelfth transistor; the data writing sub-circuit includes a thirteenth transistor; the light-emitting control sub-circuit includes a fourteenth transistor; the reset sub-circuit includes a third transistor and a fourth transistor connected in series, or the reset sub-circuit includes a seventh transistor; the compensation sub-circuit includes a fifth transistor and a sixth transistor connected in series, or the compensation sub-circuit includes an eighth transistor; the reference voltage sub-circuit includes a ninth transistor and a tenth transistor, or the reference voltage sub-circuit includes an eleventh transistor; the accessory current leakage suppression sub-circuit includes a first capacitor.

A control electrode of the first transistor is coupled to the light-emitting timing signal terminal, a first electrode of the first transistor is coupled to a fourth node, and a second electrode of the first transistor is coupled to the second node. A first terminal of the fourth capacitor is coupled to the first node, and a second terminal of the fourth capacitor is coupled to the second node.

A control electrode of the twelfth transistor is coupled to the second node, a first electrode of the twelfth transistor is coupled to the first voltage signal terminal, and a second electrode of the twelfth transistor is coupled to the third node. A control electrode of the thirteenth transistor is coupled to the second scan timing signal terminal, a first electrode of the thirteenth transistor is coupled to a data signal terminal, and a second electrode of the thirteenth transistor is coupled to the first node. A control electrode of the fourteenth transistor is coupled to the light-emitting timing signal terminal, a first electrode of the fourteenth transistor is coupled to the third node, and a second electrode of the fourteenth transistor is configured to be coupled to a light-emitting device.

In a case where the reset sub-circuit includes the third transistor and the fourth transistor connected in series, a control electrode of the third transistor is coupled to the first scan timing signal terminal, a first electrode of the third transistor is coupled to the initial signal terminal, a second electrode of the third transistor is coupled to a first electrode of the fourth transistor, a control electrode of the fourth transistor is coupled to the first scan timing signal terminal, and a second electrode of the fourth transistor is coupled to the fourth node. In a case where the reset sub-circuit includes the seventh transistor; a control electrode of the seventh transistor is coupled to the first scan timing signal terminal, a first electrode of the seventh transistor is coupled to the initial signal terminal, and a second electrode of the seventh transistor is coupled to the fourth node.

In a case where the compensation sub-circuit includes the fifth transistor and the sixth transistor connected in series, a control electrode of the fifth transistor is coupled to the second scan timing signal terminal, a first electrode of the fifth transistor is coupled to the third node, a second electrode of the fifth transistor is coupled to a first electrode of the sixth transistor, a control electrode of the sixth transistor is coupled to the second scan timing signal terminal, and a second electrode of the sixth transistor is coupled to the fourth node. In a case where the compensation sub-circuit includes the eighth transistor, a control electrode of the eighth transistor is coupled to the second scan timing signal terminal, a first electrode of the eighth transistor is coupled to the third node, and a second electrode of the eighth transistor is coupled to the fourth node.

In a case where the reference voltage sub-circuit includes the ninth transistor and the tenth transistor, a control electrode of the ninth transistor is coupled to the first scan timing signal terminal, a first electrode of the ninth transistor is coupled to a reference voltage signal terminal, and a second electrode of the ninth transistor is coupled to the first node; a control electrode of the tenth transistor is coupled to the light-emitting timing signal terminal, a first electrode of the tenth transistor is coupled to the reference voltage signal terminal, and a second electrode of the tenth transistor is coupled to the first node. In a case where the reference voltage sub-circuit includes the eleventh transistor, a control electrode of the eleventh transistor is coupled to the first scan timing signal terminal, a first electrode of the eleventh transistor is coupled to the reference voltage signal terminal, and a second electrode of the eleventh transistor is coupled to the first node; an on/off type of the eleventh transistor is the same as an on/off type of the first transistor, and the on/off type of the first transistor is opposite to on/off types of transistors except the first transistor and the eleventh transistor in the pixel driving circuit. A first terminal of the first capacitor is coupled to the first node, and a second terminal of the first capacitor is coupled to the fourth node.

In some embodiments, the pixel driving circuit further includes: a reference voltage sub-circuit, a data writing sub-circuit and a light-emitting control sub-circuit. The current leakage suppression sub-circuit includes a second capacitor; the energy storage sub-circuit includes a fourth capacitor; the driving sub-circuit includes a twelfth transistor; the data writing sub-circuit includes a thirteenth transistor; the light-emitting control sub-circuit includes a fourteenth transistor; the reset sub-circuit includes a third transistor and a fourth transistor connected in series; the compensation sub-circuit includes a fifth transistor and a sixth transistor connected in series; the reference voltage sub-circuit includes the ninth transistor and the tenth transistor, or the reference voltage sub-circuit includes an eleventh transistor.

A first terminal of the second capacitor is coupled to the first node, and a second terminal of the second capacitor is coupled to a fifth node. A first terminal of the fourth capacitor is coupled to the first node, and a second terminal of the fourth capacitor is coupled to the second node.

A control electrode of the twelfth transistor is coupled to the second node, a first electrode of the twelfth transistor is coupled to the first voltage signal terminal, and a second electrode of the twelfth transistor is coupled to the third node. A control electrode of the thirteenth transistor is coupled to the second scan timing signal terminal, a first electrode of the thirteenth transistor is coupled to a data signal terminal, and a second electrode of the thirteenth transistor is coupled to the first node. A control electrode of the fourteenth transistor is coupled to a light-emitting timing signal terminal, a first electrode of the fourteenth transistor is coupled to the third node, and a second electrode of the fourteenth transistor is configured to be coupled to the light-emitting device.

A control electrode of the third transistor is coupled to the first scan timing signal terminal, a first electrode of the third transistor is coupled to the initial signal terminal, a second electrode of the third transistor is coupled to a first electrode of the fourth transistor, a control electrode of the fourth transistor is coupled to the first scan timing signal terminal, and a second electrode of the fourth transistor is coupled to the second node; the first electrode of the fourth transistor is further coupled to the fifth node. A control electrode of the fifth transistor is coupled to the second scan timing signal terminal, a first electrode of the fifth transistor is coupled to the third node, a second electrode of the fifth transistor is coupled to a first electrode of the sixth transistor, a control electrode of the sixth transistor is coupled to the second scan timing signal terminal, and a second electrode of the sixth transistor is coupled to the second node; the first electrode of the sixth transistor is further coupled to the fifth node.

In a case where the reference voltage sub-circuit includes the ninth transistor and the tenth transistor, a control electrode of the ninth transistor is coupled to the first scan timing signal terminal, a first electrode of the ninth transistor is coupled to a reference voltage signal terminal, and a second electrode of the ninth transistor is coupled to the first node; a control electrode of the tenth transistor is coupled to the light-emitting timing signal terminal, a first electrode of the tenth transistor is coupled to the reference voltage signal terminal, and a second electrode of the tenth transistor is coupled to the first node. In a case where the reference voltage sub-circuit includes the eleventh transistor, a control electrode of the eleventh transistor is coupled to the second scan timing signal terminal, a first electrode of the eleventh transistor is coupled to the reference voltage signal terminal, and a second electrode of the eleventh transistor is coupled to the first node; an on/off type of the eleventh transistor is opposite to on/off types of transistors except the eleventh transistor in the pixel driving circuit.

In some embodiments, the pixel driving circuit further includes: a reference voltage sub-circuit, a data writing sub-circuit and a light-emitting control sub-circuit. The current leakage suppression sub-circuit includes a third capacitor and a second transistor; the energy storage sub-circuit includes a fourth capacitor; the driving sub-circuit includes a twelfth transistor; the data writing sub-circuit includes a thirteenth transistor; the light-emitting control sub-circuit includes a fourteenth transistor; the reset sub-circuit includes a third transistor and a fourth transistor connected in series; the compensation sub-circuit includes a fifth transistor and a sixth transistor connected in series; the reference voltage sub-circuit includes a ninth transistor and a tenth transistor, or the reference voltage sub-circuit includes an eleventh transistor.

A first terminal of the third capacitor is coupled to a constant voltage signal terminal, and a second terminal of the third capacitor is coupled to a sixth node. A control electrode of the second transistor is coupled to a third scan timing signal terminal, a first electrode of the second transistor is coupled to the second node, and a second electrode of the second transistor is coupled to the sixth node. A first terminal of the fourth capacitor is coupled to the first node, and a second terminal of the fourth capacitor is coupled to the second node.

A control electrode of the twelfth transistor is coupled to the second node, a first electrode of the twelfth transistor is coupled to the first voltage signal terminal, and a second electrode of the twelfth transistor is coupled to the third node. A control electrode of the thirteenth transistor is coupled to the second scan timing signal terminal, a first electrode of the thirteenth transistor is coupled to a data signal terminal, and a second electrode of the thirteenth transistor is coupled to the first node. A control electrode of the fourteenth transistor is coupled to a light-emitting timing signal terminal, a first electrode of the fourteenth transistor is coupled to the third node, and a second electrode of the fourteenth transistor is configure to be coupled to a light-emitting device.

A control electrode of the third transistor is coupled to the first scan timing signal terminal, a first electrode of the third transistor is coupled to the initial signal terminal, a second electrode of the third transistor is coupled to a first electrode of the fourth transistor, a control electrode of the fourth transistor is coupled to the first scan timing signal terminal, and a second electrode of the fourth transistor is coupled to the second node; the first electrode of the fourth transistor is further coupled to the sixth node. A control electrode of the fifth transistor is coupled to the second scan timing signal terminal, a first electrode of the fifth transistor is coupled to the third node, a second electrode of the fifth transistor is coupled to a first electrode of the sixth transistor, a control electrode of the sixth transistor is coupled to the second scan timing signal terminal, and a second electrode of the sixth transistor is coupled to the second node; the first electrode of the sixth transistor is further coupled to the sixth node.

In a case where the reference voltage sub-circuit includes the ninth transistor and the tenth transistor, a control electrode of the ninth transistor is coupled to the first scan timing signal terminal, a first electrode of the ninth transistor is coupled to a reference voltage signal terminal, and a second electrode of the ninth transistor is coupled to the first node; a control electrode of the tenth transistor is coupled to the light-emitting timing signal terminal, a first electrode of the tenth transistor is coupled to the reference voltage signal terminal, and a second electrode of the tenth transistor is coupled to the first node. In a case where the reference voltage sub-circuit includes the eleventh transistor, a control electrode of the eleventh transistor is coupled to the second scan timing signal terminal, a first electrode of the eleventh transistor is coupled to the reference voltage signal terminal, and a second electrode of the eleventh transistor is coupled to the first node; an on/off type of the eleventh transistor is opposite to on/off types of transistors except the eleventh transistor in the pixel driving circuit.

In another aspect, a pixel driving method applied to the pixel driving circuit as described above is provided. The pixel driving circuit includes the energy storage sub-circuit, the reset sub-circuit, the compensation sub-circuit, a light-emitting control sub-circuit, the driving sub-circuit, a data writing sub-circuit, a reference voltage sub-circuit and the current leakage suppression sub-circuit; the data writing sub-circuit is coupled to the first node, the second scan timing signal terminal and a data signal terminal; the light-emitting control sub-circuit is coupled to the third node and a light-emitting timing signal terminal and is configure to be coupled to a light-emitting device; the reference voltage sub-circuit is coupled to the first node, the first scan timing signal terminal and a reference voltage signal terminal, or the reference voltage sub-circuit is coupled to the first node, the second scan timing signal terminal and the reference voltage signal terminal.

The pixel driving method includes a frame period including a reset phase, an input and compensation phase and a light-emitting phase.

In the reset phase: the reference voltage sub-circuit transmits a reference voltage signal received at the reference voltage signal terminal to the first node in response to the first scan timing signal received at the first scan timing signal terminal or the second scan timing signal received at the second scan timing signal terminal; and the reset sub-circuit transmits, in response to the first scan timing signal, the initial signal received at the initial signal terminal to the second node to reset the second node.

In the input and compensation phase: the data writing sub-circuit transmits a data signal received at the data signal terminal to the first node in response to the second scan timing signal; the compensation sub-circuit causes the driving sub-circuit to be in the self-saturation state under control of the second scan timing signal; the driving sub-circuit is in the self-saturation state due to at least the action of the compensation sub-circuit, generates the compensation signal according to the first voltage signal received at the first voltage signal terminal, and transmits the compensation signal to the second node; and the energy storage sub-circuit is charged due to the actions of the voltages of the first node and the second node.

In the light-emitting phase: the reference voltage sub-circuit transmits the reference voltage signal to the first node; the energy storage sub-circuit couples the voltage of the second node according to the voltage of the first node, and maintains the coupled voltage of the second node; the driving sub-circuit generates the driving signal due to the coupling action of the energy storage sub-circuit, and transmits the driving signal to the third node; the light-emitting control sub-circuit transmits the driving signal from the driving sub-circuit to the light-emitting device in response to a light-emitting timing signal, so as to drive the light-emitting device to emit light; and the current leakage suppression sub-circuit suppresses the current leakage of the energy storage sub-circuit.

In yet another aspect, a display panel including a plurality of pixel driving circuits as described above is provided.

In yet another aspect, a display apparatus including the display panel as described above is provided.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

FIG. 60 is a circuit diagram of yet another pixel driving circuit, in accordance with some embodiments;

FIG. 1C is a circuit diagram of yet another pixel driving circuit, in accordance with some embodiments;

DETAILED DESCRIPTION

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" and "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features Thus, a feature defined with the term such as "first" or "second" may explicitly or implicitly include one or more of the features. In the description of the embodiments of the present disclosure, the term "a plurality of/the plurality of" means two or more unless otherwise specified.

In the description of some embodiments, the terms such as "coupled" and "connected" and their extensions may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. The term "coupled" or "communicatively coupled", however, may also mean that two or more components are not in direct contact with each other, but still cooperate or interact with each other. The embodiments disclosed herein are not necessarily limited to the content herein.

The use of "applied to" or "configured to" herein means an open and inclusive expression, which does not exclude devices that are applicable to or configured to perform additional tasks or steps.

Figure 1:
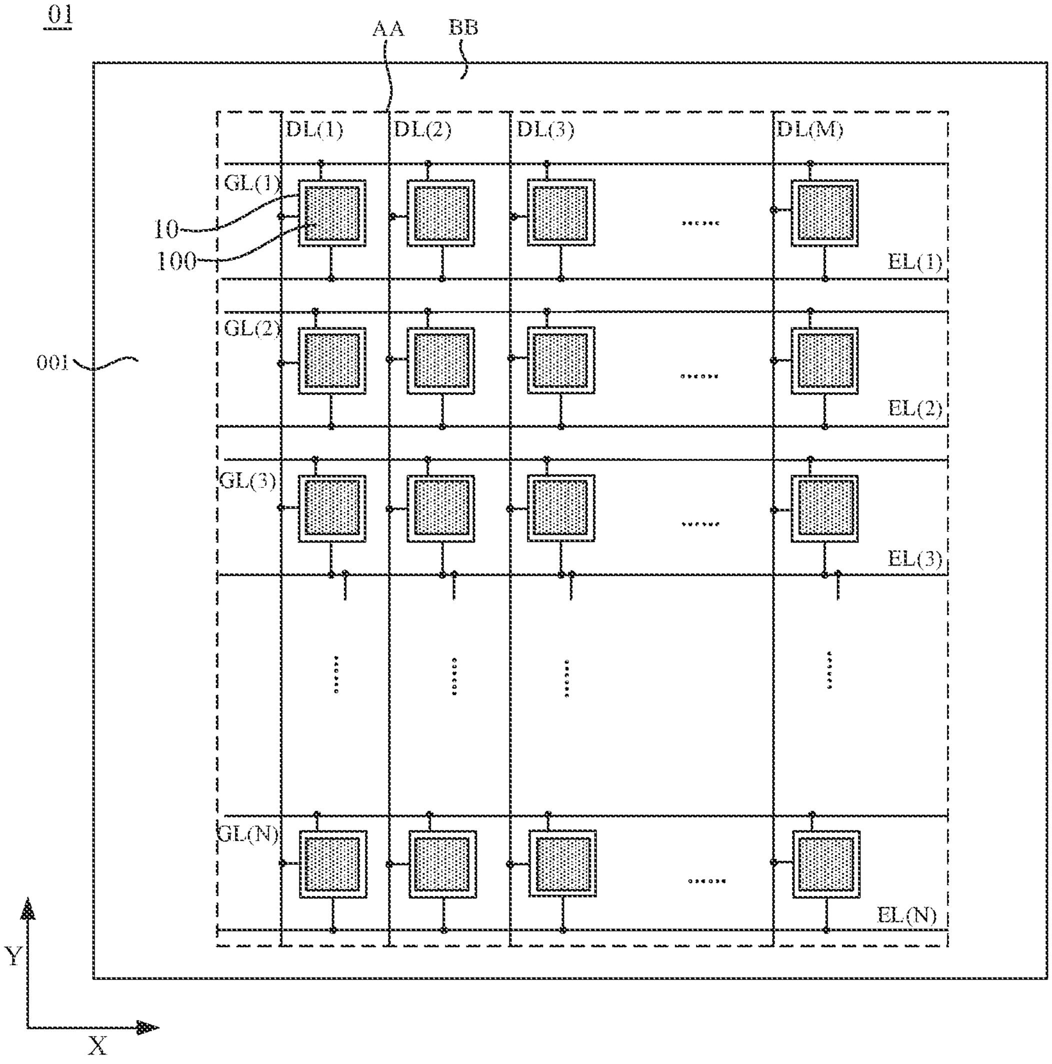
FIG. 1 is a structural diagram of a display panel, in accordance with some embodiments.

In a display apparatus, the display apparatus includes a display panel 01, as shown in FIG. 1, the display panel 01 includes an active area AA (also referred to as effective display area) and a peripheral area BB located on at least one side of the active area AA.

The active area AA is provided with a plurality of sub-pixels 10, a plurality of scanning timing signal lines GL and a plurality of light-emitting timing signal lines EL that are extending in a horizontal direction X, and a plurality of data signal lines DL extending in a vertical direction Y therein. For convenience of description, the embodiments of the present disclosure are described by taking an example in which the plurality of sub-pixels 10 are arranged in a matrix form. For example, the plurality of sub-pixels 10 are arranged in N rows and M columns. In this case, sub-pixels 10 arranged in a line in the horizontal direction X are referred to as a row of sub-pixels, and sub-pixels 10 arranged in a line in the vertical direction Y are referred to as a column of sub-pixels; a row of sub-pixels may be coupled to one or two scanning timing signal lines GL, a row of sub-pixels may further be coupled to one or two light-emitting timing signal lines EL, and a column of sub-pixels may be coupled to a data signal line DL. The sub-pixel 10 is provided with a pixel driving circuit 100 used to control the sub-pixel 10 to display therein, and the pixel driving circuit 100 is disposed on a base substrate 001 of the display panel 01.

The display panel 01 may be an organic light-emitting diode (OLED) display panel, a quantum dot light-emitting diodes (QLED) display panel or the like, which is not specifically limited in the present disclosure.

The following embodiments of the present disclosure are all described by taking an example in which the display panel 01 is the organic light-emitting diode display panel.

For example, the pixel driving circuit 100 generally includes components such as a switching transistor, a driving transistor and a storage capacitor. Opposite terminals of the storage capacitor are a reference voltage terminal and a signal holding terminal, respectively, and the signal holding terminal of the storage capacitor is coupled to a control electrode (a gate) of the driving transistor.

In a process of driving the pixel driving circuit 100, in a light-emitting phase, the storage capacitor is used to hold a voltage signal so that a potential of the signal holding terminal thereof is kept constant, and a voltage is generated between the gate and a source of the driving transistor, and in turn, the driving transistor is controlled to generate a driving current so as to drive a light-emitting diode to emit light. In this process, since there is a current leakage path at a node where the signal holding terminal of the storage capacitor is coupled to the control electrode of the driving transistor, and the node will leak currents through the current leakage path, the potential of the signal holding terminal of the storage capacitor may not be kept constant for a long time, so that the driving current generated by the driving transistor is unstable. As a result, luminance of the light-emitting device is affected, and in turn, a display effect of the display apparatus is affected.

Figure 2A:
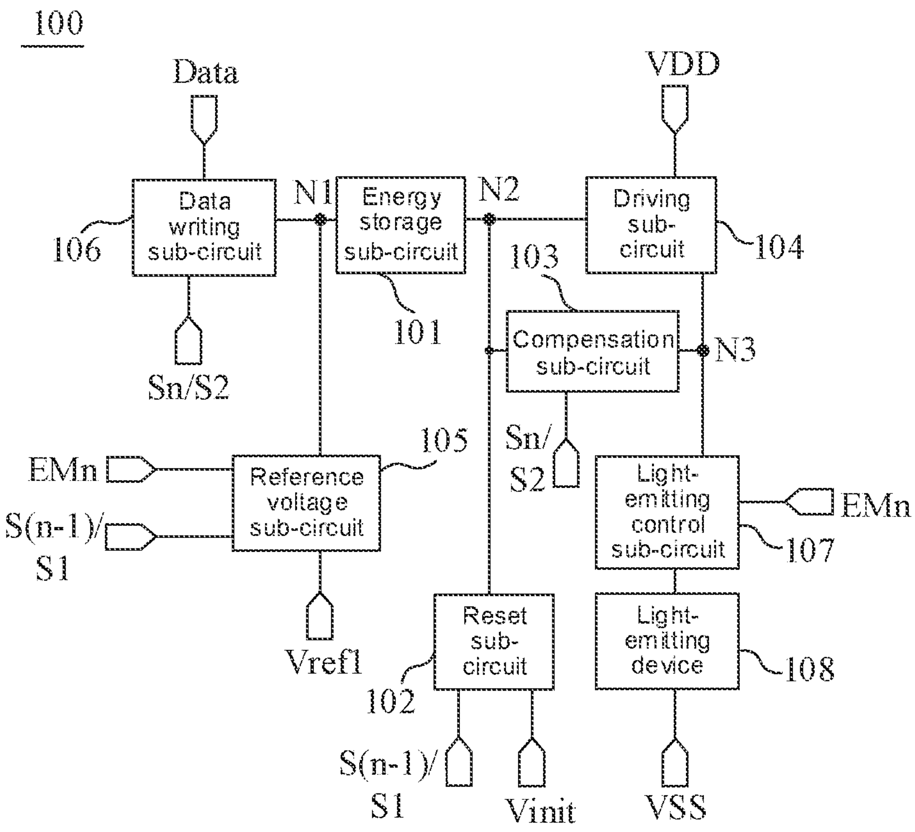
FIG. 2A is a structural diagram of a pixel driving circuit, in accordance with some examples.

As shown in FIG. 2A, some examples provide a pixel driving circuit 100. The pixel driving circuit 100 includes an energy storage sub-circuit 101, a reset sub-circuit 102, a compensation sub-circuit 103, a driving sub-circuit 104, a reference voltage sub-circuit 105, a data writing sub-circuit 106 and a light-emitting control sub-circuit 107.

The energy storage sub-circuit 101 is coupled to a first node N1 and a second node N2. The reset sub-circuit 102 is coupled to the second node N2, a first scan timing signal terminal S1 and an initial signal terminal Vinit. The compensation sub-circuit 103 is coupled to the second node N2, a third node N3 and a second scan timing signal terminal S2. The driving sub-circuit 104 is coupled to the second node N2, the third node N3 and a first voltage signal terminal VDD.

The reference voltage sub-circuit 105 is coupled to the first node N1, the first scan timing signal terminal S1 and a reference voltage signal terminal Vref1, or the reference voltage sub-circuit 105 is coupled to the first node N1, the second scan timing signal terminal S2 and the reference voltage signal terminal Vref1. The data writing sub-circuit 106 is coupled to the first node N1, the second scan timing signal terminal S2 and a data signal terminal Data. The light-emitting control sub-circuit 107 is coupled to the third node N3, a light-emitting timing signal terminal EMn and a light-emitting device 108.

The reset sub-circuit 102 is configured to transmit, in response to a first scan timing signal received at the first scan timing signal terminal S1, an initial signal received at the initial signal terminal Vinit to the second node N2 to reset the second node N2.

Figure 2B:
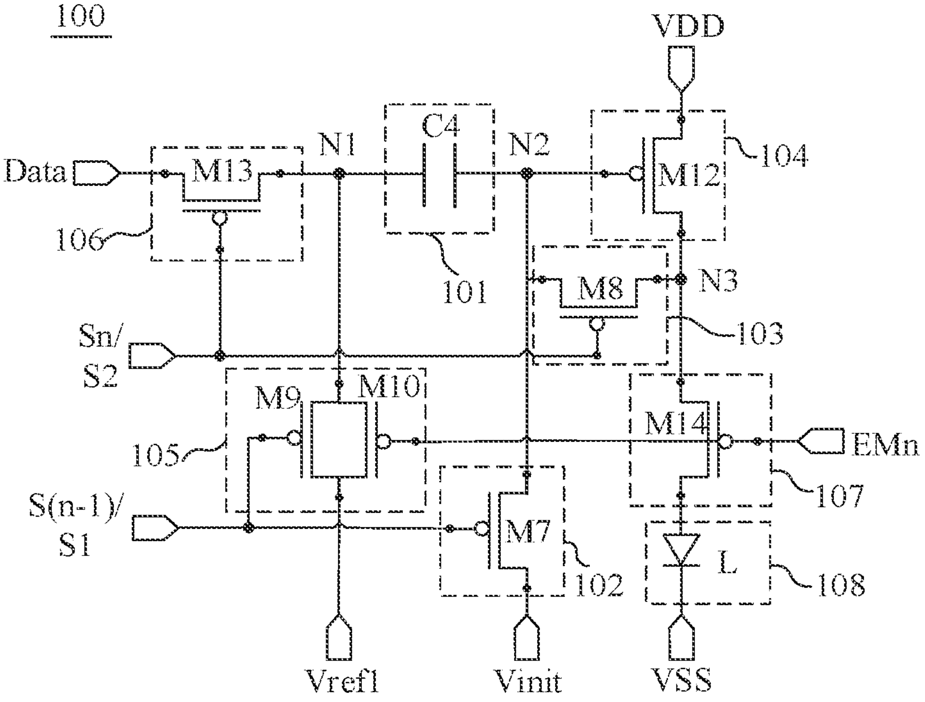
FIG. 2B is a circuit diagram of a pixel driving circuit, in accordance with some examples.

For example, as shown in FIG. 2B, the reset sub-circuit 102 includes a seventh transistor M7; a control electrode of the seventh transistor M7 is coupled to the first scan timing signal terminal S1, a first electrode of the seventh transistor M7 is coupled to the initial signal terminal Vinit, and a second electrode of the seventh transistor M7 is coupled to the second node N2. The seventh transistor M7 is configured to be turned on under control of the first scan timing signal to transmit the initial signal to the second node N2 so as to reset the second node N2.

The compensation sub-circuit 103 is configured to cause the driving sub-circuit 104 to be in a self-saturation state in response to a second scan timing signal received at the second scan timing signal terminal S2.

For example, as shown in FIG. 28, the compensation sub-circuit 103 includes an eighth transistor M8; a control electrode of the eighth transistor M8 is coupled to the second scan timing signal terminal S2, a first electrode of the eighth transistor M8 is coupled to the third node N3, and a second electrode of the eighth transistor M8 is coupled to the second node N2. The eighth transistor M8 is configured to be turned on under control of the second scan timing signal to cause the driving sub-circuit 104 to be in the self-saturation state.

The driving sub-circuit 104 is configured to: be in the self-saturation state due to at least an action of the compensation sub-circuit 103; generate a compensation signal according to a first voltage signal received at the first voltage signal terminal VDD; and transmit the compensation signal to the second node N2.

For example, as shown in FIG. 2B, the driving sub-circuit 104 includes a twelfth transistor M12 (i.e., the driving transistor). A control electrode of the twelfth transistor M12 is coupled to the second node N2, a first electrode of the twelfth transistor M12 is coupled to the first voltage signal terminal VDD, and a second electrode of the twelfth transistor M12 is coupled to the third node N3. The twelfth transistor M12 is configured to: be turned on under control of a voltage of the second node N2; be in the self-saturation state due to the action of the compensation sub-circuit 103; generate the compensation signal according to the first voltage signal and a threshold voltage of the twelfth transistor M12; and transmit the compensation signal to the second node N2.

For example, in a case where the compensation sub-circuit 103 includes the eighth transistor M8, the eighth transistor M8 is turned on under the control of the second scan timing signal, so that the control electrode and the second electrode of the twelfth transistor M12 are connected to each other. As a result, the twelfth transistor M12 is in the self-saturation state, so that a voltage of the control electrode of the twelfth transistor M12 is a sum of a voltage of the first electrode of the twelfth transistor M12 and the threshold voltage of the twelfth transistor M12.

The energy storage sub-circuit 101 is configured to: be charged due to actions of voltages of the first node N1 and the second node N2; couple the voltage of the second node N2 according to the voltage of the first node N1; and maintain a coupled voltage of the second node N2.

For example, as shown in FIG. 2B, the energy storage sub-circuit 101 includes a fourth capacitor C4 (i.e., the storage capacitor); a first terminal (the reference voltage terminal) of the fourth capacitor C4 is coupled to the first node N1, and a second terminal (the signal holding terminal) of the fourth capacitor C4 is coupled to the second node N2. The fourth capacitor C4 is configured to: be charged due to the actions of the voltages of the first node N1 and the second node N2; couple the voltage of the second node N2 according to the voltage of the first node N1 when the voltage of the first node N1 changes, so that the voltage of the second node N2 changes with the same amplitude; and maintain the coupled voltage of the second node N2.

The driving sub-circuit 104 is further configured to: generate a driving signal due to a coupling action of the energy storage sub-circuit 101; and transmit the driving signal to the third node N3.

In a case where the driving sub-circuit 104 includes the twelfth transistor M12, the twelfth transistor M12 is further configured to: be turned on under the control of the voltage of the second node N2; and generate the driving signal due to the coupling action of the energy storage sub-circuit 101.

The reference voltage sub-circuit 105 is configured to transmit a reference voltage signal received at the reference voltage signal terminal Vref1 to the first node N1 in response to the first scan timing signal or the second scan timing signal. In a case where the reference voltage sub-circuit 105 is coupled to the first scan timing signal terminal S1, the reference voltage sub-circuit 105 is further coupled to the light-emitting timing signal terminal EMn; the reference voltage sub-circuit 105 is further configured to transmit the reference voltage signal to the first node N1 in response to a light-emitting timing signal received at the light-emitting timing signal terminal EMn.

The reference voltage sub-circuit 105 provides a constant reference voltage signal for the first node N1, so as to maintain a voltage of the first terminal of the fourth capacitor C4 at a reference voltage. Here the reference voltage signal received at the reference voltage signal terminal Vref1 serves as the constant reference voltage signal.

For example, as shown in FIG. 2B, the reference voltage sub-circuit 105 includes a ninth transistor M9 and a tenth transistor M10. A control electrode of the ninth transistor M9 is coupled to the first scan timing signal terminal S1, a first electrode of the ninth transistor M9 is coupled to the reference voltage signal terminal Vref1, and a second electrode of the ninth transistor M9 is coupled to the first node N1. A control electrode of the tenth transistor M10 is coupled to the light-emitting timing signal terminal EMn, a first electrode of the tenth transistor M10 is coupled to the reference voltage signal terminal Vref1, and a second electrode of the tenth transistor M10 is coupled to the first node N1.

The ninth transistor M9 is configured to be turned on under the control of the first scan timing signal to transmit the reference voltage signal to the first node N1. The tenth transistor M10 is configured to be turned on under control of the light-emitting timing signal to transmit the reference voltage signal to the first node N1.

The data writing sub-circuit 106 is configured to transmit a data signal received at the data signal terminal Data to the first node N1 in response to the second scan timing signal.

For example, as shown in FIG. 28, the data writing sub-circuit 106 includes a thirteenth transistor M13. A control electrode of the thirteenth transistor M13 is coupled to the second scan timing signal terminal S2, a first electrode of the thirteenth transistor M13 is coupled to the data signal terminal Data, and a second electrode of the thirteenth transistor M13 is coupled to the first node N1. The thirteenth transistor M13 is configured to be turned on under the control of the second scan timing signal to transmit the data signal to the first node N1.

The light-emitting control sub-circuit 107 is configured to transmit, in response to the light-emitting timing signal, the driving signal from the driving sub-circuit 104 to the light-emitting device 108 to drive the light-emitting device 108 to emit light.

For example, as shown in FIG. 2B, the light-emitting control sub-circuit 107 includes a fourteenth transistor M14. A control electrode of the fourteenth transistor M14 is coupled to the light-emitting timing signal terminal EMn, a first electrode of the fourteenth transistor M14 is coupled to the third node N3, and a second electrode of the fourteenth transistor M14 is coupled to the light-emitting device 108. The fourteenth transistor M14 is configured to be turned on under the control of the light-emitting timing signal to transmit the driving signal from the driving sub-circuit 104 to the light-emitting device 108.

In some examples, as shown in FIGS. 2A and 2B, the light-emitting control sub-circuit 107 is coupled to an anode of the light-emitting device 108, and a cathode of the light-emitting device 108 is coupled to a second voltage signal terminal VSS. For example, the light-emitting device 108 is the light emitting diode L.

In some embodiments, on/off types of transistors included in all sub-circuits mentioned above are all the same. For example, the seventh transistor M7, the eighth transistor M8, the ninth transistor M9, the tenth transistor M10, the twelfth transistor M12, the thirteenth transistor M13 and the fourteenth transistor M14 are all P-type transistors or N-type transistors, for example, the above transistors are all low temperature poly-silicon thin film transistors. The examples are described by taking an example in which the above transistors are all the P-type transistors.

It will be noted that, as shown in FIGS. 1, 2A and 2B, in the display panel 01, the plurality of sub-pixels 10 are arranged in an array, the first scan timing signal terminal S1 may also be referred as a reset signal terminal, and a first scan timing signal of a first scan timing signal terminal S1 received by each pixel driving circuit 100 in a row of sub-pixels 10 and a second scan timing signal of a second scan timing signal terminal S2 received by each pixel driving circuit 100 in a previous row of sub-pixels 10 are a same signal. That is, first scan signal terminals S1 of pixel driving circuits 100 in an n-th row of sub-pixels and second scan signal terminals S2 of pixel driving circuits 100 in an (n−1)-th row of sub-pixels are coupled to a same scan timing signal line GL (an (n−1)-th scan timing signal line GL). A scan timing signal line GL is coupled to two rows of sub-pixels before and after the scan timing signal line GL, thereby achieving sharing of a scan timing signal. For example, as shown in FIGS. 2A and 2B, for the pixel driving circuit 100 in the n-th row of sub-pixels, the first scan timing signal terminal S1 thereof is also represented by S(n−1), and the second scan timing signal terminal S2 thereof is also represented by Sn.

By using the above way of combining adjacent scan timing signals, the number of scan timing signal lines GL needed to be provided in the display panel 01 may be reduced, thereby reducing difficulties and costs of manufacturing the display panel 01.

"due to an action of a voltage of a certain node" or "under control of the voltage of the certain node" mentioned in the examples may be understood as that, an action on a device coupled to the certain node is generated due to an action of a voltage signal of the certain node. For example, the twelfth transistor M12 is turned on due to an action of the voltage of the second node N2, which may be understood that the twelfth transistor M12 is turned on due to an action of a voltage signal of the second node N2.

Figure 3:
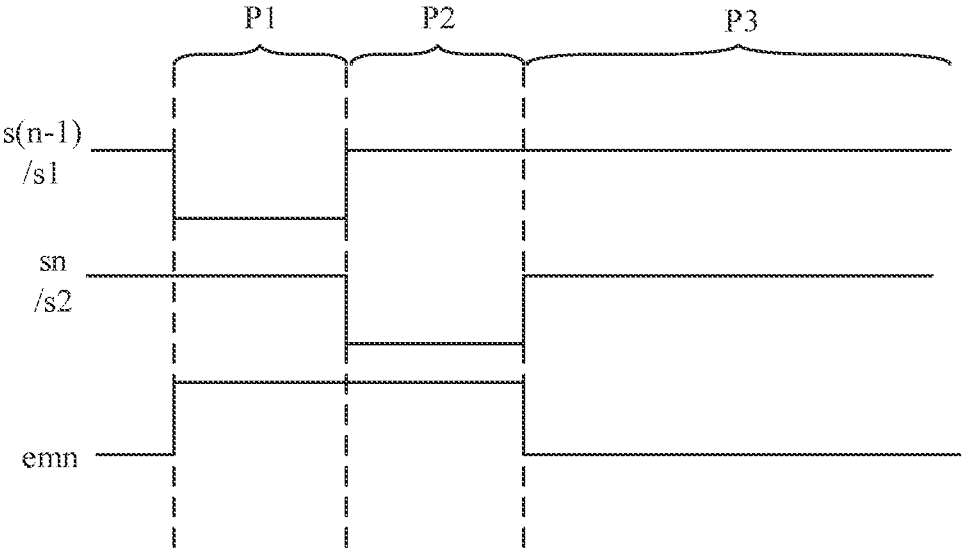
FIG. 3 is a timing diagram corresponding to a pixel driving circuit, in accordance with some embodiments.

Referring to FIGS. 2A, 2B, and 3, a process of driving the pixel driving circuit 100 mentioned above includes a frame period including a reset phase P1, an input and compensation phase P2 and a light-emitting phase P3.

In the reset phase P1:

the reference voltage sub-circuit 105 transmits the reference voltage signal vref to the first node N1 in response to the first scan timing signal s1; and the reset sub-circuit 102 transmits the initial signal vinit to the second node N2 in response to the first scan timing signal s1 to reset the second node N2, thereby resetting the second terminal of the fourth capacitor C4.

In the input and compensation phase P2:

the data writing sub-circuit 106 transmits the data signal data to the first node N1 in response to the second scan timing signal s2. The voltage of the first node N1 is a voltage of the data signal data;

the compensation sub-circuit 103 causes the driving sub-circuit 104 to be in the self-saturation state in response to the second scan timing signal s2; and the driving sub-circuit 104 is in the self-saturation state due to the action of the compensation sub-circuit 103, generates the compensation signal according to the first voltage signal vdd received at the first voltage signal terminal VDD, and transmits the compensation signal to the second node N2; and the energy storage sub-circuit 101 is charged due to the actions of the voltages of the first node N1 and the second node N2.

In the light-emitting phase P3:

the reference voltage sub-circuit 105 transmits the reference voltage signal vref to the first node N1 in response to the light-emitting timing signal emn, so that the voltage of the first terminal of the fourth capacitor C4 is changed to a voltage of the reference voltage signal vref;

the energy storage sub-circuit 101 couples the voltage of the second node N2 according to the voltage of the first node N1, and maintains the coupled voltage of the second node N2;

the driving sub-circuit 104 generates the driving signal according to the reference voltage signal vref and the data signal data due to the coupling action of the energy storage sub-circuit 101, and transmits the driving signal to the light-emitting control sub-circuit 107; and the light-emitting control sub-circuit 107 transmits the driving signal from the driving sub-circuit 104 to the light-emitting device 108 in response to the light-emitting timing signal emn, so as to drive the light-emitting device to emit light.

In the entire light-emitting phase P3 of the frame period, in a light-emitting process of the light-emitting device 108, the driving signal generated by the twelfth transistor M12 in the driving sub-circuit 104 is a driving current, and according to a calculation formula of the driving current $i=\beta(V_{gs}-V_{th})^2$, where $V_{gs}$ is a voltage difference between a gate and a source of the twelfth transistor M12, and $V_{th}$ is the threshold voltage of the twelfth transistor M12, it will be seen that, for the twelfth transistor M12, the driving signal generated thereby is related to the voltage of the control electrode (the gate) of the twelfth transistor M12, and a stability of the voltage of the control electrode of the twelfth transistor M12 may affect a stability and an effective value of the generated driving signal, so that a stability and a continuity of light emission of the light-emitting device 108 is affected.

The control electrode of the twelfth transistor M12 is coupled to the second node N2, and thus a voltage holding rate of the second node N2 will affect a light-emitting effect of the light-emitting device 108, and the voltage of the second node N2 is consistent with a voltage of the signal holding terminal of the fourth capacitor C4, that is, the higher a voltage holding rate of the fourth capacitor C4, the more stable the luminance of the light-emitting device 108, and the better the light-emitting effect.

Since a transistor has an off-state current in an off state, and the off-state current is also referred as a leakage current, in the light-emitting phase P3, the reset sub-circuit 102 and the compensation sub-circuit 103 that are coupled to the second node N2 are both turned off, that is, the seventh transistor M7 included in the reset sub-circuit 102 and the eighth transistor M8 included in the compensation sub-circuit 103 are both turned off and in the off state. In this case, the seventh transistor M7 and the eighth transistor M8 each have the leakage current, which causes the second node N2 to leak current. As a result, the voltage of the second node N2 is decreased and is difficult to maintain stability.

As shown in FIG. 2B, in the pixel driving circuit 100, there are two current leakage paths, which are respectively a first current leakage path from the second node N2 to the initial signal terminal Vinit via the seventh transistor M7, and a second current leakage path from the second node N2 to the third node N3 via the eighth transistor M8. In this way, in the light-emitting phase P3, for the current leakage of the above two current leakage paths, a degree of the current leakage of the second node N2 is relatively large, so that the voltage holding rate of the fourth capacitor C4 is low, and the voltage of the signal holding terminal of the fourth capacitor C4 may not be kept constant, which causes that the driving signal output by the twelfth transistor M12 is unstable. As a result, the luminance of the light-emitting device 108 changes greatly, and a stability thereof is poor, thereby resulting in flickering in visual sense. In addition, components in all pixel driving circuits 100 of the display apparatus are different due to problems of process, the degrees of the current leakages of the second nodes N2 in all pixel driving circuits 100 are inconsistent, so that the luminance of the light-emitting devices 108 respectively driven by all the pixel driving circuits 100 is uneven, which results in abnormalities (e.g. uneven display) of a display picture.

It will be noted that "the second node N2 leaks current" mentioned in the examples means that the second node N2 leaks currents through the above two current leakage paths, so that the voltage of the second node N2 is decreased or increased, which is fluctuating and is not able to be kept stable. "the energy storage sub-circuit 101 leaks current" mentioned in the examples means that the second terminal (the signal holding terminal) of the fourth capacitor C4 of the energy storage sub-circuit 101 leaks currents through the above two current leakage paths, so that the voltage of the second terminal of the fourth capacitor C4 may not be kept constant and the voltage holding rate of the fourth capacitor C4 is decreased.

Figure 4A:
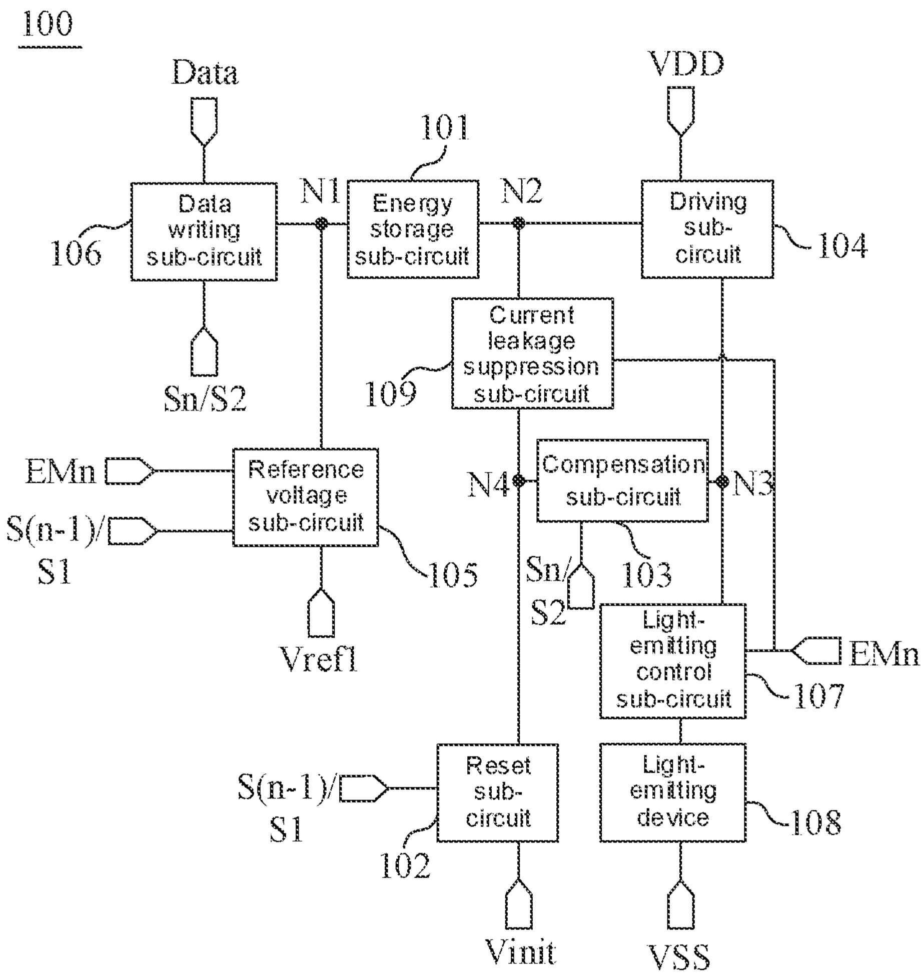
FIG. 4A is a structural diagram of yet another pixel driving circuit, in accordance with some embodiments.
Figure 8A:
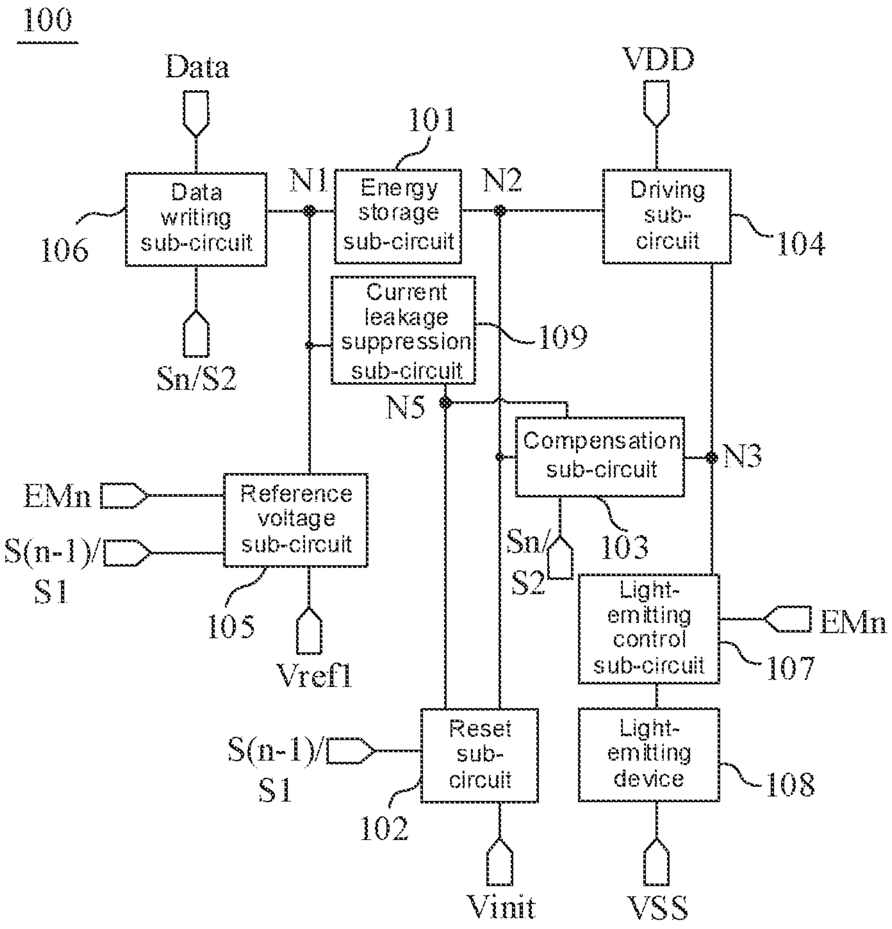
FIG. 8A is a structural diagram of yet another pixel driving circuit, in accordance with some embodiments.
Figure 10A:
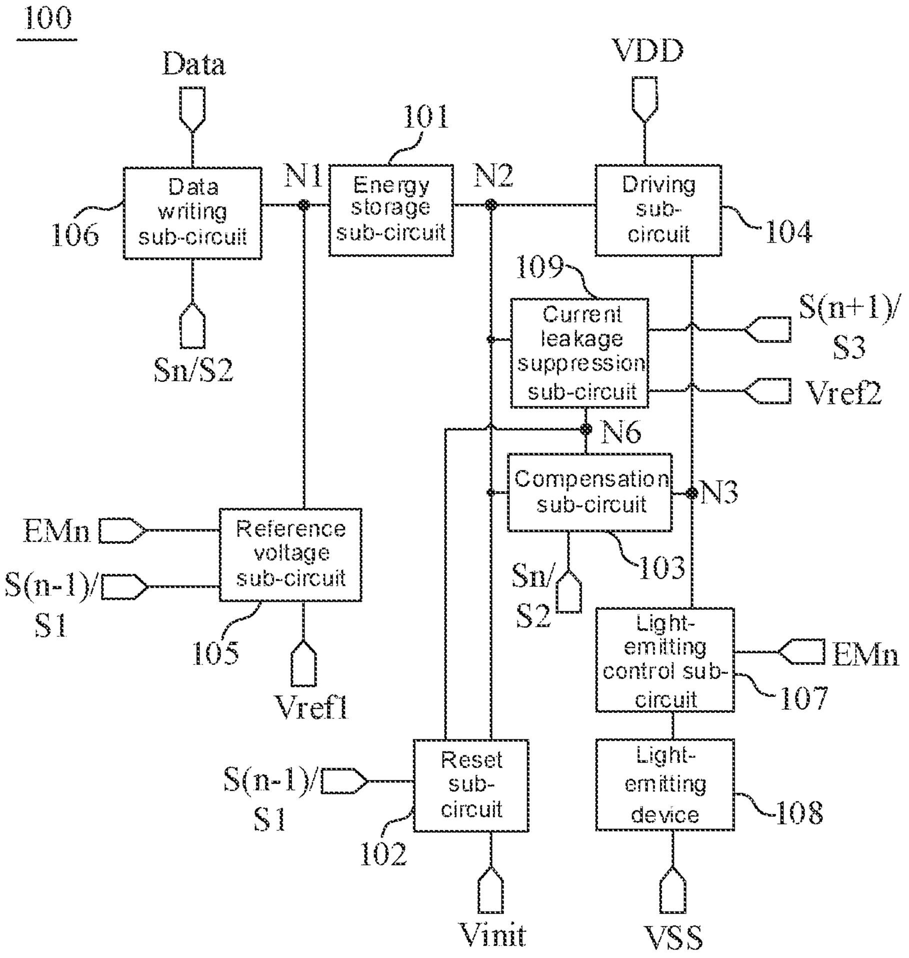
FIG. 10A is a structural diagram of yet another pixel driving circuit, in accordance with some embodiments.

Based on this, as shown in FIGS. 4A, 8A and 10A, the pixel driving circuit 100 provided by some embodiments of the present disclosure includes an energy storage sub-circuit 101, a reset sub-circuit 102, a compensation sub-circuit 103, a driving sub-circuit 104, a reference voltage sub-circuit 105, a data writing sub-circuit 106, a light-emitting control sub-circuit 107, and an current leakage suppression sub-circuit 109. The current leakage suppression sub-circuit 109 is coupled to the energy storage sub-circuit 101, the reset sub-circuit 102 and the compensation sub-circuit 103, and the current leakage suppression sub-circuit 109 is configured to suppress the current leakage of the energy storage sub-circuit 101 in a process of generating and transmitting the driving signal by the driving sub-circuit 104.

That is, in the light-emitting phase P3, the current leakage suppression sub-circuit 109 may suppress the current leakage of the energy storage sub-circuit 101 and improve a voltage holding rate of the signal holding terminal of the fourth capacitor C4 included in the energy storage sub-circuit 101, so that the voltage of the signal holding terminal of the fourth capacitor C4 may be kept constant for a long time. As a result, the current leakage of the second node N2 is suppressed, and the voltage of the second node N2 may be maintained for a long time. Thus, under the control of the voltage of the second node N2, the stability of the driving signal generated by the driving sub-circuit 104 is relatively high, so that the stability and the continuity of the luminance of the light-emitting device 108 are improved, the flickering in visual sense is reduced, and a problem of the uneven display cause by uneven luminance of the light-emitting devices 108 respectively driven by all pixel driving circuits 100 due to differences in the current leakage of all the pixel driving circuits 100 is ameliorated, and in turn, the display effect is improved.

A structure of the current leakage suppression sub-circuit 109 may be selectively set according to actual requirements. Several structures of the current leakage suppression sub-circuit 109 are exemplarily described below.

As shown in FIGS. 4A to 5C, in some embodiments, the current leakage suppression sub-circuit 109 is coupled to the second node N2, so that the current leakage suppression sub-circuit 109 is coupled to the energy storage sub-circuit 101 through the second node N2.

The current leakage suppression sub-circuit 109 is further coupled to a fourth node N4 and the light-emitting timing signal terminal EMn.

The compensation sub-circuit 103 is coupled to the fourth node N4, so that the compensation sub-circuit 103 is coupled to the second node N2 through the fourth node N4 and the current leakage suppression sub-circuit 109. The reset sub-circuit 102 is coupled to the fourth node N4, so that the reset sub-circuit 102 is coupled to the second node N2 through the fourth node N4 and the current leakage suppression sub-circuit 109.

Based on the above connection relationships, the current leakage suppression sub-circuit 109 is further configured to transmit the initial signal from the reset sub-circuit 102 to the second node N2 in response to the light-emitting timing signal. That is, in a process that the reset sub-circuit 102 is turned on under the control of the first scan timing signal to transmit the initial signal, the current leakage suppression sub-circuit 109 is 35) turned on under the control of the light-emitting timing signal, so that the reset sub-circuit 102 transmits the initial signal vinit to the fourth node N4, and the current leakage suppression sub-circuit 109 transmits the initial signal from the fourth node N4 to the second node N2 so as to reset the second node N2.

The current leakage suppression sub-circuit 109 is further configured to: be turned on under the control of the light-emitting timing signal; and cause the driving sub-circuit 104 to be in the self-saturation state due to a combined action of the current leakage suppression sub-circuit 109 and the compensation sub-circuit 103 that is in the on state. That is, in a process that the compensation sub-circuit 103 is turned on under the control of the second scan timing signal, the current leakage suppression sub-circuit 109 is turned on under the control of the light-emitting timing signal, so as to cause the driving sub-circuit 104 to be in the self-saturation state due to the combined actions of the current leakage suppression sub-circuit 109 and the compensation sub-circuit 103. For example, in the input and compensation phase, the current leakage suppression sub-circuit 109 and the compensation sub-circuit 103 are both in the turn-on state, so that the control electrode and the second electrode of the twelfth transistor M12 in the driving sub-circuit 104 are connected to each other, and in turn, the twelfth transistor M12 is caused to be in the self-saturation state.

In the above pixel driving circuit 100, there are still two current leakage paths, which are respectively a third current leakage path from the second node N2 to the third node N3 via the current leakage suppression sub-circuit 109 and the compensation sub-circuit 103, and a fourth current leakage path from the second node N2 to the initial signal terminal Vinit via the current leakage suppression sub-circuit 109 and the reset sub-circuit 102. In the light-emitting phase, in a process that the second node N2 leaks current through the above two current leakage paths, the leakage current needs to firstly pass through the current leakage suppression sub-circuit 109, and the current leakage suppression sub-circuit 109 may suppress the leakage current of the energy storage sub-circuit 101, thereby being able to reduce an amount of the leakage current from the second node N2 to the third node N3 and an amount of the leakage current from the second node N2 to the initial signal terminal Vinit. As a result, the voltage holding rate of the fourth capacitor C4 in the energy storage sub-circuit 101 is improved, so that the voltage of the second node N2 is kept stable.

In some embodiments, the reset sub-circuit 102, the compensation sub-circuit 103, the driving sub-circuit 104 and the current leakage suppression sub-circuit 109 each include at least one transistor.

Figure 5A:
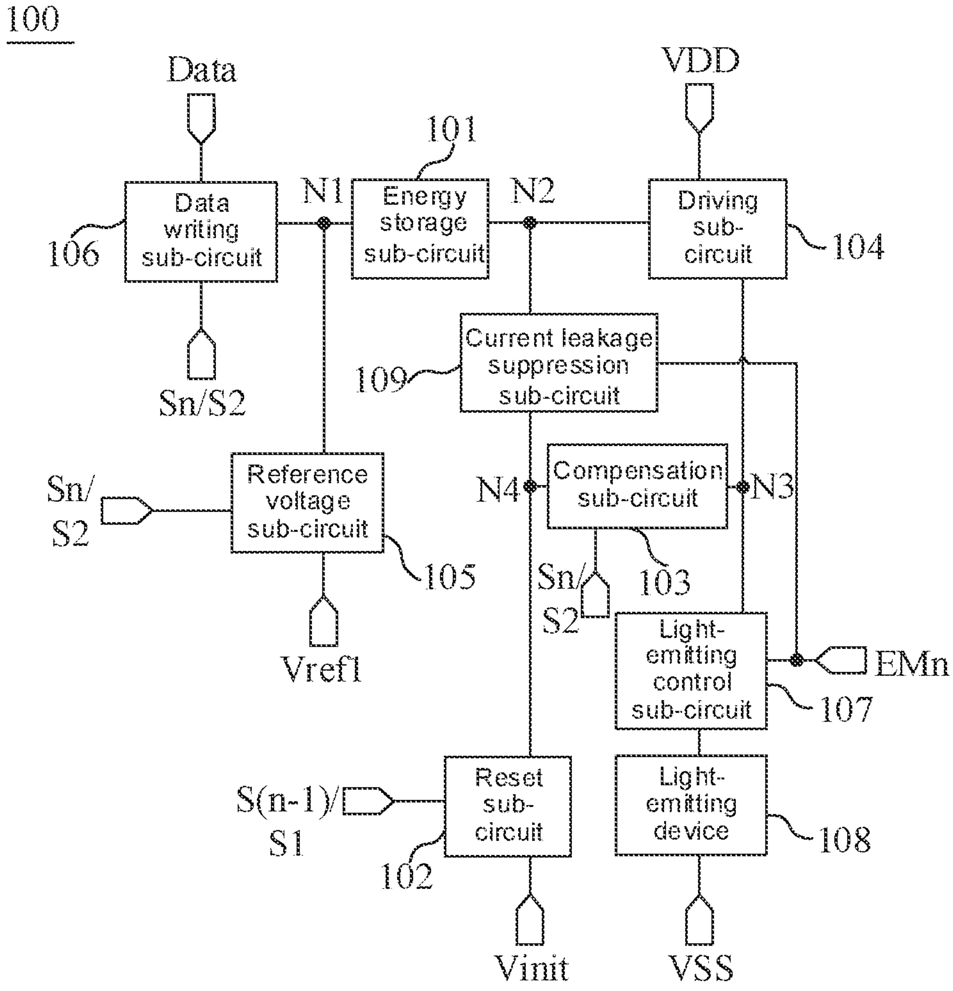
FIG. 5A is a structural diagram of yet another pixel driving circuit, in accordance with some embodiments.
Figure 5B:
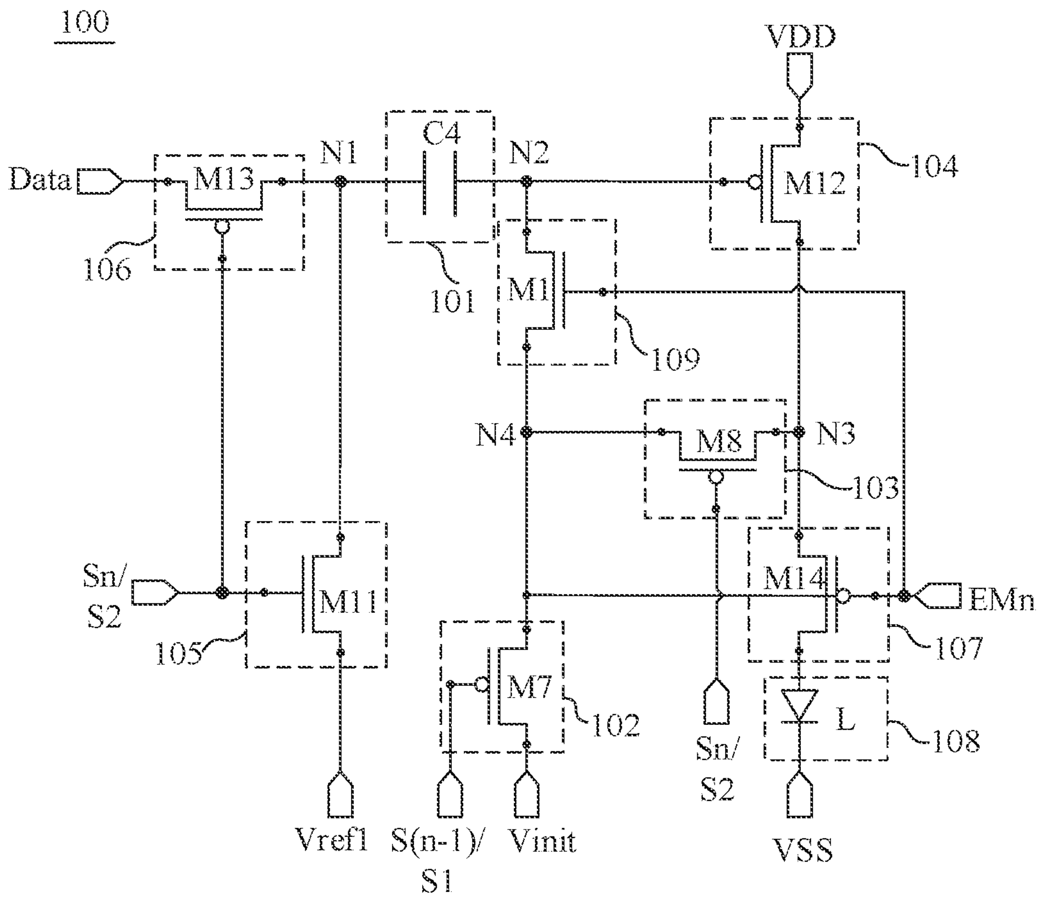
FIG. 5B is a circuit diagram of yet another pixel driving circuit, in accordance with some embodiments.

For example, as shown in FIG. 5B, the reset sub-circuit 102 includes the seventh transistor M7, the compensation sub-circuit 103 includes the eighth transistor M8, and the driving sub-circuit 104 includes the twelfth transistor M12.

The transistors included in the reset sub-circuit 102, the compensation sub-circuit 103 and the driving sub-circuit 104 are all the low temperature poly-silicon thin film transistors. That is, the seventh transistor M7, the eighth transistor M8 and the twelfth transistor M12 are all the low temperature poly-silicon thin film transistors.

The low temperature poly-silicon thin film transistor has characteristics of relatively high carrier mobility and relatively fast response speed. In an on state, a working current of the low temperature poly-silicon thin film transistor is relatively large, so that functions of all the sub-circuits mentioned above may be ensured to be normally achieved, and a response speed of the pixel driving circuit 100 may be improved. Moreover, the driving sub-circuit 104 is able to provide a sufficiently large driving current, so that the luminance of the light-emitting device 108 is improved.

As shown in FIG. 5B, the current leakage suppression sub-circuit 109 includes a first transistor M1, a control electrode of the first transistor M1 is coupled to the light-emitting timing signal terminal EMn, a first electrode of the first transistor M1 is coupled to the fourth node N4, and a second electrode of the first transistor M1 is coupled to the second node N2. The first transistor M1 is configured to be turned on under the control of the light-emitting timing signal in the reset phase and the input and compensation phase, so as to achieve signal transmission. In the light-emitting phase, the first transistor M1 is turned off under the control of the light-emitting timing signal, so as to suppress the current leakage of the second node N2.

The transistor included in the current leakage suppression sub-circuit 109 is an oxide-thin film transistor or an amorphous silicon (a-Si) thin film transistor That is, the first transistor M1 is the oxide-thin film transistor or the a-Si thin film transistor.

The oxide-thin film transistor and the a-Si thin film transistor are both low-leakage-current devices, which have a low leakage current in an off state, and have characteristics of low leakage current. In the light-emitting phase, the first transistor M1 is in the off state, and the first transistor M1 has a relatively low leakage current, so that the current leakage from the second node N2 to the fourth node N4 may be suppressed, and in turn, the amounts of the leakage current from the fourth node N4 to the third node N3 and the initial signal terminal Vinit may be reduced, and the current leakages of the second node N2 through the third current leakage path and the fourth current leakage path may be significantly suppressed.

On/off types of the transistors included in the reset sub-circuit 102, the compensation sub-circuit 103 and the driving sub-circuit 104 are each opposite to an on/off type of the transistor included in the current leakage suppression sub-circuit 109.

For example, the transistors included in the reset sub-circuit 102, the compensation sub-circuit 103 and the driving sub-circuit 104 are all the P-type transistors. For example, the seventh transistor M7, the eighth transistor M8 and the twelfth transistor M12 are all P-type low temperature poly-silicon thin film transistors. The transistor included in the current leakage suppression sub-circuit 109 is the N-type transistor. For example, the first transistor M1 is an N-type oxide-thin film transistor.

In this way, according to on/off characteristics of the N-type transistor and the P-type transistor, the N-type transistor is turned on under control of a high voltage, and the P-type transistor is turned on under control of a low voltage, referring to FIGS. 3 and 5B, in the reset phase P1, the seventh transistor M7 is turned on under the control of the first scan timing signal s1, and the first transistor M1 is turned on under the control of the light-emitting timing signal emn, so that the first transistor M1 transmits the initial signal vinit transmitted by the seventh transistor M7 to the second node N2. In the input and compensation phase P2, the eighth transistor M8 is turned on under the control of the second scan timing signal s2, and the first transistor M1 is turned on under the control of the light-emitting timing signal emn, so that the first transistor M1 and the eighth transistor M8 are both in the on state. As a result, the twelfth transistor M12 is in the self-saturation state, and generates the compensation signal and writes the compensation signal into the second node N2. In the light-emitting phase P3, the first transistor M1 is turned off under the control of the light-emitting timing signal emn, the seventh transistor M7 is turned off under the control of the first scan timing signal s1, and the eighth transistor M8 is turned off under the control of the second scan timing signal s2, so that the first transistor M1 with the relatively low leakage current may suppress the current leakage of the second node N2 through the third current leakage path and the fourth current leakage path, and in turn, the voltage holding rate of the fourth capacitor C4 is improved.

Therefore, in the pixel driving circuit 100 provided by the embodiments of the present disclosure, the current leakage suppression sub-circuit 109 is disposed between the second node N2 and the fourth node N4, and the first transistor M1 included in the current leakage suppression sub-circuit 109 is the oxide-thin film transistor or the a-Si thin film transistor that has the characteristics of low current leakage. In this way, the current leakage of the energy storage sub-circuit 101 may be suppressed, and the amounts of the leakage current of the second node N2 through the third current leakage path and the fourth current leakage path may be reduced. Moreover, the on/off types of the transistors included in the reset sub-circuit 102, the compensation sub-circuit 103 and the driving sub-circuit 104 are all opposite to the on/off type of the transistor included in the current leakage suppression sub-circuit 109, and the first transistor M1 is controlled by the light-emitting timing signal emn, so that the pixel driving circuit 100 provided by the embodiments of the present disclosure may be compatible with an original timing signal (i.e., the light-emitting timing signal emn), there is no need to provide a new timing signal with a polarity opposite to a polarity of the original timing signal, and there is no need to provide a new corresponding signal line.

That is, the pixel driving circuit 100 may suppress the current leakage of the energy storage sub-circuit 101 by the current leakage suppression sub-circuit 109 without increasing a complexity of the circuit and without providing a new timing signal, so as to improve the voltage holding rate of the fourth capacitor C4 in the energy storage sub-circuit 101, thereby improving the stability of the driving signal generated by the driving sub-circuit 104, and improving the stability of the luminance of the light-emitting device 108.

It will be noted that, in the pixel driving circuit 100, for transistors except the driving transistor (the twelfth transistor M12), in the off state, a magnitude of a leakage current of a transistor is basically sensitive to a voltage difference $V_{ds}$ between a source and a drain of the transistor, and the magnitude of the leakage current of the transistor is positively correlated with the voltage difference $V_{ds}$ between the source and the drain of the transistor (that is, the larger the voltage difference $V_{ds}$ between the source and the drain of the transistor, the larger the leakage current of the transistor). Therefore, in a case where the transistor is in the off state, the amount of the leakage current of the transistor may be effectively reduced by controlling the voltage difference $V_{ds}$ between the source and the drain thereof to be relatively small or close to zero. For example, in a case where the first transistor M1 is in the off state, the amount of the leakage current of the first transistor M1 may be effectively reduced by controlling a voltage difference $V_{ds}$ between the source and the drain of the first transistor M1 to be relatively small or close to zero, so as to suppress the current leakage of the second node N2.

Based on this, in some embodiments, as shown in FIGS. 6A to 7C, the pixel driving circuit 100 further includes an accessory current leakage suppression sub-circuit 110 in addition to the current leakage suppression sub-circuit 109.

The accessory current leakage suppression sub-circuit 110 is coupled to the first node N1 and the fourth node N4. The accessory current leakage suppression sub-circuit 110 is configured to: be charged due to actions of voltages of the first node N1 and the fourth node N4; couple, according to the voltage of the first node N1, the voltage of the fourth node N4 to keep the voltage of the fourth node N4 equal or approximately equal to the voltage of the second node N2; and maintain a coupled voltage of the fourth node N4 to suppress the current leakage of the second node N2.

In the pixel driving circuit 100, the energy storage sub-circuit 101 is coupled between the first node N1 and the second node N2, and the energy storage sub-circuit 101 is configured to: be charged due to the actions of the voltages of the first node N1 and the second node N2; couple the voltage of the second node N2 according to the potential of the first node N1; and maintain the coupled voltage of the second node N2. The accessory current leakage suppression sub-circuit 110 is coupled between the first node N1 and the fourth node N4, and the accessory current leakage suppression sub-circuit 110 is configured to: be charged due to the actions of the voltages of the first node N1 and the fourth node N4; couple the voltage of the fourth node N4 according to the voltage of the first node N1; and maintain the coupled voltage of the fourth node N4. Thus, the coupled voltage of the second node N2 may be made equal or approximately equal to the coupled voltage of the fourth node N4 by coupling actions of the energy storage sub-circuit 101 and the accessory current leakage suppression sub-circuit 110. The first electrode and the second electrode of the first transistor M1 are respectively coupled to the second node N2 and the fourth node, in this way, the voltage difference between the source and the drain of the first transistor M1 is a voltage difference between the second node N2 and the fourth node N4, so that the voltage difference between the source and the drain of the first transistor M1 is relatively small, and even close to zero, which may effectively reduce the amount of the leakage current of the first transistor M1 and suppress the current leakage of the second node N2.

Figure 6A:
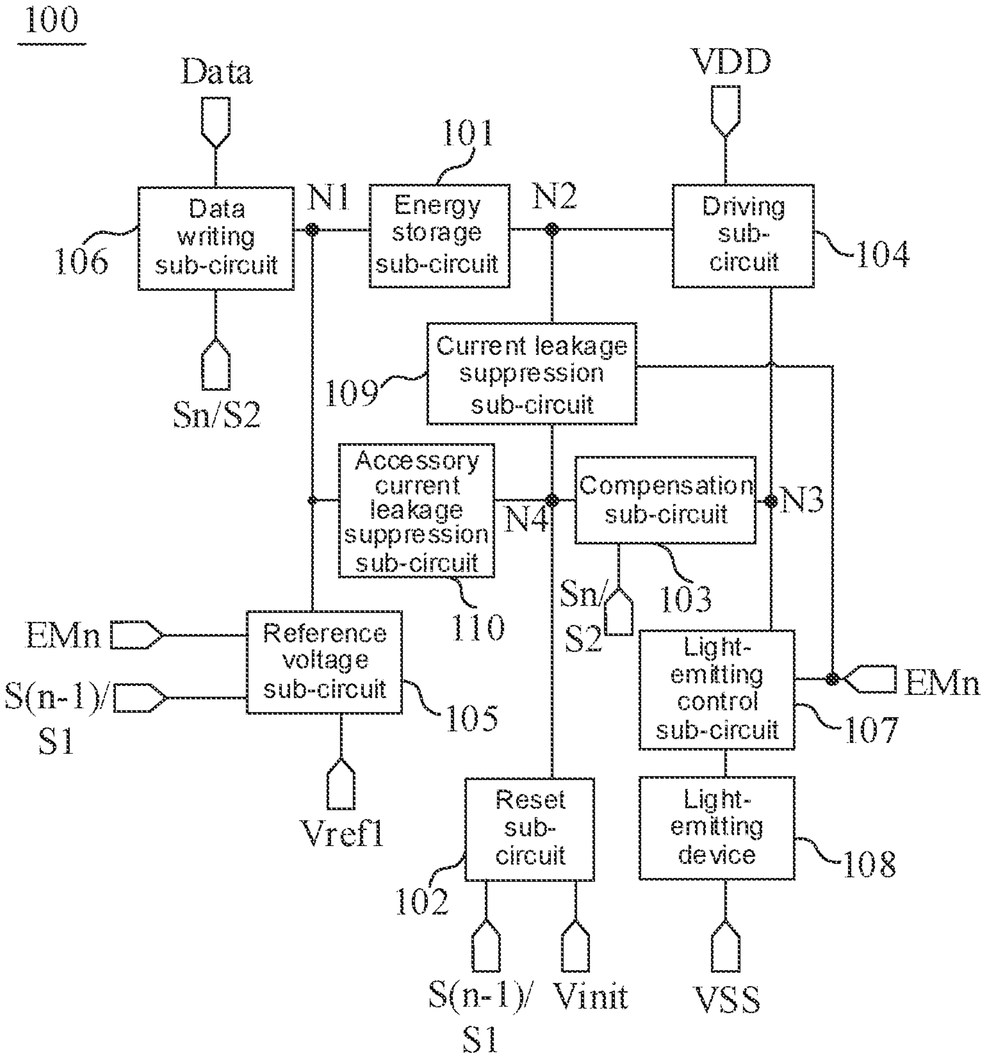
FIG. 6A is a structural diagram of yet another pixel driving circuit, in accordance with some embodiments.
Figure 6B:
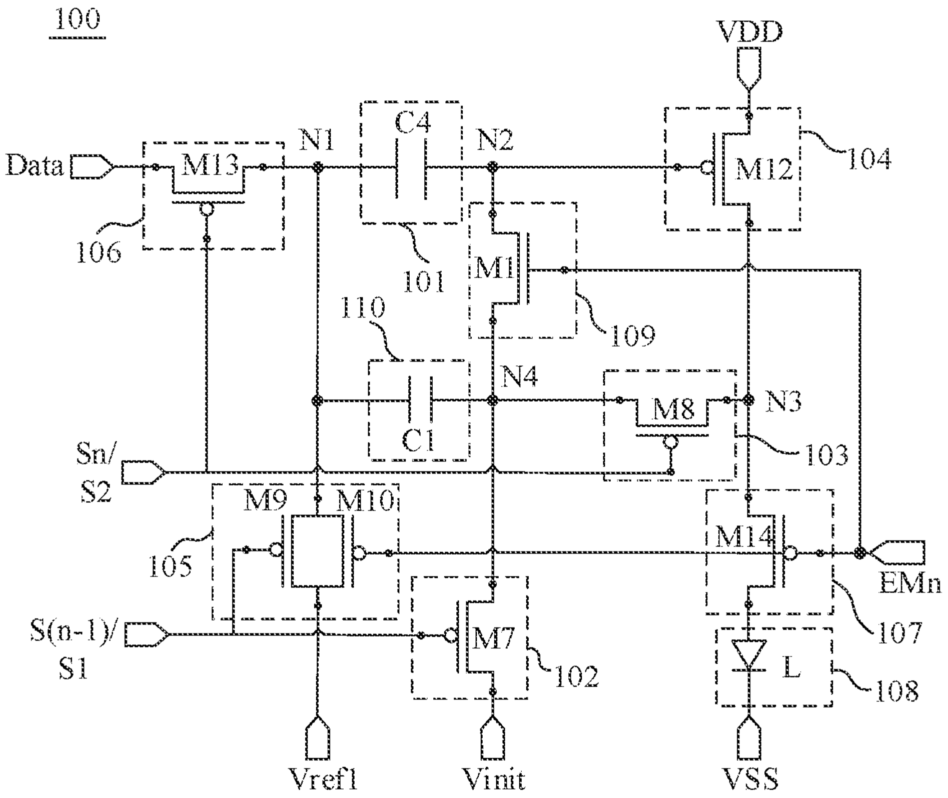
FIG. 6B is a circuit diagram of yet another pixel driving circuit, in accordance with some embodiments.

In some examples, as shown in FIG. 6B, the accessory current leakage suppression sub-circuit 110 includes a first capacitor C1. A first terminal of the first capacitor C1 is coupled to the first node N1, and a second terminal of the first capacitor C1 is coupled to the fourth node N4. The first capacitor C1 is configured to: be charged due to the actions of the first node N1 and the fourth node N4; couple, according to the potential of the first node N1, the voltage of the fourth node N4 when the voltage of the first node N1 changes, so that the voltage of the fourth node N4 changes with the same amplitude; and maintain the coupled voltage of the fourth node N4.

A process of suppressing the current leakage of the second node N2 by the first capacitor C1 is as follows.

As shown in FIG. 6B, the first capacitor C1 and the fourth capacitor C4 are both coupled to the first node N1, so that a voltage of the first terminal of the first capacitor C1 is equal to the voltage of the first terminal of the fourth capacitor C4.

As shown in FIGS. 3 and 6B, the current leakage suppression sub-circuit 109 is coupled between the second node N2 and the fourth node N4. In the reset phase P1 and the input and compensation phase P2, the current leakage suppression sub-circuit 109 is in the on state under control of the light-emitting timing signal, so that the voltage of the second node N2 is equal or approximately equal to the voltage of the fourth node N4. That is, before the light-emitting phase P3, the voltage of the second node N2 is equal or approximately equal to the voltage of the fourth node N4. In the light-emitting phase P3, when a signal written into the first node N1 changes from the data signal data to the reference voltage signal vref, the voltage of the first node N1 changes, and the fourth capacitor C4 couples the voltage of the second node N2 according to the voltage of the first node N1, so that the voltage of the second node N2 suddenly changes; the accessory current leakage suppression sub-circuit 110 couples the voltage of the fourth node N4 according to the voltage of the first node N1, so that the voltage of the fourth node N4 suddenly changes, and an amplitude of the suddenly change of the voltage of the fourth node N4 is equal to an amplitude of a the suddenly change of the voltage of the second node N2. As a result, the coupled voltage of the second node N2 is equal or approximately equal to the coupled voltage of the fourth node N4.

The current leakage suppression sub-circuit 109 is coupled between the second node N2 and the fourth node N4, the current leakage suppression sub-circuit 109 includes the first transistor M1, and the voltage difference between the source and the drain of the first transistor M1 is a voltage difference between the second node N2 and the fourth node N4. Since the coupled voltage of the second node N2 is equal or approximately equal to the coupled voltage of the fourth node N4 in the light-emitting phase, the voltage difference between the source and the drain of the first transistor M1 is relatively small, and even close to zero; thus, the amount of the leakage current of the first transistor M1 may be effectively reduced, so as to suppress the current leakage of the second node N2.

In this way, the pixel driving circuit 100 provided by the embodiments of the present disclosure includes the current leakage suppression sub-circuit 109 and the accessory current leakage suppression sub-circuit 110; on the basis that the current leakage suppression sub-circuit 109 employs the oxide-thin film transistor or the a-Si thin film transistor that has the characteristics of low leakage current to suppress the current leakage of the second node N2, the voltage difference between the second node N2 and the fourth node N4 is relatively small or close to zero by providing the accessory current leakage suppression sub-circuit 110, so that the amount of the leakage current of the first transistor M1 in the off state is further reduced, and the second node N2 is further suppressed. As a result, the voltage holding rate of the fourth capacitor C4 in the energy storage sub-circuit 101 is high, which further improves the stability of the luminance of the light-emitting device 108.

In the pixel driving circuit 100 provided by the embodiments of the present disclosure, the case where the reset sub-circuit 102 includes the seventh transistor M7 and the compensation sub-circuit 103 includes the eighth transistor M8 is described above. In some embodiments, as shown in FIGS. 4C, 5C, 6C and 7C, in the pixel driving circuits 100 of various structures provided above, the reset sub-circuit 102 includes a third transistor M3 and a fourth transistor M4 connected in series, and the compensation sub-circuit 103 includes a fifth transistor M5 and a sixth transistor M6 connected in series.

In the reset sub-circuit 102, a control electrode of the third transistor M3 is coupled to the first scan timing signal terminal S1, a first electrode of the third transistor M3 is coupled to the initial signal terminal Vinit, and a second electrode of the third transistor M3 is coupled to a first electrode of the fourth transistor M4; a control electrode of the fourth transistor M4 is coupled to the first scan timing signal terminal S1, and a second electrode of the fourth transistor M4 is coupled to the second node N2. For example, as shown in FIGS. 4C, 5C, 6C and 7C, in a case where the current leakage suppression sub-circuit 109 is further coupled to the second node N2 and the light-emitting timing signal terminal EMn, and the current leakage suppression sub-circuit 109, the compensation sub-circuit 103 and the reset sub-circuit 102 are all coupled to the fourth node N4, the second electrode of the fourth transistor M4 is coupled to the fourth node N4, so that the fourth transistor M4 is coupled to the second node N2 through the fourth node N4 and the current leakage suppression sub-circuit 109.

The third transistor M3 is configured to be turned on under control of the first scan timing signal to transmit the initial signal to the first electrode of the fourth transistor M4, and the fourth transistor M4 is configured to be turned on under the control of the first scan timing signal terminal S1 to transmit the initial signal to the second node N2.

In the compensation sub-circuit 103, a control electrode of the fifth transistor M5 is coupled to the second scan timing signal terminal S2, a first electrode of the fifth transistor M5 is coupled to the third node N3, and a second electrode of the fifth transistor M5 is coupled to a first electrode of the sixth transistor M6; a control electrode of the sixth transistor M6 is coupled to the second scan timing signal terminal S2, and a second electrode of the sixth transistor M6 is coupled to the second node N2. For example, as shown in FIGS. 4C, 5C, 6C and 7C, in the case where the current leakage suppression sub-circuit 109 is further coupled to the second node N2 and the light-emitting timing signal terminal EMn, and the current leakage suppression sub-circuit 109, the compensation sub-circuit 103 and the reset sub-circuit 102 are all coupled to the fourth node N4, the second electrode of the sixth transistor M6 is coupled to the fourth node N4, so that the sixth transistor M6 is coupled to the second node N2 through the fourth node N4 and the current leakage suppression sub-circuit 109.

The fifth transistor M5 is configured to be turned on under the control of the second scan timing signal, and the sixth transistor M6 is configured to be turned on under the control of the second scan timing signal, so that the second node N2 is connected to the third node N3 to cause the driving sub-circuit 104 to be in the self-saturation state.

In the above embodiment, the reset sub-circuit 102 and the compensation sub-circuit 103 each include two transistors connected in series, the third transistor M3 and the fourth transistor M4 are connected in series between the fourth node N4 and the initial signal terminal Vinit, and the fifth transistor M5 and the sixth transistor M6 are connected in series between the fourth node N4 and the third node N3. In this way, on the premise that a voltage difference between the fourth node N4 and the initial signal terminal Vinit and a voltage difference between the fourth node N4 and the third node N3 are both constant, the voltage difference between the fourth node N4 and the initialization signal terminal Vinit is shared by the two transistors connected in series therebetween, and the voltage difference between the fourth node N4 and the third node N3 is shared by the two transistors connected in series therebetween. That is, a voltage difference between a source and a drain of a single transistor is reduced, for example, to half of an original voltage difference (here, the original voltage difference refers to the voltage difference between the fourth node N4 and the initial signal terminal Vinit or the voltage difference between the fourth node N4 and the third node N3), so that amounts of leakage currents of the third transistor M3, the fourth transistor M4, the fifth transistor M5 and the sixth transistor M6 may be significantly reduced, so as to further suppress the current leakage of the second node N2.

In some embodiments, as shown in FIGS. 5A to 5C and FIGS. 7A to 7C, in the pixel driving circuit 100 provided by the embodiments of the present disclosure, in a case where the reference voltage sub-circuit 105 is coupled to the second scan timing signal terminal S2, the reference voltage sub-circuit 105 includes an eleventh transistor M11.

A control electrode of the eleventh transistor M11 is coupled to the second scan timing signal terminal S2, a first electrode of the eleventh transistor M11 is coupled to the reference voltage signal terminal Vref1, and a second electrode of the eleventh transistor M11 is coupled to the first node N1. The eleventh transistor M11 is configured to transmit the reference voltage signal to the first node N1 in response to the second scan timing signal received at the second scan timing signal terminal.

On/off types of the transistors included in the reset sub-circuit 102, the compensation sub-circuit 103, the driving sub-circuit 104, the data writing sub-circuit 106 and the light-emitting control sub-circuit 107 are each opposite to an on/off type of the eleventh transistor M11.

For example, as shown in FIG. 5B, the seventh transistor M7, the eighth transistor M8, the twelfth transistor M12, the thirteenth transistor M13 and the fourteenth transistor M14 are all the P-type transistors, and the eleventh transistor M11 is the N-type transistor. Alternatively, as shown in FIG. 50, the third transistor M3, the fourth transistor M4, the fifth transistor M5, the sixth transistor M6, the twelfth transistor M12, the thirteenth transistor M13 and the fourteenth transistor M14 are all the P-type transistors, and the eleventh transistor M11 is the N-type transistor.

Thus, referring to FIG. 3, in the reset phase P1 and the light-emitting phase P3, the voltage of the second scan timing signal s2 is in a high level, so that the eleventh transistor M11 is turned on under the control of the second scan timing signal s2 to transmit the reference voltage signal vref to the first node N1.

In the above embodiment, the reference voltage sub-circuit 105 only includes one transistor (i.e., the eleventh transistor M11), and the on/off type of the eleventh transistor M11 is opposite to the on/off types of other transistors. The eleventh transistor M11 is the N-type transistor and may be turned on in the reset phase and the light-emitting phase under the control of the second scan timing signal s2 to achieve a function of the reference voltage sub-circuit 105, so that a circuit structure of the reference voltage sub-circuit 105 is simplified and may be compatible with the original timing signal.

On this basis, specific circuit structures of the pixel driving circuits 100 provided by some embodiments of the present disclosure will be integrally and exemplarily described below.

As shown in FIGS. 6B, 6C, 7B and 7C, the pixel driving circuit 100 includes the energy storage sub-circuit 101, the reset sub-circuit 102, the compensation sub-circuit 103, the driving sub-circuit 104, the reference voltage sub-circuit 105, the data writing sub-circuit 106, the light-emitting control sub-circuit 107, the current leakage suppression sub-circuit 109 and the accessory current leakage suppression sub-circuit 110.

The current leakage suppression sub-circuit 109 includes the first transistor M1. The first transistor M1 is the oxide-thin film transistor or the a-Si thin film transistor.

The energy storage sub-circuit 101 includes the fourth capacitor C4; the driving sub-circuit 104 includes the twelfth transistor M12; the data writing sub-circuit 106 includes the thirteenth transistor M13; the light-emitting control sub-circuit 107 includes the fourteenth transistor M14.

The reset sub-circuit 102 includes the third transistor M3 and the fourth transistor M4 connected in series; alternatively, the reset sub-circuit 102 includes the seventh transistor M7.

The compensation sub-circuit 103 includes the fifth transistor M5 and the sixth transistor M6 connected in series; alternatively, the compensation sub-circuit 103 includes the eighth transistor M8.

The reference voltage sub-circuit 105 includes the ninth transistor M9 and the tenth transistor M10; alternatively, the reference voltage sub-circuit 105 includes the eleventh transistor M11.

The accessory current leakage suppression sub-circuit 110 includes the first capacitor C1.

The control electrode of the first transistor M1 is coupled to the light-emitting timing signal terminal EMn, the first electrode of the first transistor M1 is coupled to the fourth node N4, and the second electrode of the first transistor M1 is coupled to the second node N2. The first transistor M1 is configured to be turned off under the control of the light-emitting timing signal emn in the light-emitting phase, so as to suppress the current leakage of the second node N2.

The on/off type of the first transistor M1 is opposite to the on/off types of the transistors except the first transistor M1 and the eleventh transistor M11 in the pixel driving circuit 100. For example, the first transistor M1 is the N-type transistor, and the transistors except the first transistor M1 and the eleventh transistor M11 in the pixel driving circuit 100 are all the P-type transistors.

The energy storage sub-circuit 101 includes the fourth capacitor C4, the first terminal (the reference voltage terminal) of the fourth capacitor C4 is coupled to the first node N1, and the second terminal (the signal holding terminal) of the fourth capacitor C4 is coupled to the second node N2. The fourth capacitor C4 is configured to: be charged due to the actions of the voltages of the first node N1 and the second node N2; couple, according to the voltage of the first node N1, the voltage of the second node N2 when the voltage of the first node N1 changes, so that the voltage of the second node N2 changes similarly; and maintain the coupled voltage of the second node N2.

The control electrode of the twelfth transistor M12 is coupled to the second node N2, the first electrode of the twelfth transistor M12 is coupled to the first voltage signal terminal VDD, and the second electrode of the twelfth transistor M12 is coupled to the third node N3. The twelfth transistor M12 is configured to: be turned on under the control of the voltage of the second node N2; be in the self-saturation state due to the action of the compensation sub-circuit 103; generate the compensation signal according to the first voltage signal and the threshold voltage of the twelfth transistor M12; and transmit the compensation signal to the second node N2. The twelfth transistor M12 is further configured to: be turned on under the control of the voltage of the second node N2; and generate and output the driving signal according to the reference voltage signal and the data signal.

The control electrode of the thirteenth transistor M13 is coupled to the second scan timing signal terminal S2, the first electrode of the thirteenth transistor M13 is coupled to the data signal terminal Data, and the second electrode of the thirteenth transistor M13 is coupled to the first node N1. The thirteenth transistor M13 is configured to be turned on under the control of the second scan timing signal to transmit the data signal data to the first node N1.

The control electrode of the fourteenth transistor M14 is coupled to the light-emitting timing signal terminal EMn, the first electrode of the fourteenth transistor M14 is coupled to the third node N3, and the second electrode of the fourteenth transistor M14 is coupled to the light-emitting device 108. The fourteenth transistor M14 is configured to be turned on under the control of the light-emitting timing signal to transmit the driving signal from the twelfth transistor M12 to the light-emitting device 108, so as to drive the light-emitting device 108 to emit light.

For example, the light-emitting device 108 includes the light emitting diode L, an anode of the light emitting diode L is coupled to the second electrode of the fourteenth transistor M14, and a cathode of the light emitting diode L is coupled to the second voltage signal terminal VSS. The light emitting diode L may be, for example, the organic light-emitting diode L or a micro light-emitting diode L.

Figure 7A:
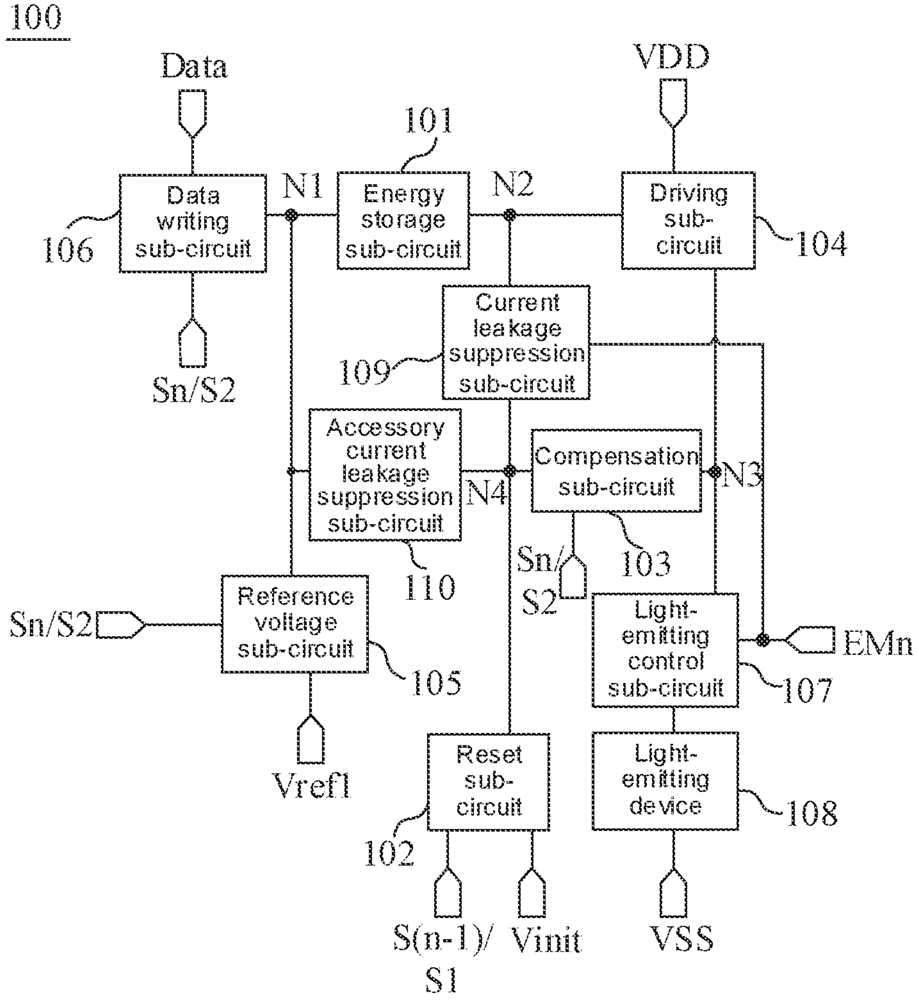
FIG. 7A is a structural diagram of yet another pixel driving circuit, in accordance with some embodiments.
Figure 7B:
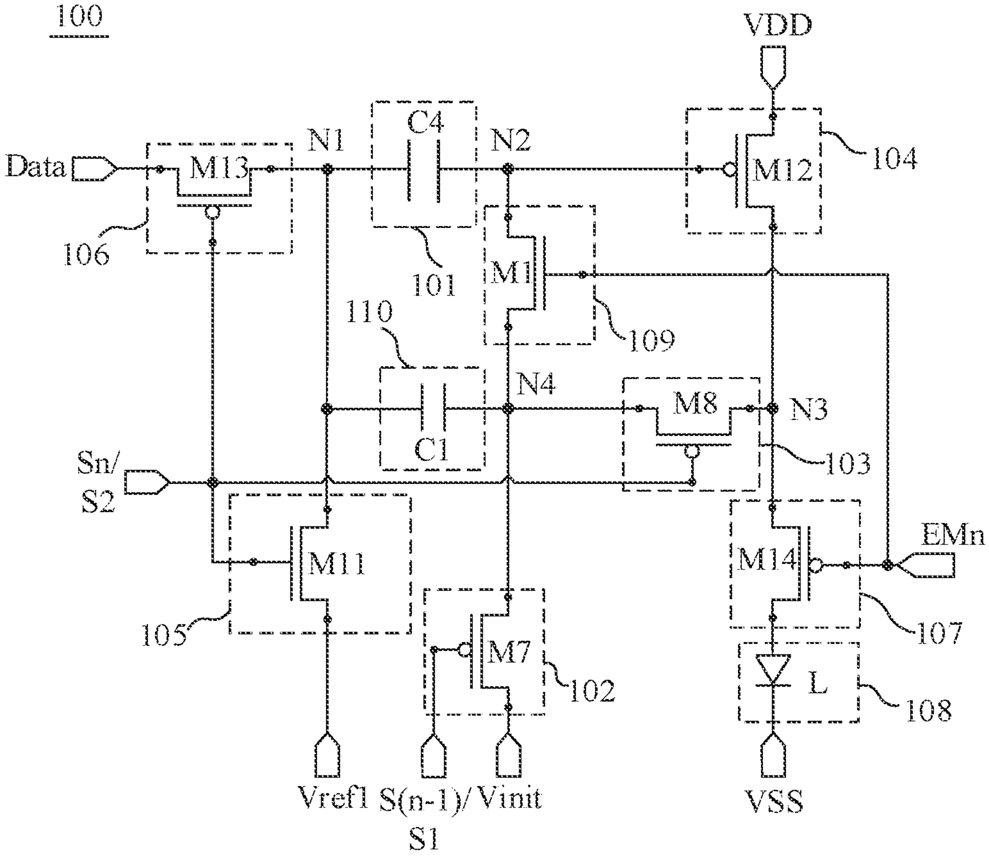
FIG. 7B is a circuit diagram of yet another pixel driving circuit, in accordance with some embodiments.

As shown in FIGS. 6B and 7B, in a case where the reset sub-circuit 102 includes the seventh transistor M7, the control electrode of the seventh transistor M7 is coupled to the first scan timing signal terminal S1, the first electrode of the seventh transistor M7 is coupled to the initial signal terminal Vinit, and the second electrode of the seventh transistor M7 is coupled to the fourth node N4. The seventh transistor M7 is configured to be turned on under the control of the first scan timing signal to transmit the initial signal to the fourth node N4, so that the initial signal is transmitted to the second node N2 through the first transistor M1, so as to reset the second node N2.

As shown in FIGS. 6B and 7B, in the case where the compensation sub-circuit 103 includes the eighth transistor M8, the control electrode of the eighth transistor M8 is coupled to the second scan timing signal terminal S2, the first electrode of the eighth transistor M8 is coupled to the third node N3, and the second electrode of the eighth transistor M8 is coupled to the fourth node N4. The eighth transistor M8 is configured to: be turned on under the control of the second scan timing signal; and cause the second node N2 to be connected to the third node N3 due to a combined action of the eighth transistor M8 and the first transistor M1 that is in the on state, so that the gate is connected to the source of the twelfth transistor M12 to cause the twelfth transistor M12 to be in the self-saturation state.

Figure 7C:
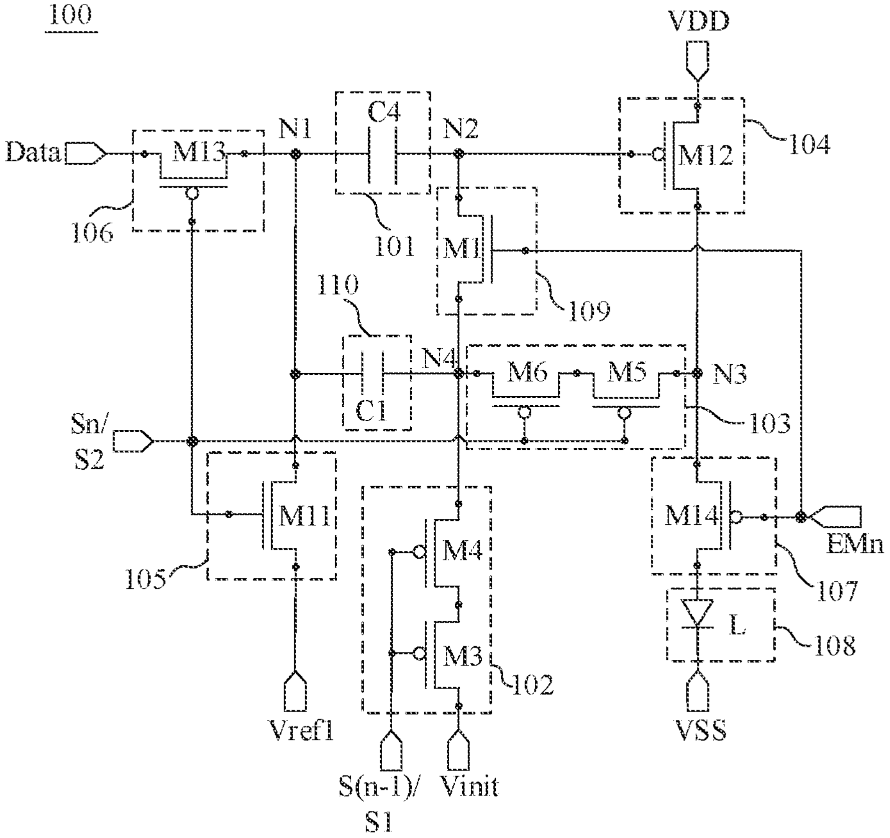
FIG. 7C is a circuit diagram of yet another pixel driving circuit, in accordance with some embodiments.

As shown in FIGS. 60 and 7C, in a case where the reset sub-circuit 102 includes the third transistor M3 and the fourth transistor M4, the control electrode of the third transistor M3 is coupled to the first scan timing signal terminal S1, the first electrode of the third transistor M3 is coupled to the initial signal terminal Vinit, and the second electrode of the third transistor M3 is coupled to the first electrode of the fourth transistor M4; the control electrode of the fourth transistor M4 is coupled to the first scan timing signal terminal S1, and the second electrode of the fourth transistor M4 is coupled to the fourth node N4. The third transistor M3 is configured to be turned on under the control of the first scan timing signal to transmit the initial signal to the first electrode of the fourth transistor M4; the fourth transistor M4 is configured to be turned on under the control of the first scan timing signal to transmit the initial signal to the fourth node N4, so that the initial signal is transmitted to the second node N2 through the first transistor M1 to reset the second node N2.

Figure 6C:
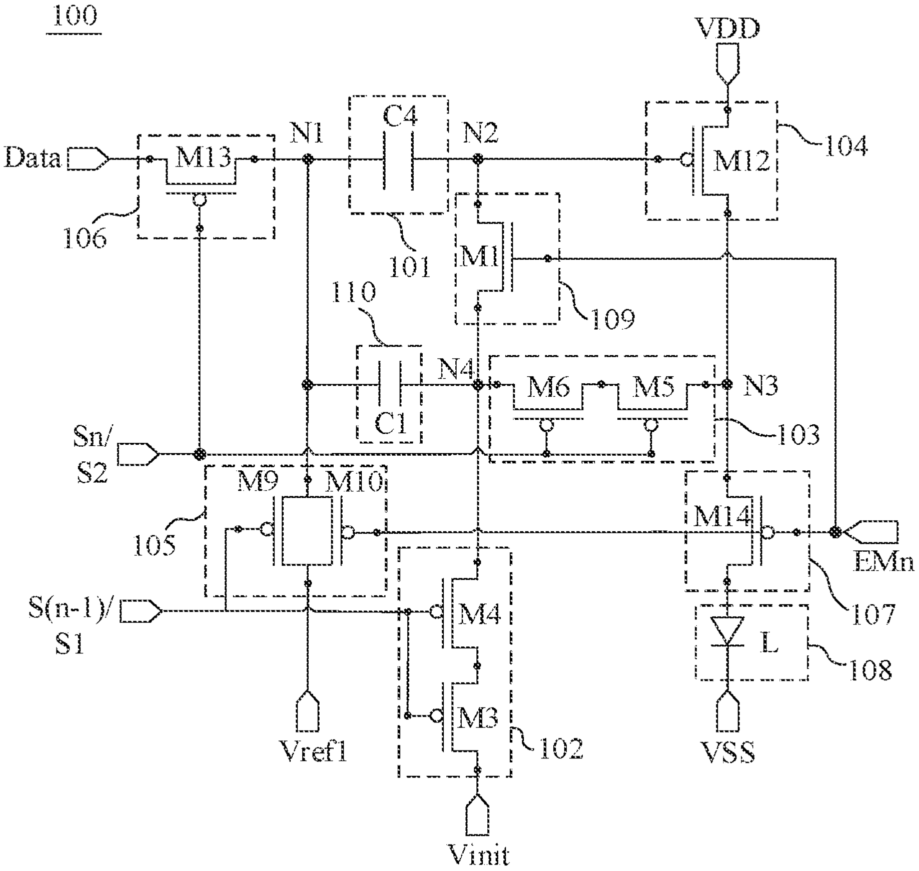

As shown in FIGS. 6C and 7C, in a case where the compensation sub-circuit 103 includes the fifth transistor M5 and the sixth transistor M6, the control electrode of the fifth transistor M5 is coupled to the second scan timing signal terminal S2, the first electrode of the fifth transistor M5 is coupled to the third node N3, and the second electrode of the fifth transistor M5 is coupled to the first electrode of the sixth transistor M6; the control electrode of the sixth transistor M6 is coupled to the second scan timing signal terminal S2, and the second electrode of the sixth transistor M6 is coupled to the fourth node N4. The fifth transistor M5 is configured to be turned on under the control of the second scan timing signal. The sixth transistor M6 is configured to: be turned on under the control of the second scan timing signal, so that the second node N2 is connected to the third node N3 due to a combined action of the sixth transistor M6, the fifth transistor M5 and the first transistor M1 that is in the on state. As a result, the control electrode is connected to the second electrode of the twelfth transistor M12, so as to cause the twelfth transistor M12 to be in the self-saturation state.

As shown in FIGS. 6B and 6C, in a case where the reference voltage sub-circuit 105 includes the ninth transistor M9 and the tenth transistor M10, the control electrode of the ninth transistor M9 is coupled to the first scan timing signal terminal S1, the first electrode of the ninth transistor M9 is coupled to the reference voltage signal terminal Vref1, and the second electrode of the ninth transistor M9 is coupled to the first node N1; the control electrode of the tenth transistor M10 is coupled to the light-emitting timing signal terminal EMn, the first electrode of the tenth transistor M10 is coupled to the reference voltage signal terminal Vref1, and the second electrode of the tenth transistor M10 is coupled to the first node N1.

The ninth transistor M9 is configured to be turned on under the control of the first scan timing signal to transmit the reference voltage signal to the first node N1. The tenth transistor M10 is configured to be turned on under the control of the light-emitting timing signal to transmit the reference voltage signal to the first node N1.

As shown in FIGS. 7B and 7C, in a case where the reference voltage sub-circuit 105 includes the eleventh transistor M11, the control electrode of the eleventh transistor M11 is coupled to the second scan timing signal terminal S2, the first electrode of the eleventh transistor M11 is coupled to the reference voltage signal terminal Vref1, and the second electrode of the eleventh transistor M11 is coupled to the first node N1. The eleventh transistor M11 is configured to transmit the reference voltage signal to the first node N1 in response to the second scan timing signal received at the second scan signal terminal. An on/off type of the eleventh transistor M11 is the same as the on/off type of the first transistor M1, for example, both of them are the N-type transistors.

The first terminal of the first capacitor C1 is coupled to the first node N1, and the second terminal of the first capacitor C1 is coupled to the second node N2.

Some embodiments of the present disclosure provide a pixel driving method, which is applied to the pixel driving circuit 100 as described above.

In the following description, the transistors except the first transistor M1 and the eleventh transistor M11 in the pixel driving circuit 100 are all the P-type transistors, the first transistor M1 and the eleventh transistor M11 are both the N-type transistors, the first voltage signal vdd transmitted by the first voltage signal terminal VDD is a high-level signal, a second voltage signal vss transmitted by the second voltage signal terminal VSS is a low-level signal, and the initial signal vinit transmitted by the initial signal terminal Vinit is a low-level signal.

As shown in FIGS. 3, 4A and 5A, the pixel driving method includes a frame period including a reset phase P1, an input and compensation phase P2 and a light-emitting phase P3.

In the reset phase P1:

the reference voltage sub-circuit 105 transmits the reference voltage signal vref received at the reference voltage signal terminal Vref1 to the first node N1 in response to the first scan timing signal s1 received at the first scan timing signal terminal S1 or the second scan timing signal s2 received at the second scan timing signal terminal S2;

the reset sub-circuit 102 transmits the initial signal vinit received at the initial signal terminal Vinit to the fourth node N4 in response to the first scan timing signal s1 received at the first scan timing signal terminal S1;

the current leakage suppression sub-circuit 109 transmits the initial signal vinit from the reset sub-circuit 102 to the second node N2 in response to the light-emitting timing signal emn, so as to reset the second node N2; and the energy storage sub-circuit 101 is charged due to the actions of the voltages of the first node N1 and the second node N2.

As shown in FIGS. 6A and 7A, in a case where the pixel driving circuit 100 further includes the accessory current leakage suppression sub-circuit 110, in the reset phase, the accessory current leakage suppression sub-circuit 110 is reset due to the actions of the voltages of the first node N1 and the fourth node N4.

For example, as shown in FIGS. 4B, 4C, 5B and 5C, in a case where each sub-circuit in the pixel driving circuit 100 includes transistor(s) or a capacitor, in the pixel driving method, "in the case where each sub-circuit in the pixel driving circuit 100 includes the transistor(s) or the capacitor" mentioned hereinafter means that, in a case where the current leakage suppression sub-circuit 109 includes the first transistor M1; the energy storage sub-circuit 101 includes the fourth capacitor C4; the driving sub-circuit 104 includes the twelfth transistor M12; the data writing sub-circuit 106 includes the thirteenth transistor M13; the light-emitting control sub-circuit 107 includes the fourteenth transistor M14; the reset sub-circuit 102 includes the third transistor M3 and the fourth transistor M4 connected in series, or the reset sub-circuit 102 includes the seventh transistor MT the compensation sub-circuit 103 includes the fifth transistor M5 and the sixth transistor M6 connected in series, or the compensation sub-circuit 103 includes the eighth transistor M8; the reference voltage sub-circuit 105 includes the ninth transistor M9 and the tenth transistor M10, or the reference voltage sub-circuit 105 includes the eleventh transistor M11, the reset phase P1 includes as follows.

For example, for a timing signal, "0" is represented as a low level, and "1" is represented as a high level.

In the reset phase P1, as shown in FIG. 3, the first scan timing signal s1 is 0, the second scan timing signal s2 is 1, and the light-emitting timing signal emn is 1.

Figure 4B:
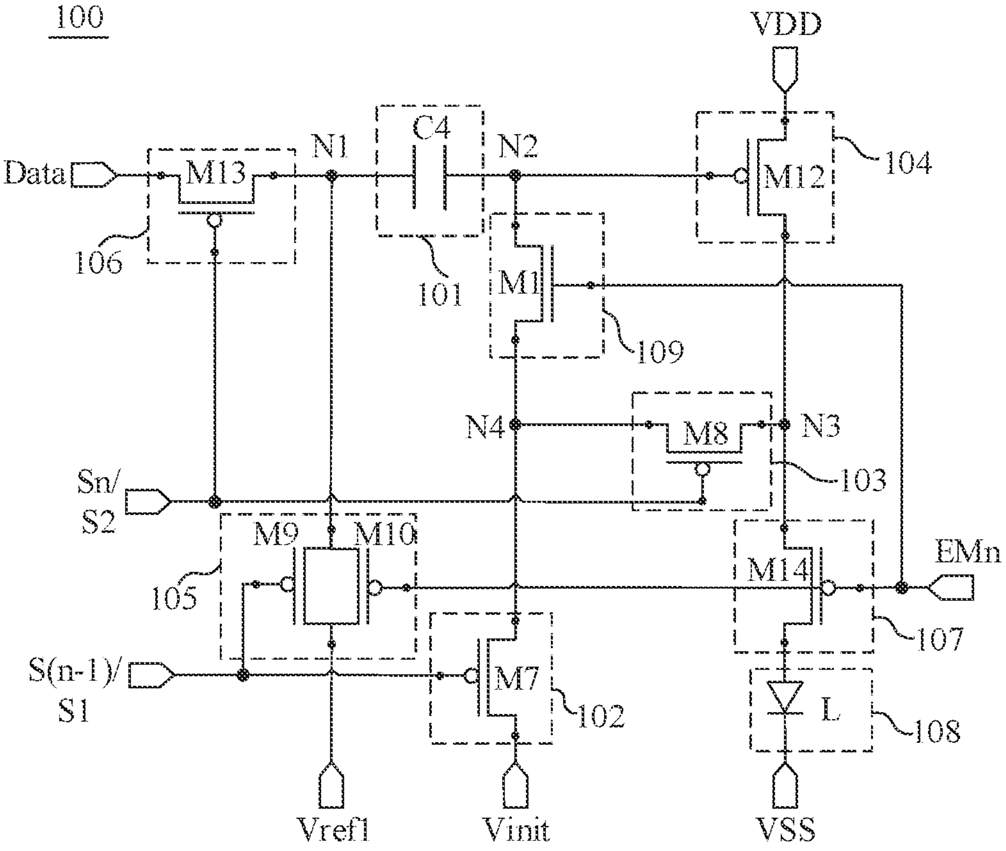
FIG. 4B is a circuit diagram of yet another pixel driving circuit, in accordance with some embodiments.

As shown in FIG. 4B, in the case where the reference voltage sub-circuit 105 includes the ninth transistor M9 and the tenth transistor M10, the ninth transistor M9 is turned on under the control of the first scan timing signal s1 to transmit the reference voltage signal vref to the first node N1.

As shown in FIG. 5B, in the case where the reference voltage sub-circuit 105 includes the eleventh transistor M11, the eleventh transistor M11 is turned on under the control of the second scan timing signal s2 to transmit the reference voltage signal vref to the first node N1.

As shown in FIG. 4B, in the case where the reset sub-circuit 102 includes the seventh transistor M7, the seventh transistor M7 is turned on under the control of the first scan timing signal s1 to transmit the initial signal vinit to the fourth node N4.

Figure 4C:
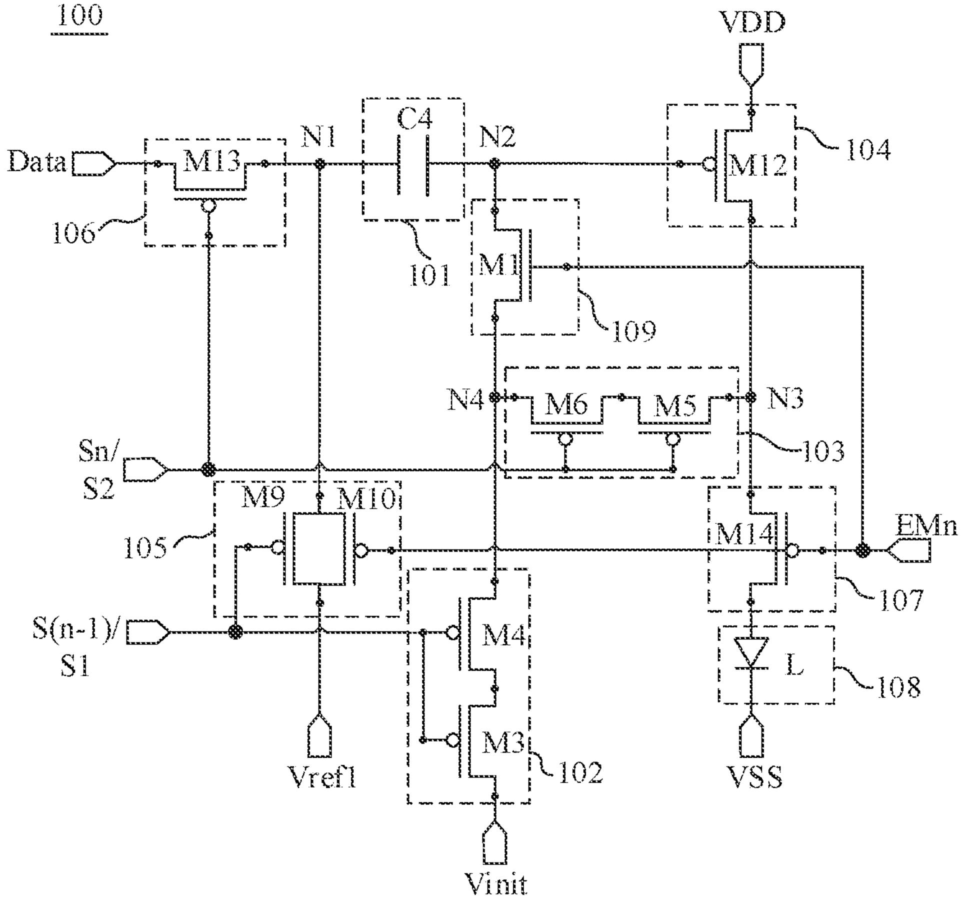
FIG. 4C is a circuit diagram of yet another pixel driving circuit, in accordance with some embodiments.

As shown in FIG. 4C, in the case where the reset sub-circuit 102 includes the third transistor M3 and the fourth transistor M4 connected in series, the third transistor M3 is turned on under the control of the first scan timing signal s1 to transmit the initial signal vinit to the first electrode of the fourth transistor M4, and the fourth transistor M4 is turned on under the control of the first scan timing signal s1 to transmit the initial signal vinit to the fourth node N4.

The first transistor M1 is turned on under the control of the light-emitting timing signal emn to transmit the initial signal vinit from the fourth node N4 to the second node N2, so as to reset the second node N2.

Voltages of the first terminal and the second terminal of the fourth capacitor C4 are respectively the voltage of the first node N1 and the voltage of the second node N2, so that the charge of the second terminal of the fourth capacitor C4 is achieved.

As shown in FIGS. 6B, 6C, 7B and 7C, in a case where the accessory current leakage suppression sub-circuit 110 includes the first capacitor C1, voltages of the first terminal and the second terminal of the first capacitor C1 are respectively the voltage of the first node N1 and the voltage of the fourth node N4, so that the reset of the second terminal of the first capacitor C1 is achieved.

The thirteenth transistor M13 and the fourteenth transistor M14 are both turned off. In the case where the reference voltage sub-circuit 105 includes the ninth transistor M9 and the tenth transistor M10, the tenth transistor M10 is turned off. The eighth transistor M8 included in the compensation sub-circuit 103 is turned off, or the fifth transistor M5 and the sixth transistor M6 included in the compensation sub-circuit 103 are both turned off.

In the input and compensation phase P2:

the data writing sub-circuit 106 transmits the data signal data received at the data signal terminal Data to the first node N1 in response to the second scan timing signal s2 received at the second scan timing signal terminal S2;

the compensation sub-circuit 103 is turned on under the control of the second scan timing signal s2, the current leakage suppression sub-circuit 109 is turned on under the control of the light-emitting timing signal emn, so that the driving sub-circuit 104 is in the self-saturation state due to a combined action of the compensation sub-circuit 103 and the current leakage suppression sub-circuit 109.

The driving sub-circuit 104 is in the self-saturation state due to the combined action of the compensation sub-circuit 103 and the current leakage suppression sub-circuit 109, generates the compensation signal according to the first voltage signal vdd received at the first voltage signal terminal VDD and the threshold voltage of the transistor in the driving sub-circuit 104, and transmits the compensation signal to the second node N2.

The energy storage sub-circuit 101 is charged due to the actions of the voltages of the first node N1 and the second node N2.

As shown in FIGS. 6A and 7A, in the case where the pixel driving circuit 100 further includes the accessory current leakage suppression sub-circuit 110, in the input and compensation phase, the accessory current leakage suppression sub-circuit 110 is charged due to the actions of the voltages of the first node N1 and the fourth node N4.

For example, as shown in FIGS. 4B, 4C, 5B and 5C, in the case where each sub-circuit in the pixel driving circuit 100 includes the transistor(s) or the capacitor, the input and compensation phase P2 includes as follows.

In the input and compensation phase P2, the first scan timing signal s1 is 1, the second scan timing signal s2 is 0, and the light-emitting timing signal emn is 1.

The thirteenth transistor M13 is turned on under the control of the second scan timing signal s2 to transmit the data signal data to the first node N1. In this case, the voltage of the first node N1 is a voltage $V_{data}$ of the data signal data, so that the voltage $V_{data}$ of the data signal data is charged into the fourth capacitor C4.

As shown in FIGS. 4B and 5B, in the case where the compensation sub-circuit 103 includes the eighth transistor M8, the eighth transistor M8 is turned on under the control of the second scan timing signal s2.

Figure 5C:
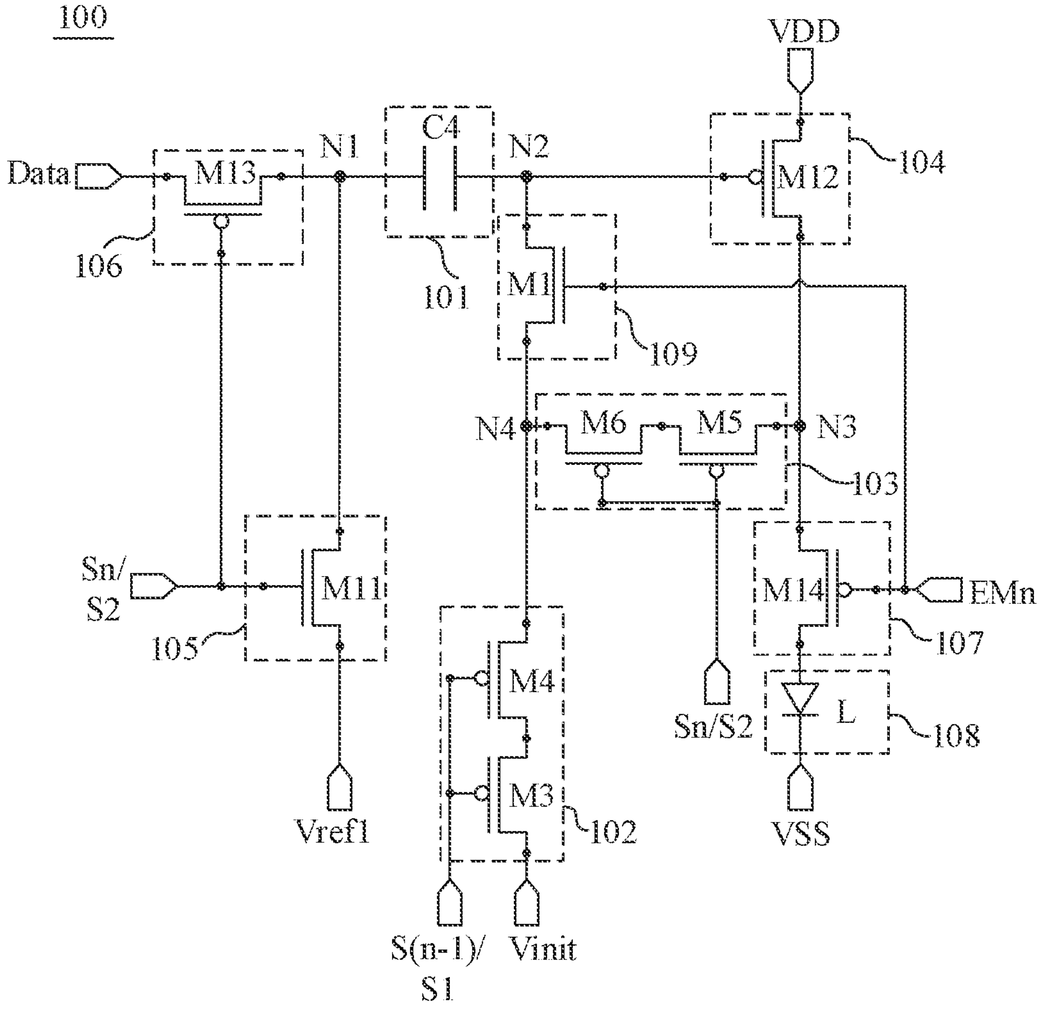
FIG. 5C is a circuit diagram of yet another pixel driving circuit, in accordance with some embodiments.

As shown in FIGS. 4C and 5C, in the case where the compensation sub-circuit 103 includes the fifth transistor M5 and the sixth transistor M6 connected in series, the fifth transistor M5 and the sixth transistor M6 are both turned on under the control of the second scan timing signal s2.

The first transistor M1 is turned on under the control of the light-emitting timing signal emn.

Due to the combined action of the eighth transistor M8 and the first transistor M1, the second node N2 is connected to the third node N3 to connect the control electrode and the second electrode of the twelfth transistor M12, so that the twelfth transistor M12 is in the self-saturation state.

The twelfth transistor M12 is in the self-saturation state, and the voltage of the control electrode of the twelfth transistor M12 is a sum of a voltage of the first electrode of the twelfth transistor M12 and the threshold voltage $V_{th}$ of the twelfth transistor M12. The first electrode of the twelfth transistor M12 is coupled to the first voltage signal terminal VDD, and the voltage of the first electrode of the twelfth transistor M12 is a voltage $V_{dd}$ of the first voltage signal vdd, and thus the voltage of the control electrode of the twelfth transistor M12 is a sum of the voltage $V_{dd}$ and the threshold voltage $V_{th}$ ($V_{dd}$+$V_{th}$). The second node N2 is coupled to the control electrode of the twelfth transistor M12, and the voltage of the second node N2 is ($V_{dd}$+$V_{th}$), so that the sum ($V_{dd}$+$V_{th}$) of the voltage $V_{dd}$ of the first voltage signal vdd and the threshold voltage $V_{th}$ of the twelfth transistor M12 is charged into the fourth capacitor C4 to achieve the writing of the threshold voltage $V_{th}$ of the driving transistor.

As shown in FIGS. 6B, 6C, 7B and 7C, in the case where the accessory current leakage suppression sub-circuit 110 includes the first capacitor C1, the voltages of the first terminal and the second terminal of the first capacitor C1 are respectively the voltage of the first node N1 and the voltage of the fourth node N4. In this case, the voltage of the first node N1 is the voltage $V_{data}$ of the data signal data, so that the voltage $V_{data}$ of the data signal data is charged into the first capacitor C1. Since the first transistor M1 is in the on state, the voltage of the fourth node N4 is equal to or approximately equal to the voltage of the second node N2, which is ($V_{dd}$+$V_{th}$). Thus, a voltage of the second terminal of the first capacitor C1 is ($V_{dd}$+$V_{th}$), and the charge of the first capacitor C1 is achieved.

In the case where the reset sub-circuit 102 includes the seventh transistor M7, the seventh transistor M7 is turned off. In the case where the reset sub-circuit 102 includes the third transistor M3 and the fourth transistor M4, the third transistor M3 and the fourth transistor M4 are both turned off. In the case where the reference voltage sub-circuit 105 includes the ninth transistor M9 and the tenth transistor M10, the ninth transistor M9 and the tenth transistor M10 are turned off. In the case where the reference voltage sub-circuit 105 includes the eleventh transistor M11, the eleventh transistor M11 is turned off. The fourteenth transistor M14 is turned off.

In the light-emitting phase P3:

as shown in FIG. 4A, in a case where the reference voltage sub-circuit 105 is coupled to the first node N1, the first scan timing signal terminal S1, the light-emitting timing signal terminal EMn and the reference voltage signal terminal Vref1, the reference voltage sub-circuit 105 transmits the reference voltage signal vref to the first node N1 in response to the light-emitting timing signal emn received at the light-emitting timing signal terminal EMn;

as shown in FIG. 5A, in a case where the reference voltage sub-circuit 105 is coupled to the first node N1, the second scan timing signal terminal S2 and the reference voltage signal terminal Vref1, the reference voltage sub-circuit 105 transmits the reference voltage signal vref to the first node N1 in response to the second scan timing signal s2;

the energy storage sub-circuit 101 couples the voltage of the second node N2 according to the voltage of the first node N1, and maintains the coupled voltage of the second node N2;

due to the coupling action of the energy storage sub-circuit 101, the driving sub-circuit 104 generates the driving signal according to the reference voltage signal vref and the data signal data and transmits the driving signal to the light-emitting control sub-circuit 107;

the light-emitting control sub-circuit 107 transmits the driving signal from the driving sub-circuit 104 to the light-emitting device 108 in response to the light-emitting timing signal emn, so as to drive the light-emitting device 108 to emit light; and the current leakage suppression sub-circuit 109 suppresses the current leakage from the second node N2 to the fourth node N4, so as to suppress the current leakage of the energy storage sub-circuit 101.

As shown in FIGS. 6A and 7A, in the case where the pixel driving circuit 100 further includes the accessory current leakage suppression sub-circuit 110, in the light-emitting phase, the accessory current leakage suppression sub-circuit 110 couples the voltage of the fourth node N4 according to the voltage of the first node N1, and maintains the coupled voltage of the fourth node N4.

For example, as shown in FIGS. 4B, 4C, 5B and 5C, in the case where each sub-circuit in the pixel driving circuit 100 includes the transistor(s) or the capacitor, the light-emitting phase P3 includes as follows.

In the light-emitting phase P3, the first scan timing signal s1 is 1, the second scan timing signal s2 is 1, and the light-emitting timing signal emn is 0.

As shown in FIGS. 4B and 4C, in the case where the reference voltage sub-circuit 105 includes the ninth transistor M9 and the tenth transistor M10, the tenth transistor M10 is turned on under the control of the light-emitting timing signal emn to transmit the reference voltage signal vref to the first node N1. The voltage of the first node N1 is changed to a voltage $V_{ref1}$ of the reference voltage signal vref.

As shown in FIGS. 5B and 5C, in the case where the reference voltage sub-circuit 105 includes the eleventh transistor M11, the eleventh transistor M11 is turned on under control of the second scan timing signal to transmit the reference voltage signal vref to the first Node N1. The voltage of the first node N1 is changed to the voltage $V_{ref1}$ of the reference voltage signal vref.

The fourth capacitor C4 couples the voltage of the second node N2 according to the voltage of the first node N1. According to the law of conservation of electric charge of the capacitance, the voltage of the first node N1 changes from the voltage $V_{data}$ of the data signal data to the voltage $V_{ref1}$ of the reference voltage signal vref (that is, the voltage of the first terminal of the fourth capacitor C4 changes from $V_{data}$ to $V_{ref1}$), so that the voltage of the second terminal of the fourth capacitor C4 also changes with the same amount (i.e., jump from ($V_{dd}+V_{th}$) to ($V_{dd}+V_{th}+V_{ref1}-V_{data}$)), and the voltage of the second node N2 is ($V_{dd}+V_{th}+V_{ref1}-V_{data}$).

The twelfth transistor M12 is turned on under the control of the voltage of the second node N2, and the twelfth transistor M12 generates the driving signal according to the reference voltage signal vref and the data signal data and outputs the driving signal.

The fourteenth transistor M14 is turned on under the control of the light-emitting timing signal emn to transmit the received driving signal to the light emitting diode L, so that the light emitting diode L emits light.

For example, the driving signal is the driving current, and the calculation formula of the driving current is:

$$I_{ds} = \frac{W}{2L} \times \mu \times C_{ox}(V_{gs} - V_{th})^2$$
$$= \frac{W}{2L} \times \mu \times C_{ox}(V_{dd} + V_{th} + V_{ref} - V_{data} - V_{dd} - V_{th})^2$$
$$= \frac{W}{2L} \times \mu \times C_{ox}(V_{ref} - V_{data})^2$$

where $I_{ds}$ is a saturation current of the twelfth transistor M12 (i.e., a working current input into the light-emitting diode L); W/L is a width-to-length ratio of a channel of the twelfth transistor M12; μ is a carrier mobility; $C_{ox}$ is a gate oxide layer capacitance per unit area of the twelfth transistor M12; $V_{gs}$ is the voltage difference between the gate and the source of the twelfth transistor M12; $V_{th}$ is the threshold voltage of the twelfth transistor M12.

It will be seen that a magnitude of the driving current generated by the twelfth transistor M12 is only related to the reference voltage signal vref and the data signal data and is not related to the threshold voltage of the twelfth transistor M12, so that the magnitude of the driving current generated by the twelfth transistor M12 is not affected by the threshold voltage of the twelfth transistor M12. Therefore, a problem that the magnitudes of the driving currents are different due to differences in the threshold voltages of the twelfth transistors M12 in all the pixel driving circuits 100 caused by a manufacturing process, so as to affect the display effect may be ameliorated, so that a uniformity of the luminance of all the light-emitting devices 108 is improved.

In the light-emitting phase P3, in a process of generating and outputting the driving signal by the twelfth transistor M12, the first transistor M1 is in the off state, and since the first transistor M1 is the oxide-thin film transistor or the a-Si thin film transistor, the leakage current thereof in the off state is relatively small. Therefore, the current leakage of the second node N2 is suppressed, an current leakage of the second terminal of the fourth capacitor C4 is suppressed, and the voltage holding rate of the fourth capacitor C4 is improved, so that the driving signal generated by the twelfth transistor M12 is more stable, and in turn, a stability of luminance of the light emitting diode L is improved.

As shown in FIGS. 6B, 6C, 7B, and 7C, in the case where the accessory current leakage suppression sub-circuit 110 includes the first capacitor C1, the first capacitor C1 couples the voltage of the fourth node N4 according to the voltage of the first node N1. According to the law of conservation of electric charge of the capacitance, the voltage of the first node N1 changes from $V_{data}$ to $V_{ref1}$ (that is, the voltage of the first terminal of the first capacitor C1 changes from $V_{data}$ to $V_{ref1}$), and thus, the voltage of the second terminal of the first capacitor C1 also changes with the same amplitude (i.e., changed from ($V_{dd}+V_{th}$) to ($V_{dd}+V_{th}+V_{ref1}-V_{data}$)), and the voltage of the fourth node N4 is ($V_{dd}+V_{th}+V_{ref1}-V_{data}$).

Therefore, the voltage of the second node N2 is equal or approximately equal to the voltage of the fourth node N4, and according to an off-state current formula of a transistor in the off state, it will be seen that when the transistor is in the off state, the amount of the leakage current of the transistor may be effectively reduced by controlling the voltage difference $V_{ds}$ between the source and the drain of the transistor to be relatively small or close to zero. The first electrode and the second electrode of the first transistor M1 are coupled between the second node N2 and the fourth node N4, so that the voltage difference $V_{ds}$ between the source and the drain of the first transistor M1 is relatively small or close to zero, which may effectively reduce the amount of the leakage current of the first transistor M1. As a result, the voltage holding rate of the fourth capacitor C4 may be further improved to make the driving signal generated by the twelfth transistor M12 more stable, and in turn, the stability of the luminance of the light emitting diode L is further improved.

Figure 8B:
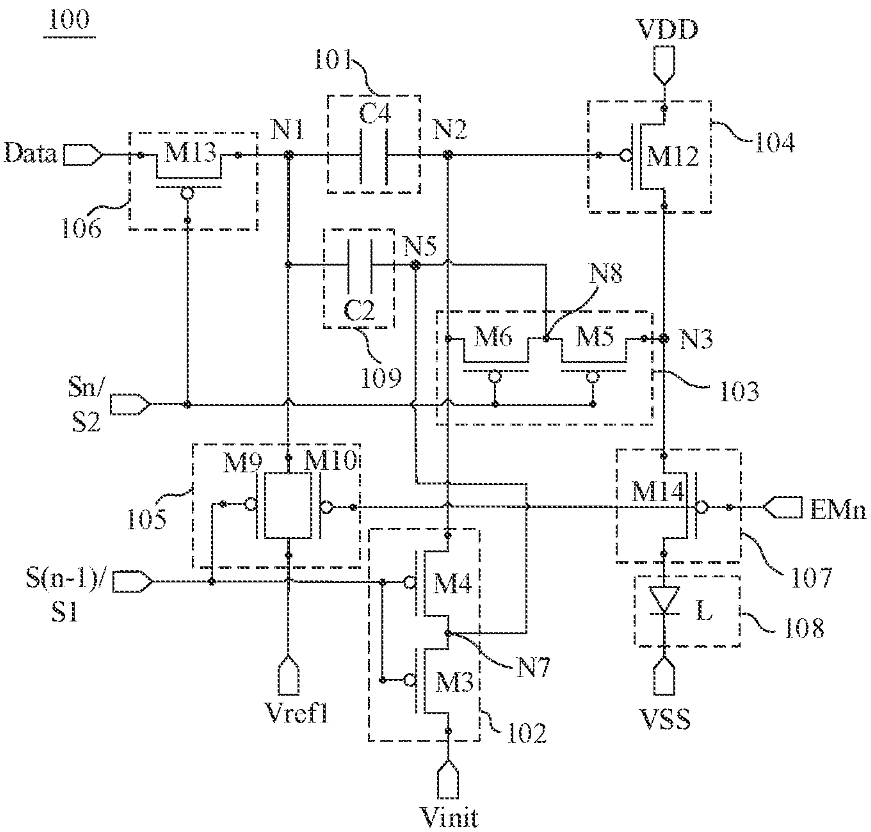
FIG. 8B is a circuit diagram of yet another pixel driving circuit, in accordance with some embodiments.

A case where, the reset sub-circuit 102 includes the third transistor M3 and the fourth transistor M4 connected in series and the compensation sub-circuit 103 includes the fifth transistor M5 and the sixth transistor M6 connected in series in the pixel driving circuit 100 is described above. As shown in FIGS. 8B and 9B, in the reset sub-circuit 102, the control electrode of the third transistor M3 is coupled to the first scan timing signal terminal S1, the first electrode of the third transistor M3 is coupled to the initial signal terminal Vinit, the second electrode of the third transistor M3 is coupled to the first electrode of the fourth transistor M4, the control electrode of the fourth transistor M4 is coupled to the first scan timing signal terminal S1, and the second electrode of the fourth transistor M4 is directly coupled to the second node N2. In the compensation sub-circuit 103, the control electrode of the fifth transistor M5 is coupled to the second scan timing signal terminal S2, the first electrode of the fifth transistor M5 is coupled to the third node N3, the second electrode of the fifth transistor M5 is coupled to the first electrode of the sixth transistor M6, the control electrode of the sixth transistor M6 is coupled to the second scan timing signal terminal S2, and the second electrode of the sixth transistor M6 is directly coupled to the second node N2.

In these structures, in the pixel driving circuit 100, there are two current leakage paths, which are respectively a fifth current leakage path from the second node N2 to the initial signal terminal Vinit via the fourth transistor M4 and the third transistor M3, and a sixth current leakage path from the second node N2 to the third node N3 via the sixth transistor M6 and the fifth transistor M5. In the light-emitting phase, the second node N2 leaks currents through the two current leakage paths.

Hereinafter, a node where the second electrode of the third transistor M3 is coupled to the first electrode of the fourth transistor M4 is referred to as a seventh node NT, and a node where the second electrode of the fifth transistor M5 is coupled to the first electrode of the sixth transistor M6 is referred to as an eighth node N8. It will be understood that, the fourth transistor M4 is coupled between the second node N2 and the seventh node N7, and a voltage difference between a source and a drain of the fourth transistor M4 is a voltage difference between the second node N2 and the seventh node N7. The sixth transistor M6 is coupled between the second node N2 and the eighth node N8, and a voltage difference between a source and a drain of the sixth transistor M6 is a voltage difference between the second node N2 and the eighth node N8.

According to the off-state current formula of the transistor in the off state, it will be seen that when the transistor is in the off state, the amount of the leakage current of the transistor may be effectively reduced by controlling the voltage difference Vs between the source and the drain of the transistor to be relatively small or close to zero. Therefore, in the light-emitting phase, if the voltage of the seventh node N7 is controlled to be close to the voltage of the second node N2, and the voltage of the eighth node N8 is controlled to be close to the voltage of the second node N2, the voltage difference between the source and the drain of the fourth transistor M4 and the voltage difference between the source and the drain of the sixth transistor M6 may be effectively reduced, so that the amounts of the leakage current of the fourth transistor M4 and the sixth transistor M6 may be effectively reduced, and in turn, current leakage of the second node N2 through the above two current leakage paths may be suppressed.

Based on the case where the reset sub-circuit 102 includes the third transistor M3 and the fourth transistor M4 connected in series, and the compensation sub-circuit 103 includes the fifth transistor M5 and the sixth transistor M6 connected in series, another exemplary structure of the current leakage suppression sub-circuit 109 is described below.

Figure 9A:
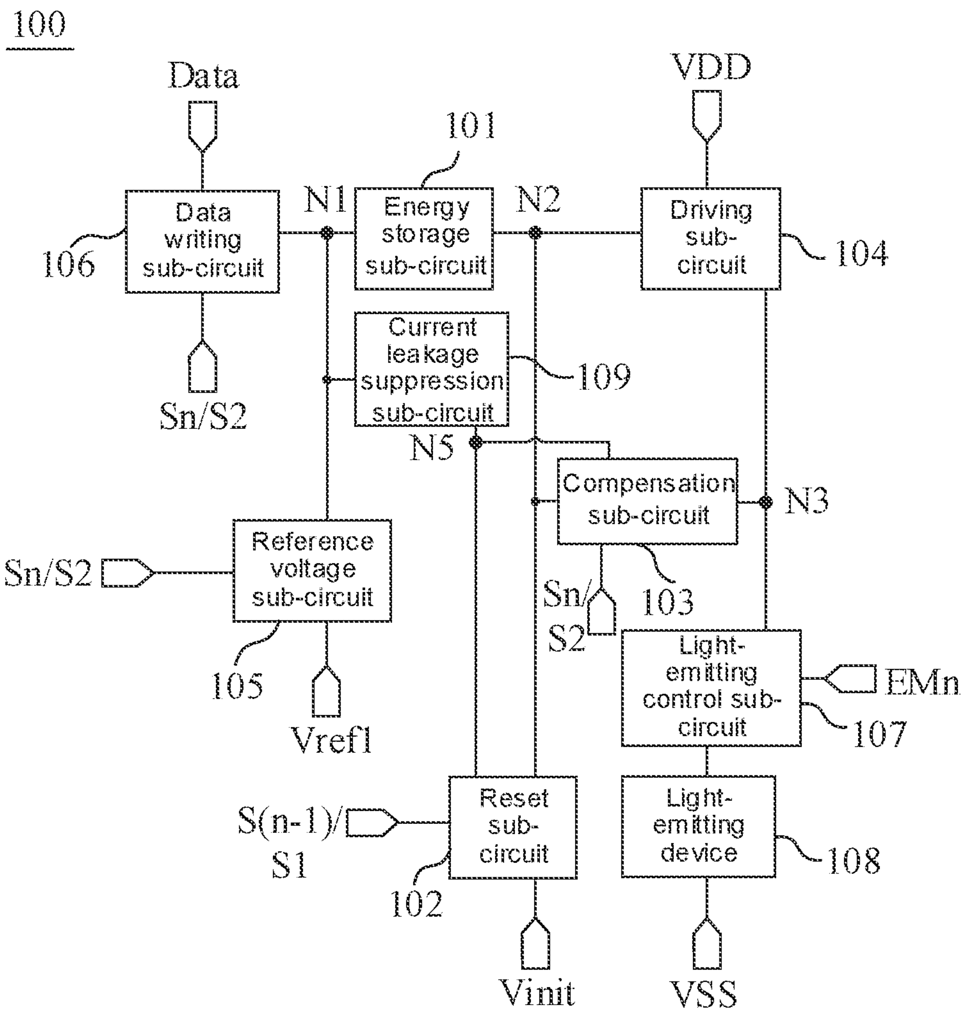
FIG. 9A is a structural diagram of yet another pixel driving circuit, in accordance with some embodiments.
Figure 9B:
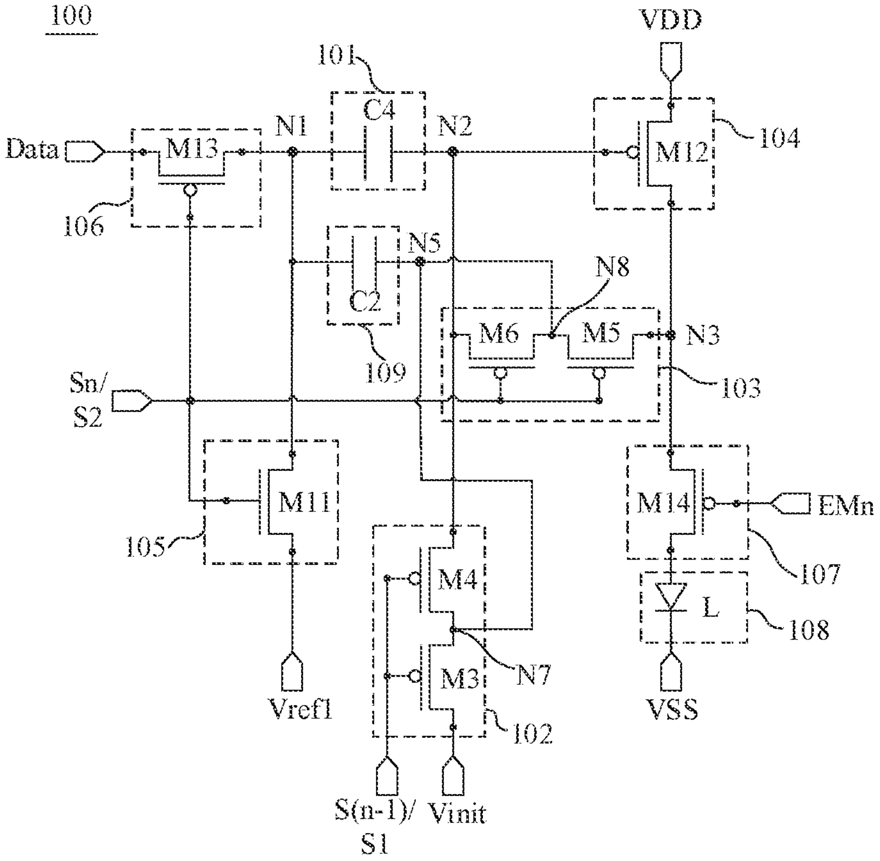
FIG. 9B is a circuit diagram of yet another pixel driving circuit, in accordance with some embodiments.

As shown in FIGS. 8A and 9A, in some embodiments, the current leakage suppression sub-circuit 109 is coupled to the first node N1, so that the current leakage suppression sub-circuit 109 is coupled to the energy storage sub-circuit 101 through the first node N1.

The reset sub-circuit 102 and the compensation sub-circuit 103 are both directly coupled to the second node N2.

The current leakage suppression sub-circuit 109, the compensation sub-circuit 103 and the reset sub-circuit 102 are each coupled to a fifth node N5.

The fifth node N5 is further coupled to the seventh node N7 and the eighth node N8. That is, the first electrode of the fourth transistor M4 in the reset sub-circuit 102 is further coupled to the fifth node N5, and the first electrode of the sixth transistor M6 in the compensation sub-circuit 103 is further coupled to the fifth node N5.

The current leakage suppression sub-circuit 109 is configured to: be charged due to actions of voltages of the first node N1 and the fifth node N5; couple the voltage of the fifth node N5 according to the voltage of the first node N1, so that the voltage of the fifth node N5 is kept equal or approximately equal to the voltage of the second node N2; and maintain a coupled voltage of the fifth node N5 to suppress the current leakage of the second node N2.

Since the fifth node N5 is further coupled to the seventh node N7 and the eighth node N8, the voltage of the fifth node N5 is equal to the voltage of the seventh node N7 and the voltage of the eighth node N8 regardless of resistances of connection lines. Therefore, the current leakage suppression sub-circuit 109 is capable of maintaining the voltage of the fifth node N5 equal or approximately equal to the voltage of the second node N2, that is, the current leakage suppression sub-circuit 109 is capable of keeping the voltage of the seventh node N7 equal or approximately equal to the voltage of the second node N2, and keeping the voltage of the eighth node N8 equal or approximately equal to the voltage of the second node N2. Therefore, in this case, the voltage difference between the source and the drain of the fourth transistor M4 is relatively small or close to zero, and the voltage difference between the source and the drain of the sixth transistor M6 is relatively small or close to zero, so that the amounts of the leakage current of the fourth transistor M4 and the sixth transistor M6 may be effectively reduced; as a result, the current leakages of the second node N2 through the fifth current leakage path and the sixth current leakage path may be suppressed, and in turn, the voltage of the second node N2 may be kept constant for a long time, and the voltage holding rate of the fourth capacitor C4 is improved.

In some embodiments, as shown in FIGS. 8B and 9B, the current leakage suppression sub-circuit 109 includes a second capacitor C2; a first terminal of the second capacitor C2 is coupled to the first node N1, and a second terminal of the second capacitor C2 is coupled to the fifth node N5. The second capacitor C2 is configured to: be charged due to the actions of the first node N1 and the fifth node N5; couple the voltage of the fifth node N5 according to the voltage of the first node N1 when the voltage of the first node N1 changes, so that the voltage of the fifth node N5 changes similarly, and the coupled voltage of the fifth node N5 is kept equal or approximately equal to the coupled voltage of the second node N2; and maintain the coupled voltage of the fifth node N5.

A specific analysis of a process that the second capacitor C2 suppresses the current leakage of the second node N2 is as follows.

The second capacitor C2 and the fourth capacitor C4 are both coupled to the first node N1, so that the voltage of the first terminal of the second capacitor C2 is equal to the voltage of the first terminal of the fourth capacitor C4.

The fourth transistor M4 in the reset sub-circuit 102 is coupled between the second node N2 and the seventh node N7, and the sixth transistor M6 in the compensation sub-circuit 103 is coupled between the second node N2 and the eighth node N8. In the reset phase, the fourth transistor M4 is in the on state under the control of the first scan timing signal s1, so that the voltage of the second node N2 is equal to or approximately equal to the voltage of the seventh node N7; since the fifth node N5 is coupled to the seventh node N7 and the eighth node N8, the voltage of the fifth node N5 and the voltage of the eighth node N8 are both equal to or approximately equal to the voltage of the second node N2.

In the input and compensation phase, the sixth transistor M6 is in the on state under control of the second scan timing signal terminal S2, so that the voltage of the second node N2 is equal to or approximately equal to the voltage of the eighth node N8; since the fifth node N5 is coupled to the seventh node N7 and the eighth node N8, the voltage of the fifth node N5 and the voltage of the seventh node N7 are both equal to or approximately equal to the voltage of the second node N2. That is, before the light-emitting phase, the voltage of the second node N2 is always equal to or approximately equal to the voltage of the fifth node N5, the voltage of the seventh node N7 and the voltage of the eighth node N8.

In the light-emitting phase, when the signal written into the first node N1 changes from the data signal data to the reference voltage signal vref, the voltage of the first node N1 changes, and the fourth capacitor C4 couples the voltage of the second node N2 according to the voltage of the first node N1, so that the voltage of the second node N2 suddenly changes; similarly, the second capacitor couples the voltage of the fifth node N5 according to the voltage of the first node N1, so that the voltage of the fifth node N5 suddenly changes, and an amplitude of the change of the voltage of the fifth node N5 is equal to the amplitude of the change of the voltage of the second node N2. As a result, the coupled voltage of the second node N2 is equal or approximately equal to the coupled voltage of the fifth node N5.

The fifth node N5 is further coupled to the seventh node N7 and the eighth node N8, in this case, the voltage of the seventh node N7 and the voltage of the eighth node N8 are both equal to or approximately equal to the coupled voltage of the fifth node N5, so that the voltage of the seventh node N7 and the voltage of the eighth node N8 are both equal to or approximately equal to the coupled voltage of the second node N2.

In this way, the voltage difference between the source and the drain of the fourth transistor M4 and the voltage difference between the source and the drain of the sixth transistor M6 are both relatively small or close to zero, so that the amounts of the leakage current of the fourth transistor M4 and the sixth transistor M6 are both significantly reduced, the current leakage from the second node N2 to the seventh node N7 through the fourth transistor M4 is suppressed, and the current leakage from the second node N2 to the eighth node N8 through the sixth transistor M6 is suppressed. As a result, amounts of the current leakages of the second node N2 through the fifth current leakage path and the sixth current leakage path are both reduced, and the voltage holding rate of the fourth capacitor C4 is improved.

In some embodiments, as shown in FIGS. 9A and 9B, based on the structure of the current leakage suppression sub-circuit 109 mentioned above, in the pixel driving circuit 100 provided by the embodiments of the present disclosure, in the case where the reference voltage sub-circuit 105 is coupled to the second scan timing signal terminal S2, the reference voltage sub-circuit 105 includes the eleventh transistor M11. As for a solution that the reference voltage sub-circuit 105 includes the eleventh transistor M11, reference may be made to the foregoing descriptions, and details will not be repeated here.

On this basis, other specific circuit structures of the pixel driving circuits 100 provided by some embodiments of the present disclosure will be integrally and exemplarily described below.

As shown in FIGS. 8B and 9B, the pixel driving circuit 100 includes the energy storage sub-circuit 101, the reset sub-circuit 102, the compensation sub-circuit 103, the driving sub-circuit 104, the reference voltage sub-circuit 105, the data writing sub-circuit 106, the light-emitting control sub-circuit 107, and the current leakage suppression sub-circuit 109.

The current leakage suppression sub-circuit 109 is coupled to the first node N1, and the reset sub-circuit 102 and the compensation sub-circuit 103 are both directly coupled to the second node N2. The current leakage suppression sub-circuit 109, the compensation sub-circuit 103 and the reset sub-circuit 102 are all coupled to the fifth node N5. The current leakage suppression sub-circuit 109 includes the second capacitor C2.

The energy storage sub-circuit 101 includes the fourth capacitor C4; the driving sub-circuit 104 includes the twelfth transistor M12; the data writing sub-circuit 106 includes the thirteenth transistor M13; the light-emitting control sub-circuit 107 includes the fourteenth transistor M14.

The reset sub-circuit 102 includes the third transistor M3 and the fourth transistor M4 connected in series. The compensation sub-circuit 103 includes the fifth transistor M5 and the sixth transistor M6 connected in series.

The reference voltage sub-circuit 105 includes the ninth transistor M9 and the tenth transistor M10; alternatively, the reference voltage sub-circuit 105 includes the eleventh transistor M11.

The first terminal of the second capacitor C2 is coupled to the first node N1, and the second terminal of the second capacitor C2 is coupled to the fifth node N5. The second capacitor C2 is configured to: be charged due to the actions of the first node N1 and the fifth node N5; couple the voltage of the fifth node N5 according to the voltage of the first node N1 when the voltage of the first node N1 changes, so that the voltage of the fifth node N5 changes similarly, and the coupled voltage of the fifth node N5 is kept equal or approximately equal to the coupled voltage of the second node N2; and maintain the coupled voltage of the fifth node N5.

The first terminal (the reference voltage terminal) of the fourth capacitor C4 is coupled to the first node N1, and the second terminal (the signal holding terminal) of the fourth capacitor C4 is coupled to the second node N2. The fourth capacitor C4 is configured to: be charged due to the actions of the voltages of the first node N1 and the second node N2; couple the voltage of the second node N2 according to the voltage of the first node N1 when the voltage of the first node N1 changes, so that the voltage of the second node N2 changes with the same amplitude; and maintain the coupled voltage of the second node N2.

The control electrode of the twelfth transistor M12 is coupled to the second node N2, the first electrode of the twelfth transistor M12 is coupled to the first voltage signal terminal VDD, and the second electrode of the twelfth transistor M12 is coupled to the third node N3. The twelfth transistor M12 is configured to: be turned on under the control of the voltage of the second node N2; be in the self-saturation state due to the action of the compensation sub-circuit 103; generate the compensation signal according to the first voltage signal and the threshold voltage of the twelfth transistor M12; and transmit the compensation signal to the second node N2. The twelfth transistor M12 is further configured to be turned on under the control of the voltage of the second node N2, and generate and output the driving signal.

The control electrode of the thirteenth transistor M13 is coupled to the second scan timing signal terminal S2, the first electrode of the thirteenth transistor M13 is coupled to the data signal terminal Data, and the second electrode of the thirteenth transistor M13 is coupled to the first node N1. The thirteenth transistor M13 is configured to be turned on under the control of the second scan timing signal to transmit the data signal to the first node N1.

The control electrode of the fourteenth transistor M14 is coupled to the light-emitting timing signal terminal EMn, the first electrode of the fourteenth transistor M14 is coupled to the third node N3, and the second electrode of the fourteenth transistor M14 is coupled to the light-emitting device 108. The fourteenth transistor M14 is configured to be turned on under the control of the light-emitting timing signal to transmit the driving signal from the twelfth transistor M12 to the light-emitting device 108, so as to drive the light-emitting device 108 to emit light.

For example, the light-emitting device 108 includes the light emitting diode L, the anode of the light emitting diode L is coupled to the second electrode of the fourteenth transistor M14, and the cathode of the light emitting diode L is coupled to the second voltage signal terminal VSS. The light emitting diode L may be, for example, the organic light emitting diode L or the micro light emitting diode L.

The control electrode of the third transistor M3 is coupled to the first scan timing signal terminal S1, the first electrode of the third transistor M3 is coupled to the initial signal terminal Vinit, the second electrode of the third transistor M3 is coupled to the first electrode of the fourth transistor M4, the control electrode of the fourth transistor M4 is coupled to the first scan timing signal terminal S1, and the second electrode of the fourth transistor M4 is coupled to the second node N2. The first electrode of the fourth transistor M4 is further coupled to the fifth node N5.

The third transistor M3 is configured to be turned on under the control of the first scan timing signal to transmit the initial signal to the first electrode of the fourth transistor M4; the fourth transistor M4 is configured to be turned on under the control of the first scan timing signal to transmit the initial signal to the fourth node N4, so that the initial signal is transmitted to the second node N2 through the first transistor M1 to reset the second node N2.

The control electrode of the fifth transistor M5 is coupled to the second scan timing signal terminal S2, the first electrode of the fifth transistor M5 is coupled to the third node N3, the second electrode of the fifth transistor M5 is coupled to the first electrode of the sixth transistor M6, the control electrode of the sixth transistor M6 is coupled to the second scan timing signal terminal S2, and the second electrode of the sixth transistor M6 is coupled to the fourth node N4. The first electrode of the sixth transistor M6 is further coupled to the fifth node N5.

The fifth transistor M5 is configured to be turned on under the control of the second scan timing signal, and the sixth transistor M6 is configured to be turned on under the control of the second scan timing signal. The second node N2 is connected to the third node N3 due to a combined action of the fifth transistor M5 and the sixth transistor M6, so as to connect the control electrode and the second electrode of the twelfth transistor M12 to cause the twelfth transistor M12 to be in the self-saturation state.

As shown in FIG. 8B, in the case where the reference voltage sub-circuit 105 includes the ninth transistor M9 and the tenth transistor M10, the control electrode of the ninth transistor M9 is coupled to the first scan timing signal terminal S1, the first electrode of the ninth transistor M9 is coupled to the reference voltage signal terminal Vref1, and the second electrode of the ninth transistor M9 is coupled to the first node N1. The control electrode of the tenth transistor M10 is coupled to the light-emitting timing signal terminal EMn, the first electrode of the tenth transistor M10 is coupled to the reference voltage signal terminal Vref1, and the second electrode of the tenth transistor M10 is coupled to the first node N1.

The ninth transistor M9 is configured to be turned on under the control of the first scan timing signal to transmit the reference voltage signal to the first node N1. The tenth transistor M10 is configured to be turned on under the control of the light-emitting timing signal to transmit the reference voltage signal to the first node N1.

As shown in FIG. 9B, in the case where the reference voltage sub-circuit 105 includes the eleventh transistor M11, the control electrode of the eleventh transistor M11 is coupled to the second scan timing signal terminal S2, the first electrode of the eleventh transistor M11 is coupled to the reference voltage signal terminal Vref1, and the second electrode of the eleventh transistor M11 is coupled to the first node N1. The eleventh transistor M11 is configured to transmit the reference voltage signal to the first node N1 in response to the second scan timing signal received at the second scan timing signal terminal.

The on/off type of the eleventh transistor M11 is opposite to on/off types of transistors except the eleventh transistor M11 in the pixel driving circuit 100. For example, in the pixel driving circuit 100 as shown in FIG. 9B, the eleventh transistor M11 is the N-type oxide-thin film transistor, and the transistors except the eleventh transistor M11 are all the P-type transistors.

Some embodiments of the present disclosure provide a pixel driving method, which is applied to the pixel driving circuit 100 as described above.

In the following description, the transistors except the eleventh transistor M11 in the pixel driving circuit 100 are all the P-type transistors, the eleventh transistor M11 is the N-type transistor, the first voltage signal vdd transmitted by the first voltage signal terminal VDD is a high-level signal, the second voltage signal vss transmitted by the second voltage signal terminal VSS is a low-level signal, and the initial signal vinit transmitted by the initial signal terminal Vinit is a low-level signal.

As shown in FIGS. 3, 8A to 9B, the pixel driving method includes a frame period including a reset phase P1, an input and compensation phase P2 and a light-emitting phase P3.

In the reset phase P1:

the reference voltage sub-circuit 105 transmits the reference voltage signal vref received at the reference voltage signal terminal Vref1 to the first node N1 in response to the first scan timing signal s1 received at the first scan timing signal terminal S1 or the second scan timing signal s2 received at the second scan timing signal terminal S2;

the reset sub-circuit 102 transmits the initial signal vinit received at the initial signal terminal Vinit to the second node N2 in response to the first scan timing signal s1 received at the first scan timing signal terminal S1; in this case, since the fourth transistor M4 in the reset sub-circuit 102 is in the on state, the voltage of the seventh node N7 is equal to the voltage of the second node N2; and since the seventh node N7 is coupled to the fifth node N5, the voltage of the fifth node N5 is equal to the voltage of the seventh node N7; thus, it is equivalent to transmitting the initial signal vinit to the fifth node N5 by the reset sub-circuit 102;

the energy storage sub-circuit 101 is charged due to the actions of the voltages of the first node N1 and the second node N2; and the current leakage suppression sub-circuit 109 is charged due to the actions of the voltages of the first node N1 and the fifth node N5.

For example, as shown in FIGS. 9B and 9B, in a case where each sub-circuit in the pixel driving circuit 100 includes transistor(s) or a capacitor, in the pixel driving method, "in the case where each sub-circuit in the pixel driving circuit 100 includes the transistor(s) or the capacitor" mentioned hereinafter means that, in a case where the current leakage suppression sub-circuit 109 includes the second capacitor C2; the energy storage sub-circuit 101 includes the fourth capacitor C4; the driving sub-circuit 104 includes the twelfth transistor M12; the data writing sub-circuit 106 includes the thirteenth transistor M13; the light-emitting control sub-circuit 107 includes the fourteenth transistor M14; the reset sub-circuit 102 includes the third transistor M3 and the fourth transistor M4 connected in series' the compensation sub-circuit 103 includes the fifth transistor M5 and the sixth transistor M6 connected in series; the reference voltage sub-circuit 105 includes the ninth transistor M9 and the tenth transistor M10, or the reference voltage sub-circuit 105 includes the eleventh transistor M11, the reset phase P1 includes as follows.

For example, for the timing signal, "0" is represented as a low level, and "1" is represented as a high level.

In the reset phase P1, the first scan timing signal s1 is 0, the second scan timing signal s2 is 1, and the light-emitting timing signal emn is 1.

As shown in FIG. 8B, in the case where the reference voltage sub-circuit 105 includes the ninth transistor M9 and the tenth transistor M10, the ninth transistor M9 is turned on under the control of the first scan timing signal s1 to transmit the reference voltage signal vref to the first node N1.

As shown in FIG. 9B, in the case where the reference voltage sub-circuit 105 includes the eleventh transistor M11, the eleventh transistor M11 is turned on under the control of the second scan timing signal s2 to transmit the reference voltage signal vref to the first node N1.

The third transistor M3 is turned on under the control of the first scan timing signal s1 to transmit the initial signal vinit to the first electrode of the fourth transistor M4, and the fourth transistor M4 is turned on under the control of the first scan timing signal s1 to transmit the initial signal vinit to the second node N2. Since the fourth transistor M4 is in the on state, the voltage of the seventh node N7 is equal to or approximately equal to the voltage of the second node N2, and the voltage of the fifth node N5, the voltage of the seventh node N7 and the voltage of the second node N2 are all the voltage of the initial signal vinit.

The voltages of the first terminal and the second terminal of the fourth capacitor C4 are respectively the voltage of the first node N1 and the voltage of the second node N2, so that the charge of the second terminal of the fourth capacitor C4 is achieved.

Voltages of the first terminal and the second terminal of the second capacitor C2 are respectively the voltage of the first node N1 and the voltage of the fifth node N5, so that the charge of the second terminal of the fourth capacitor C4 is achieved.

The thirteenth transistor M13 and the fourteenth transistor M14 are both turned off. In the case where the reference voltage sub-circuit 105 includes the ninth transistor M9 and the tenth transistor M10, the tenth transistor M10 is turned off. The fifth transistor M5 and the sixth transistor M6 included in the compensation sub-circuit 103 are both turned off.

In the input and compensation phase P2:

the data writing sub-circuit 106 transmits the data signal data received at the data signal terminal Data to the first node N1 in response to the second scan timing signal s2 received at the second scan timing signal terminal S2;

the compensation sub-circuit 103 is turned on under the control of the second scan timing signal s2 to cause the driving sub-circuit 104 to be in the self-saturation state;

the driving sub-circuit 104 is in the self-saturation state due to the action of the compensation sub-circuit 103, generates the compensation signal according to the first voltage signal vdd received at the first voltage signal terminal VDD and the threshold voltage of the transistor in the driving sub-circuit 104, and transmits the compensation signal to the second node N2;

in this case, since the sixth transistor M6 in the compensation sub-circuit 103 is in the on state, the voltage of the eighth node N8 is equal to or approximately equal to the voltage of the second node N2; and since the eighth node NB is coupled to the fifth node N5, the voltage of the fifth node N5 is equal to or approximately equal to the voltage of the second node N2; thus, it is equivalent to transmitting the compensation signal to the fifth node N5 by the driving sub-circuit 104;

the energy storage sub-circuit 101 is charged due to the actions of the voltages of the first node N1 and the second node N2; and the current leakage suppression sub-circuit 109 is charged due to the actions of the voltages of the first node N1 and the fifth node N5.

For example, as shown in FIGS. 38B and 9B, in the case where each sub-circuit in the pixel driving circuit 100 includes the transistor(s) or the capacitor, the input and compensation phase P2 includes as follows.

In the input and compensation phase P2, the first scan timing signal s1 is 1, the second scan timing signal s2 is 0, and the light-emitting timing signal emn is 1.

The thirteenth transistor M13 is turned on under the control of the second scan timing signal s2 to transmit the data signal data to the first node N1. In this case, the voltage of the first node N1 is the voltage $V_{data}$ of the data signal data, so that the voltage $V_{data}$ of the data signal data is charged into the fourth capacitor C4 and the second capacitor C2.

The fifth transistor M5 and the sixth transistor M6 are both turned on under the control of the second scan timing signal s2, so that the second node N2 is connected to the third node N3. As a result, the control electrode and the second electrode of the twelfth transistor M12 are connected to each other, and the twelfth transistor M12 is in the self-saturation state.

The twelfth transistor M12 is in the self-saturation state, and the voltage of the control electrode of the twelfth transistor M12 is a sum of the voltage of the first electrode of the twelfth transistor M12 and the threshold voltage $V_{th}$ of the twelfth transistor M12. The first electrode of the twelfth transistor M12 is coupled to the first voltage signal terminal VDD, and the voltage of the first electrode of the twelfth transistor M12 is a voltage $V_{dd}$ of the first voltage signal vdd, and thus the voltage of the control electrode of the twelfth transistor M12 is a sum of the voltage $V_{dd}$ and the threshold voltage $V_{th}$ ($V_{dd}$+$V_{th}$). The second node N2 is coupled to the control electrode of the twelfth transistor M12, and the voltage of the second node N2 is ($V_{dd}$+$V_{th}$), so that the sum ($V_{dd}$+$V_{th}$) of the voltage $V_{dd}$ of the first voltage signal vdd and the threshold voltage $V_{th}$ of the twelfth transistor M12 is charged into the fourth capacitor C4 to achieve the writing of the threshold voltage $V_{th}$ of the driving transistor.

In this case, since the sixth transistor MG is in the on state, the voltage of the eighth node N8 is equal to or approximately equal to the voltage of the second node N2; and since the eighth node N8 is coupled to the fifth node N5, the voltage of the fifth node N5 is equal to or approximately equal to the voltage of the second node N2. The voltage of the fifth node N5 is ($V_{dd}$+$V_{th}$), the second capacitor C2 is charged due to the actions of the first node N1 and the fifth node N5, and a voltage of the second terminal of the second capacitor C2 is ($V_{dd}$+$V_{th}$).

The third transistor M3 and the fourth transistor M4 are both turned off. In the case where the reference voltage sub-circuit 105 includes the ninth transistor M9 and the tenth transistor M10, the ninth transistor M9 and the tenth transistor M10 are turned off. In the case where the reference voltage sub-circuit 105 includes the eleventh transistor M11, the eleventh transistor M11 is turned off. The fourteenth transistor M14 is turned off.

In the light-emitting phase P3:

As shown in FIG. 8A, in the case where the reference voltage sub-circuit 105 is coupled to the first node N1, the first scan timing signal terminal S1, the light-emitting timing signal terminal EMn and the reference voltage signal terminal Vref1, the reference voltage sub-circuit 105 transmits the reference voltage signal vref to the first node N1 in response to the light-emitting timing signal emn received at the light-emitting timing signal terminal EMn.

As shown in FIG. 9A, in the case where the reference voltage sub-circuit 105 is coupled to the first node N1, the second scan timing signal terminal S2 and the reference voltage signal terminal Vref1, the reference voltage sub-circuit 105 transmits the reference voltage signal vref to the first node N1 in response to the second scan timing signal s2.

The energy storage sub-circuit 101 couples the voltage of the second node N2 according to the voltage of the first node N1, and maintains the coupled voltage of the second node N2.

Due to the coupling action of the energy storage sub-circuit 101, the driving sub-circuit 104 generates the driving signal according to the data signal data and the reference voltage signal vref, and transmits the driving signal to the light-emitting control sub-circuit 107.

The light-emitting control sub-circuit 107 transmits the driving signal from the driving sub-circuit 104 to the light-emitting device 108 in response to the light-emitting timing signal emn, so as to drive the light-emitting device 108 to emit light.

The current leakage suppression sub-circuit 109 couples the voltage of the fifth node N5 according to the voltage of the first node N1, so that the change of the voltage of the fifth node N5 consistent with the change of the voltage of the second node N2; and the current leakage suppression sub-circuit 109 maintains the coupled voltage of the fifth node N5 to suppress the current leakage of the second node N2.

For example, as shown in FIGS. 8B and 9B, in the case where each sub-circuit in the pixel driving circuit 100 includes the transistor(s) or the capacitor, the light-emitting phase P3 includes as follows.

In the light-emitting phase P3, the first scan timing signal s1 is 1, the second scan timing signal s2 is 1, and the light-emitting timing signal emn is 0.

As shown in FIG. 8B, in the case where the reference voltage sub-circuit 105 includes the ninth transistor M9 and the tenth transistor M10, the tenth transistor M10 is turned on under the control of the light-emitting timing signal emn to transmit the reference voltage signal vref to the first node N1. The voltage of the first node N1 is changed to the voltage $V_{ref1}$ of the reference voltage signal vref.

As shown in FIG. 9B, in the case where the reference voltage sub-circuit 105 includes the eleventh transistor M11, the eleventh transistor M11 is turned on under the control of the second scan timing signal s2 to transmit the reference voltage signal vref to the first Node N1. The voltage of the first node N1 is changed to the voltage $V_{ref1}$ of the reference voltage signal vref.

The fourth capacitor C4 couples the voltage of the second node N2 according to the voltage of the first node N1. According to the law of conservation of electric charge of the capacitance, the voltage of the first node N1 changes from the voltage $V_{data}$ of the data signal data to the voltage $V_{ref1}$ of the reference voltage signal vref (that is, the voltage of the first terminal of the fourth capacitor C4 changes from $V_{data}$ to $V_{ref1}$), so that the voltage of the second terminal of the fourth capacitor C4 also changes with the same amount, (i.e., jump from $(V_{dd}+V_{th})$ to $(V_{dd}+V_{th}+V_{ref1}-V_{data})$), and the voltage of the second node N2 is $(V_{dd}+V_{th}+V_{ref1}-V_{data})$.

The twelfth transistor M12 is turned on under the control of the voltage of the second node N2, and the twelfth transistor M12 generates the driving signal according to the reference voltage signal vref and the data signal data, and outputs the driving signal.

The fourteenth transistor M14 is turned on under the control of the light-emitting timing signal emn to transmit the received driving signal to the light emitting diode L, so that the light emitting diode L emits light.

A magnitude of the driving signal is not related to the threshold voltage of the twelfth transistor M12, so that an influence of a threshold voltage of the driving transistor on the display effect is avoided. As for details, reference may be made to the foregoing descriptions, which will not be repeated here.

In the process of generating and outputting the driving signal by the twelfth transistor M12, the second capacitor C2 play a role of suppressing the current leakage. The second capacitor C2 couples the voltage of the fifth node N5 according to the voltage of the first node N1. According to the law of conservation of electric charge of the capacitance, the voltage of the first node N1 changes from the voltage $V_{data}$ of the data signal data to the voltage $V_{ref1}$ of the reference voltage signal vref (that is, the voltage of the first terminal of the second capacitor C2 changes from $V_{data}$ to $V_{ref1}$), so that the voltage of the second terminal of the second capacitor C2 also changes with the same amount (i.e., jump from $(V_{dd}+V_{th})$ to $(V_{dd}+V_{th}+V_{ref1}-V_{data})$), and the voltage of the fifth node N5 is $(V_{dd}+V_{th}+V_{ref1}-V_{data})$.

The seventh node N7 and the eighth node N8 are both coupled to the fifth node N5, so that the voltage of the seventh node N7 and the voltage of the eighth node N8 are both $(V_{dd}+V_{th}+V_{ref1}-V_{data})$. Thus, the voltage of the second node N2, the voltage of the seventh node N7 and the voltage of the eighth node N8 are equal or approximately equal. According to the off-state current formula of the transistor in the off state, it will be seen that when the transistor is in the off state, the amount of the leakage current of the transistor may be effectively reduced by controlling the voltage difference $V_{ds}$ between the source and the drain of the transistor to be relatively small or close to zero. The first electrode and the second electrode of the fourth transistor M4 are coupled between the second node N2 and the seventh node N7, and the first electrode and the second electrode of the sixth transistor M6 are coupled between the second node N2 and the eighth node N8, so that the voltage difference $V_{ds}$ between the source and the drain of the fourth transistor M4 is relatively small or close to zero, and the voltage difference $V_{ds}$ between the source and the drain of the sixth transistor M6 is relatively small or close to zero. Therefore, the amounts of the leakage current of the fourth transistor M4 and the sixth transistor M6 may be effectively reduced, so that the current leakage of the second node N2 through the fifth current leakage path and the sixth current leakage path may be suppressed. As a result, the voltage holding rate of the fourth capacitor C4 may be improved, the driving signal generated by the twelfth transistor M12 is more stable, and in turn, the stability of the luminance of the light emitting diode L is improved.

Based on the case where the reset sub-circuit 102 includes the third transistor M3 and the fourth transistor M4 connected in series, and the compensation sub-circuit 103 includes the fifth transistor M5 and the sixth transistor M6 connected in series, yet another exemplary structure of the current leakage suppression sub-circuit 109 is described below.

As shown in FIGS. 10A to 11B, in some embodiments, the current leakage suppression sub-circuit 109 is coupled to the second node N2, so that the current leakage suppression sub-circuit 109 is coupled to the energy storage sub-circuit 101 through the second node N2.

The reset sub-circuit 102 and the compensation sub-circuit 103 are both directly coupled to the second node N2.

The current leakage suppression sub-circuit 109, the compensation sub-circuit 103 and the reset sub-circuit 102 are further coupled to a sixth node N6. The current leakage suppression sub-circuit 109 is further coupled to a third scan timing signal terminal S3 and a constant voltage signal terminal Vref2.

The sixth node N6 is further coupled to the seventh node N7 and the eighth node N8. That is, the first electrode of the fourth transistor M4 in the reset sub-circuit 102 is further coupled to the sixth node N6, and the first electrode of the sixth transistor M6 in the compensation sub-circuit 103 is further coupled to the sixth node N6.

The current leakage suppression sub-circuit 109 is configured to: be charged due to actions of voltages of the sixth node N6 and a constant voltage signal from the constant voltage signal terminal Vref2; and keep the voltage of the sixth node N6 equal or approximately equal to the voltage of the second node N2 in response to a third scan timing signal received at the third scan timing signal terminal S3, so as to suppress the current leakage of the second node N2.

Since the sixth node N6 is further coupled to the seventh node N7 and the eighth node N8, the voltage of the sixth node N6 is equal to the voltage of the seventh node N7 and the voltage of the eighth node N8 regardless of resistances of connection lines. Therefore, the current leakage suppression sub-circuit 109 is capable of maintaining the voltage of the sixth node N6 equal or approximately equal to the voltage of the second node N2, that is, the current leakage suppression sub-circuit 109 is capable of keeping the voltage of the seventh node N7 equal or approximately equal to the voltage of the second node N2, and keeping the voltage of the eighth node N8 equal or approximately equal to the voltage of the second node N2. Therefore, in this case, the voltage difference between the source and the drain of the fourth transistor M4 is relatively small or close to zero, and the voltage difference between the source and the drain of the sixth transistor M6 is relatively small or close to zero, so that the amounts of the leakage current of the fourth transistor M4 and the sixth transistor M6 may be effectively reduced; as a result, the current leakages of the second node N2 through current leakage paths may be suppressed, and in turn, the voltage of the second node N2 may be kept constant for a long time, and the voltage holding rate of the fourth capacitor C4 is improved.

Figure 10B:
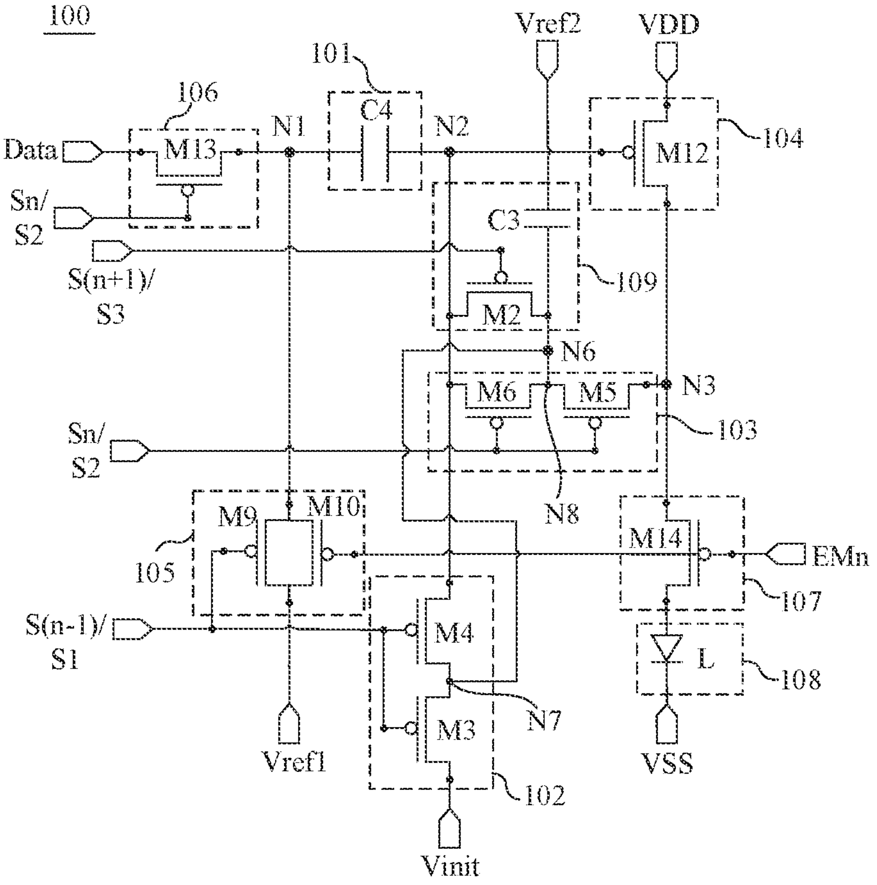
FIG. 10B is a circuit diagram of yet another pixel driving circuit, in accordance with some embodiments.
Figure 11A:
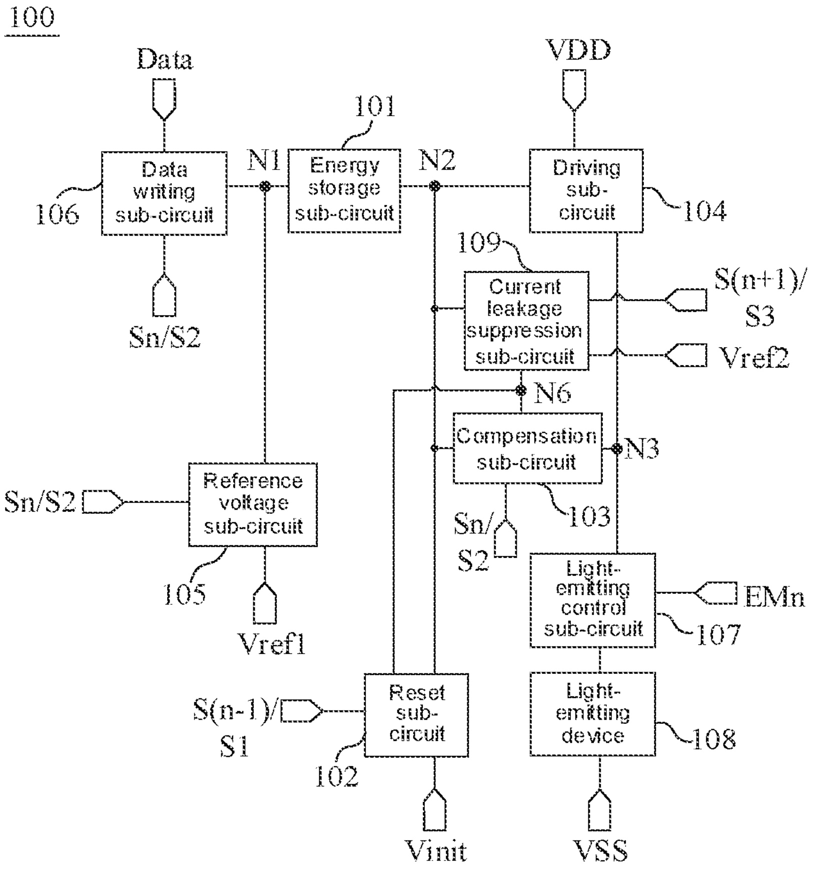
FIG. 11A is a structural diagram of yet another pixel driving circuit, in accordance with some embodiments.
Figure 11B:
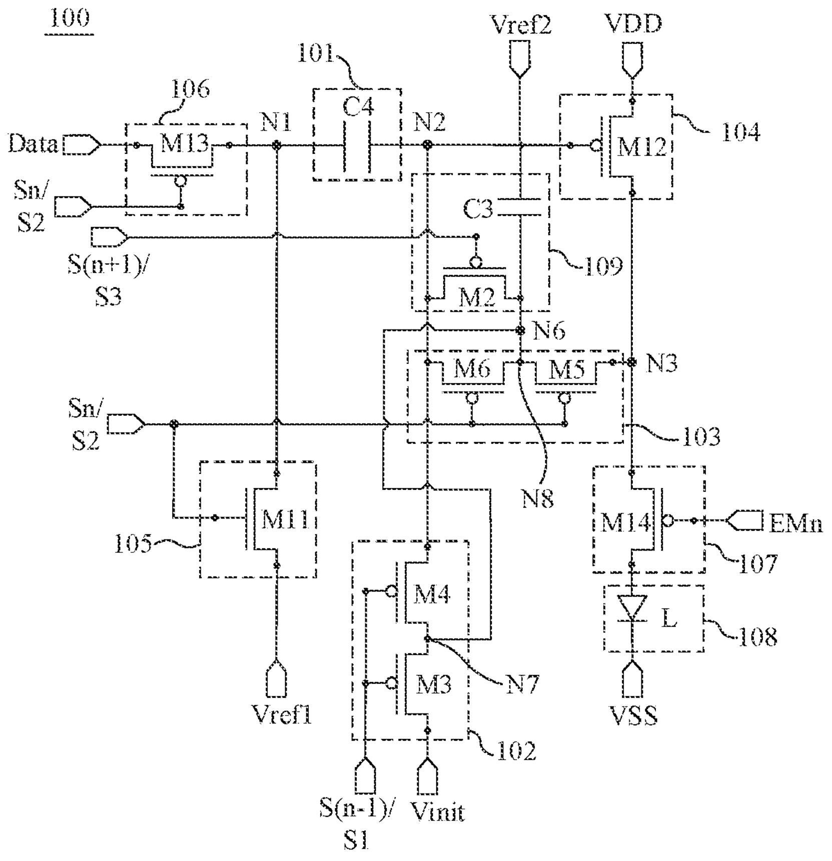
FIG. 11B is a circuit diagram of yet another pixel driving circuit, in accordance with some embodiments.
Figure 12:
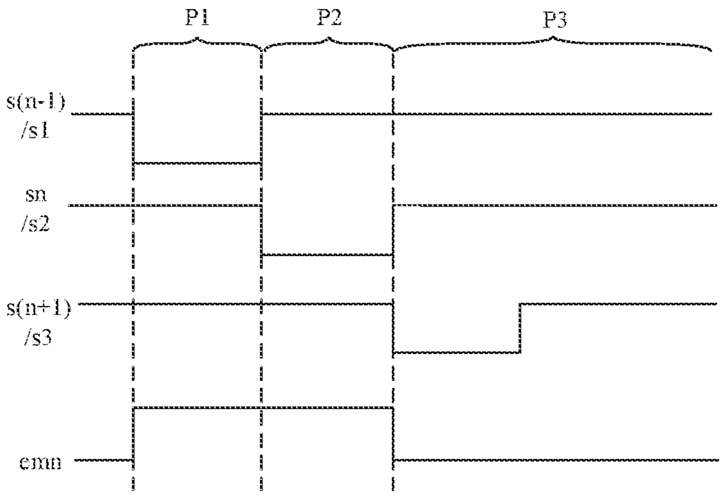
FIG. 12 is another timing diagram corresponding to a pixel driving circuit, in accordance with some embodiments.

In some examples, as shown in FIGS. 10B and 11B, the current leakage suppression sub-circuit 109 includes a third capacitor C3 and a second transistor M2. A first terminal of the third capacitor C3 is coupled to the constant voltage signal terminal Vref2, and a second terminal of the third capacitor C3 is coupled to the sixth node N6. A control electrode of the second transistor M2 is coupled to the third scan timing signal terminal S3, a first electrode of the second transistor M2 is coupled to the second node N2, and a second electrode of the second transistor M2 is coupled to the sixth node N6.

The third capacitor C3 is configured to: be charged due to the actions of the voltage of the sixth node N6 and the constant voltage signal from the constant voltage signal terminal Vref2; and maintain the voltage of the sixth node N6. The second transistor M2 is configured to be turned on under control of the third scan timing signal s3, so that the second node N2 is connected to the sixth node N6 to keep the voltage of the sixth node N6 equal or approximately equal to the voltage of the second node N2.

It will be noted that, the constant voltage signal terminal Vref2 is configured to provide a constant voltage signal for the second terminal of the third capacitor C3, so that a voltage of the first terminal of the third capacitor C3 is kept constant. For example, the constant voltage signal terminal Vref2 may be coupled to any other signal terminal that is able to provide the constant voltage signal. For example, the constant voltage signal terminal Vref2 may be coupled to the initial signal terminal Vinit, the first voltage signal terminal VDD, the second voltage signal terminal VSS or the like.

A specific analysis of a process that the third capacitor C3 and the second transistor M2 suppress the current leakage of the second node N2 is as follows.

The fourth transistor M4 in the reset sub-circuit 102 is coupled between the second node N2 and the seventh node N7, and the sixth transistor M6 in the compensation sub-circuit 103 is coupled between the second node N2 and the eighth node N8. In the reset phase, the fourth transistor M4 is in the on state under the control of the first scan timing signal s1, so that the voltage of the second node N2 is equal to or approximately equal to the voltage of the seventh node N7; moreover, since the sixth node N6 is coupled to the seventh node N7 and the eighth node N8, the voltage of the sixth node N6 and the voltage of the eighth node N8 are both equal to or approximately equal to the voltage of the second node N2.

In the input and compensation phase, the sixth transistor M6 is in the on state under the control of the second scan timing signal terminal S2, so that the voltage of the second node N2 is equal to or approximately equal to the voltage of the eighth node N8; moreover, since the sixth node N6 is coupled to the seventh node N7 and the eighth node N8, the voltage of the sixth node N6 and the voltage of the seventh node N7 are both equal to or approximately equal to the voltage of the second node N2. That is, before the light-emitting phase, the voltage of the second node N2 is always equal to or approximately equal to the voltage of the sixth node N6, the voltage of the seventh node N7 and the voltage of the eighth node N8.

In the light-emitting phase, when the signal written into the first node N1 is changed from the data signal data to the reference voltage signal vref, the voltage of the first node N1 changes, and the fourth capacitor C4 couples the voltage of the second node N2 according to the voltage of the first node N1, so that the voltage of the second node N2 changes suddenly; the second transistor M2 is turned on under control of the third scan timing signal s3 to connect the second node N2 and the sixth node N6, so that the voltage of the sixth node N6 is equal or approximately equal to the coupled voltage of the second node N2. Moreover, the voltage of the sixth node N6 is maintained by the third capacitor.

The sixth node N6 is further coupled to the seventh node N7 and the eighth node N8, in this case, the voltage of the seventh node N7 and the voltage of the eighth node N8 are both equal to or approximately equal to the voltage of the sixth node N6, so that the voltage of the seventh node N7 and the voltage of the eighth node N8 are both equal to or approximately equal to the coupled voltage of the second node N2.

Therefore, the voltage difference between the source and the drain of the fourth transistor M4 and the voltage difference between the source and the drain of the sixth transistor M6 are both relatively small or close to zero, so that the amounts of the leakage current of the fourth transistor M4 and the sixth transistor M6 are both significantly reduced, and the current leakage from the second node N2 to the seventh node N7 through the fourth transistor M4 is suppressed, and the current leakage from the second node N2 to the eighth node N8 through the sixth transistor M6 is suppressed. As a result, the amounts of the leakage current of the second node N2 through the current leakage paths and the second current leakage path are both reduced, and the voltage holding rate of the second terminal of the fourth capacitor C4 is improved.

In some embodiments, as shown in FIGS. 11A and 11B, based on the structure of the current leakage suppression sub-circuit 109 mentioned above, in the pixel driving circuit 100 provided by the embodiments of the present disclosure, in the case where the reference voltage sub-circuit 105 is coupled to the second scan timing signal terminal S2, the reference voltage sub-circuit 105 includes the eleventh transistor M11. As for the solution that the reference voltage sub-circuit 105 includes the eleventh transistor M11, reference may be made to the foregoing descriptions, and details will not be repeated here.

On this basis, other specific circuit structures of the pixel driving circuits 100 provided by some embodiments of the present disclosure will be integrally and exemplarily described below.

As shown in FIGS. 10B and 11B, the pixel driving circuit 100 includes the energy storage sub-circuit 101, the reset sub-circuit 102, the compensation sub-circuit 103, the driving sub-circuit 104, the reference voltage sub-circuit 105, the data writing sub-circuit 106, the light-emitting control sub-circuit 107, and the current leakage suppression sub-circuit 109.

The energy storage sub-circuit 101 includes the fourth capacitor C4; the driving sub-circuit 104 includes the twelfth transistor M12; the data writing sub-circuit 106 includes the thirteenth transistor M13; the light-emitting control sub-circuit 107 includes the fourteenth transistor M14.

The reset sub-circuit 102 includes the third transistor M3 and the fourth transistor M4 connected in series. The compensation sub-circuit 103 includes the fifth transistor M5 and the sixth transistor M6 connected in series.

The reference voltage sub-circuit 105 includes the ninth transistor M9 and the tenth transistor M10; alternatively, the reference voltage sub-circuit 105 includes the eleventh transistor M11.

The first terminal of the third capacitor C3 is coupled to the constant voltage signal terminal Vref2, and the second terminal of the third capacitor C3 is coupled to the sixth node N6. The control electrode of the second transistor M2 is coupled to the third scan timing signal terminal S3, the first electrode of the second transistor M2 is coupled to the second node N2, and the second electrode of the second transistor M2 is coupled to the sixth node N6.

The third capacitor C3 is configured to: be charged due to the actions of the voltage of the sixth node N6 and the constant voltage signal from the constant voltage signal terminal Vref2; and maintain the voltage of the sixth node N6. The second transistor M2 is configured to: in the light-emitting phase, be turned on under the control of the third scan timing signal, so that the second node N2 is connected to the sixth node N6 to keep the voltage of the sixth node N6 equal or approximately equal to the voltage of the second node N2. The third capacitor C3 is further configured to maintain the voltage of the sixth node N6.

The first terminal (the reference voltage terminal) of the fourth capacitor C4 is coupled to the first node N1, and the second terminal (the signal holding terminal) of the fourth capacitor C4 is coupled to the second node N2. The fourth capacitor C4 is configured to: be charged due to the actions of the voltages of the first node N1 and the second node N2; couple the voltage of the second node N2 according to the voltage of the first node N1 when the voltage of the first node N1 changes, so that the voltage of the second node N2 changes with the same amplitude; and maintain the coupled voltage of the second node N2.

The control electrode of the twelfth transistor M12 is coupled to the second node N2, the first electrode of the twelfth transistor M12 is coupled to the first voltage signal terminal VDD, and the second electrode of the twelfth transistor M12 is coupled to the third node N3. The twelfth transistor M12 is configured to: be turned on under the control of the voltage of the second node N2; be in the self-saturation state due to the action of the compensation sub-circuit 103; generate the compensation signal according to the first voltage signal and the threshold voltage of the twelfth transistor M12; and transmit the compensation signal to the second node N2. The twelfth transistor M12 is further configured to: be turned on under the control of the voltage of the second node N2; and generate and output the driving signal.

The control electrode of the thirteenth transistor M13 is coupled to the second scan timing signal terminal S2, the first electrode of the thirteenth transistor M13 is coupled to the data signal terminal Data, and the second electrode of the thirteenth transistor M13 is coupled to the first node N1. The thirteenth transistor M13 is configured to be turned on under the control of the second scan timing signal to transmit the data signal to the first node N1.

The control electrode of the fourteenth transistor M14 is coupled to the light-emitting timing signal terminal EMn, the first electrode of the fourteenth transistor M14 is coupled to the third node N3, and the second electrode of the fourteenth transistor M14 is coupled to the light-emitting device 108. The fourteenth transistor M14 is configured to be turned on under the control of the light-emitting timing signal to transmit the driving signal from the twelfth transistor M12 to the light-emitting device 108, so as to drive the light-emitting device 108 to emit light.

For example, the light-emitting device 108 includes the light emitting diode L, the anode of the light emitting diode L is coupled to the second electrode of the fourteenth transistor M14, and the cathode of the light emitting diode L is coupled to the second voltage signal terminal VSS. The light emitting diode L may be, for example, the organic light emitting diode L or the micro light emitting diode L.

As shown in FIG. 10B, the control electrode of the third transistor M3 is coupled to the first scan timing signal terminal S1, the first electrode of the third transistor M3 is coupled to the initial signal terminal Vinit, the second electrode of the third transistor M3 is coupled to the first electrode of the fourth transistor M4, the control electrode of the fourth transistor M4 is coupled to the first scan timing signal terminal S1, and the second electrode of the fourth transistor M4 is coupled to the second node N2. The first electrode of the fourth transistor M4 is further coupled to the seventh node N7.

The third transistor M3 is configured to be turned on under the control of the first scan timing signal terminal S1 to transmit the initial signal to the first electrode of the fourth transistor M4; the fourth transistor M4 is configured to be turned on under the control of the first scan timing signal to transmit the initial signal to the second node N2, so as to reset the second node N2.

The control electrode of the fifth transistor M5 is coupled to the second scan timing signal terminal S2, the first electrode of the fifth transistor M5 is coupled to the third node N3, the second electrode of the fifth transistor M5 is coupled to the first electrode of the sixth transistor M6, the control electrode of the sixth transistor M6 is coupled to the second scan timing signal terminal S2, and the second electrode of the sixth transistor M6 is coupled to the second node N2. The fifth transistor M5 is configured to be turned on under the control of the second scan timing signal, and the sixth transistor M6 is configured to be turned on under the control of the second scan timing signal, so that the second node N2 is connected to the third node N3 due to the combined action of the fifth transistor M5 and the sixth transistor M6 to connect the gate and the source of the twelfth transistor M12. As a result, the twelfth transistor M12 is in the self-saturation state.

As shown in FIG. 10B, in the case where the reference voltage sub-circuit 105 includes the ninth transistor M9 and the tenth transistor M10, the control electrode of the ninth transistor M9 is coupled to the first scan timing signal terminal S1, the first electrode of the ninth transistor M9 is coupled to the reference voltage signal terminal Vref1, and the second electrode of the ninth transistor M9 is coupled to the first node N1. The control electrode of the tenth transistor M10 is coupled to the light-emitting timing signal terminal EMn, the first electrode of the tenth transistor M10 is coupled to the reference voltage signal terminal Vref1, and the second electrode of the tenth transistor M10 is coupled to the first node N1.

The ninth transistor M9 is configured to be turned on under the control of the first scan timing signal to transmit the reference voltage signal to the first node N1. The tenth transistor M10 is configured to be turned on under the control of the light-emitting timing signal to transmit the reference voltage signal to the first node N1.

As shown in FIG. 11B, in the case where the reference voltage sub-circuit 105 includes the eleventh transistor M11, the control electrode of the eleventh transistor M11 is coupled to the second scan timing signal terminal S2, the first electrode of the eleventh transistor M11 is coupled to the reference voltage signal terminal Vref1, and the second electrode of the eleventh transistor M11 is coupled to the first node N1. The eleventh transistor M11 is configured to transmit the reference voltage signal to the first node N1 in response to the second scan timing signal received at the second scan timing signal terminal.

The on/off type of the eleventh transistor M11 is opposite to the on/off types of the transistors except the eleventh transistor M11 in the pixel driving circuit 100. For example, in the pixel driving circuit 100 as shown in FIG. 11B, the eleventh transistor M11 is the N-type oxide-thin film transistor, and the transistors except the eleventh transistor M11 are all the P-type low temperature poly-silicon thin film transistors.

Some embodiments of the present disclosure provide a pixel driving method, which is applied to the pixel driving circuit 100 as described above.

In the following description, the transistors except the eleventh transistor M11 in the pixel driving circuit 100 are all the P-type transistors, the eleventh transistor M11 is the N-type transistor, the first voltage signal vdd transmitted by the first voltage signal terminal VDD is a high-level signal, the second voltage signal vss transmitted by the second voltage signal terminal VSS is a low-level signal, and the initial signal vinit transmitted by the initial signal terminal Vinit is a low-level signal.

As shown in FIGS. 10A to 12, the pixel driving method includes a frame period including a reset phase P1, an input and compensation phase P2 and a light-emitting phase P3.

In the reset phase P1:

the reference voltage sub-circuit 105 transmits the reference voltage signal vref received at the reference voltage signal terminal Vref1 to the first node N1 in response to the first scan timing signal s1 received at the first scan timing signal terminal S1 or the second scan timing signal s2 received at the second scan timing signal terminal S2;

the reset sub-circuit 102 transmits the initial signal vinit received at the initial signal terminal Vinit to the second node N2 in response to the first scan timing signal s1 received at the first scan timing signal terminal S1. In this case, since the fourth transistor M4 in the reset sub-circuit 102 is in the on state, the voltage of the seventh node N7 is equal to the voltage of the second node N2; and since the seventh node N7 is coupled to the sixth node N6, the voltage of the sixth node N6 is equal to the voltage of the seventh node NT; thus, it is equivalent to transmitting the initial signal vinit to the sixth node N6 by the reset sub-circuit 102;

the energy storage sub-circuit 101 is charged due to the actions of the voltages of the first node N1 and the second node N2;

the current leakage suppression sub-circuit 109 is charged due to the actions of the voltage of the sixth node N6 and the first voltage signal vdd transmitted by the first voltage signal terminal VDD.

For example, as shown in FIGS. 10B and 11B, in the case where each sub-circuit in the pixel driving circuit 100 includes transistor(s) or a capacitor, in the pixel driving method, "in the case where each sub-circuit in the pixel driving circuit 100 includes the transistor(s) or the capacitor" mentioned hereinafter means that, in a case where the current leakage suppression sub-circuit 109 includes the second transistor M2 and the third capacitor C3; the energy storage sub-circuit 101 includes the fourth capacitor C4; the driving sub-circuit 104 includes the twelfth transistor M12; the data writing sub-circuit 106 includes the thirteenth transistor M13; the light-emitting control sub-circuit 107 includes the fourteenth transistor M14; the reset sub-circuit 102 includes the third transistor M3 and the fourth transistor M4 connected in series; the compensation sub-circuit 103 includes the fifth transistor M5 and the sixth transistor M6 connected in series' the reference voltage sub-circuit 105 includes the ninth transistor M9 and the tenth transistor M10, or the reference voltage sub-circuit 105 includes the eleventh transistor M11, the reset phase P1 includes as follows.

In the reset phase P1, the first scan timing signal s1 is 0, the second scan timing signal s2 is 1, the third scan timing signal s3 is 1, and the light-emitting timing signal emn is 1.

As shown in FIG. 10B, in the case where the reference voltage sub-circuit 105 includes the ninth transistor M9 and the tenth transistor M10, the ninth transistor M9 is turned on under the control of the first scan timing signal s1 to transmit the reference voltage signal vref to the first node N1.

As shown in FIG. 11B, in the case where the reference voltage sub-circuit 105 includes the eleventh transistor M11, the eleventh transistor M11 is turned on under the control of the second scan timing signal s2 to transmit the reference voltage signal vref to the first node N1.

The third transistor M3 is turned on under the control of the first scan timing signal s1 to transmit the initial signal vinit to the first electrode of the fourth transistor M4, and the fourth transistor M4 is turned on under the control of the first scan timing signal s1 to transmit the initial signal vinit to the second node N2. Since the fourth transistor M4 is in the on state, the voltage of the seventh node N7 is equal to or approximately equal to the voltage of the second node N2, and the voltage of the sixth node N6, the voltage of the seventh node N7 and the voltage of the second node N2 are all the voltage of the initial signal vinit.

The voltages of the first terminal and the second terminal of the fourth capacitor C4 are respectively the voltage of the first node N1 and the voltage of the second node N2, so that the charge of the second terminal of the fourth capacitor C4 is achieved.

A voltage of the second terminal of the third capacitor C3 is the voltage of the sixth node N6, and a voltage of the first terminal of the third capacitor C3 is the voltage of the first voltage signal, so that the charge of the second terminal of the third capacitor C3.

The thirteenth transistor M13 and the fourteenth transistor M14 are both turned off. In the case where the reference voltage sub-circuit 105 includes the ninth transistor M9 and the tenth transistor M10, the tenth transistor M10 is turned off. The fifth transistor M5 and the sixth transistor M6 included in the compensation sub-circuit 103 are both turned off.

In the input and compensation phase P2:

the data writing sub-circuit 106 transmits the data signal data received at the data signal terminal Data to the first node N1 in response to the second scan timing signal s2 received at the second scan timing signal terminal S2;

the compensation sub-circuit 103 is turned on under the control of the second scan timing signal s2 to cause the driving sub-circuit 104 to be in the self-saturation state;

the driving sub-circuit 104 is in the self-saturation state due to the action of the compensation sub-circuit 103, generates the compensation signal according to the first voltage signal vdd received at the first voltage signal terminal VDD and the threshold voltage of the transistor in the driving sub-circuit 104, and transmits the compensation signal to the second node N2;

in this case, since the sixth transistor M6 in the compensation sub-circuit 103 is in the on state, the voltage of the eighth node N8 is equal to or approximately equal to the voltage of the second node N2; and since the eighth node N8 is coupled to the sixth node N6, the voltage of the sixth node N6 is equal to or approximately equal to the voltage of the second node N2; thus, it is equivalent to transmitting the compensation signal to the sixth node N6 by the driving sub-circuit 104;

the energy storage sub-circuit 101 is charged due to the actions of the voltages of the first node N1 and the second node N2; and the current leakage suppression sub-circuit 109 is charged due to the actions of the voltage of the sixth node N6 and the first voltage signal vdd transmitted by the first voltage signal terminal VDD.

For example, as shown in FIGS. 10B and 11B, in the case where each sub-circuit in the pixel driving circuit 100 includes the transistor(s) or the capacitor, the input and compensation phase P2 includes as follows.

In the input and compensation phase P2, the first scan timing signal s1 is 1, the second scan timing signal s2 is 0, the third scan timing signal s3 is 1, and the light-emitting timing signal emn is 1.

The thirteenth transistor M13 is turned on under the control of the second scan timing signal s2 to transmit the data signal data to the first node N1. In this case, the voltage of the first node N1 is the voltage $V_{data}$ of the data signal data, so that the voltage $V_{data}$ of the data signal data is charged into the fourth capacitor C4.

The fifth transistor M5 and the sixth transistor M6 are both turned on under the control of the second scan timing signal s2, so that the second node N2 is connected to the third node N3. As a result, the control electrode and the second electrode of the twelfth transistor M12 are connected to each other, and the twelfth transistor M12 is in the self-saturation state.

The twelfth transistor M12 is in the self-saturation state, and the voltage of the control electrode of the twelfth transistor M12 is a sum of the voltage of the first electrode of the twelfth transistor M12 and the threshold voltage $V_{th}$ of the twelfth transistor M12. The first electrode of the twelfth transistor M12 is coupled to the first voltage signal terminal VDD, and the voltage of the first electrode of the twelfth transistor M12 is the voltage $V_{dd}$ of the first voltage signal vdd, and thus the voltage of the control electrode of the twelfth transistor M12 is a sum of the voltage $V_{dd}$ and the threshold voltage $V_t$h ($V_{dd}+V_{th}$). The second node N2 is coupled to the control electrode of the twelfth transistor M12, and the voltage of the second node N2 is ($V_{dd}+V_{th}$), so that the sum ($V_{dd}+V_{th}$) of the voltage $V_{dd}$ of the first voltage signal vdd and the threshold voltage $V_{th}$ of the twelfth transistor M12 is charged into the fourth capacitor C4 to achieve the writing of the threshold voltage $V_{th}$ of the driving transistor.

In this case, since the sixth transistor M6 is in the on state, the voltage of the eighth node N8 is equal to or approximately equal to the voltage of the second node N2; and since the eighth node N8 is coupled to the sixth node N6, the voltage of the sixth node N6 is equal to or approximately equal to the voltage of the second node N2. Thus, the voltage of the sixth node N6 is ($V_{dd}+V_{th}$), the third capacitor C3 is charged due to an actions of the voltage of the sixth node N6 and the first voltage signal vdd transmitted by the first voltage signal terminal VDD, and the voltage of the second terminal of the third capacitor C3 is ($V_{dd}+V_{th}$).

The third transistor M3 and the fourth transistor M4 are both turned off. In the case where the reference voltage sub-circuit 105 includes the ninth transistor M9 and the tenth transistor M10, the ninth transistor M9 and the tenth transistor M10 are turned off. In the case where the reference voltage sub-circuit 105 includes the eleventh transistor M11, the eleventh transistor M11 is turned off. The fourteenth transistor M14 is turned off.

In the light-emitting phase P3:

as shown in FIG. 108B, in the case where the reference voltage sub-circuit 105 is coupled to the first node N1, the first scan timing signal terminal S1, the light-emitting timing signal terminal EMn and the reference voltage signal terminal $V_{ref1}$, the reference voltage sub-circuit 105 transmits the reference voltage signal vref to the first node N1 in response to the light-emitting timing signal emn received at the light-emitting timing signal terminal EMn;

as shown in FIG. 11B, in the case where the reference voltage sub-circuit 105 is coupled to the first node N1, the second scan timing signal terminal S2 and the reference voltage signal terminal $V_{ref1}$, the reference voltage sub-circuit 105 transmits the reference voltage signal vref to the first node N1 in response to the second scan timing signal s2;

the energy storage sub-circuit 101 couples the voltage of the second node N2 according to the voltage of the first node N1, and maintains the coupled voltage of the second node N2;

due to the coupling action of the energy storage sub-circuit 101, the driving sub-circuit 104 generates the driving signal according to the data signal data and the reference voltage signal vref, and transmits the driving signal to the light-emitting control sub-circuit 107;

the light-emitting control sub-circuit 107 transmits the driving signal from the driving sub-circuit 104 to the light-emitting device 108 in response to the light-emitting timing signal emn, so as to drive the light-emitting device 108 to emit light; and the current leakage suppression sub-circuit 109 keeps the voltage of the sixth node N6 consistent with the voltage of the second node N2 in response to the third scan timing signal s3 received at the third scan timing signal terminal S3, so as to suppress the current leakage of the second node N2.

For example, as shown in FIGS. 10B and 11, in the case where each sub-circuit in the pixel driving circuit 100 includes the transistor(s) or the capacitor, the light-emitting phase P3 includes as follows.

In the light-emitting phase P3, the first scan timing signal s1 is 1, the second scan timing signal s2 is 1, the third scan timing signal s3 is 0, and the light-emitting timing signal emn is 0.

As shown in FIG. 10B, in the case where the reference voltage sub-circuit 105 includes the ninth transistor M9 and the tenth transistor M10, the tenth transistor M10 is turned on under the control of the light-emitting timing signal emn to transmit the reference voltage signal vref to the first node N1. The voltage of the first node N1 is changed to the voltage $V_{ref1}$ of the reference voltage signal vref.

As shown in FIG. 11B, in the case where the reference voltage sub-circuit 105 includes the eleventh transistor M11, the eleventh transistor M11 is turned on under the control of the second scan timing signal s2 to transmit the reference voltage signal vref to the first Node N1. The voltage of the first node N1 is changed to the voltage $V_{ref1}$ of the reference voltage signal vref.

The fourth capacitor C4 couples the voltage of the second node N2 according to the voltage of the first node N1. According to the law of conservation of electric charge of the capacitance, the voltage of the first node N1 changes from the voltage $V_{data}$ of the data signal data to the voltage $V_{ref1}$ of the reference voltage signal vref (that is, the voltage of the first terminal of the fourth capacitor C4 changes from $V_{data}$ into $V_{ref1}$), so that the voltage of the second terminal of the fourth capacitor C4 also changes with the same amount (jump from $(V_{dd}+V_{th})$ to $(V_{dd}+V_{th}+V_{ref1}-V_{data})$), and the voltage of the second node N2 is $(V_{dd}+V_{th}+V_{ref1}-V_{data})$.

The twelfth transistor M12 is turned on under the control of the voltage of the second node N2, and the twelfth transistor M12 generates the driving signal according to the reference voltage signal vref and the data signal data, and outputs the driving signal.

The fourteenth transistor M14 is turned on under the control of the light-emitting timing signal emn to transmit the received driving signal to the light emitting diode L, so that the light emitting diode L emits light.

A magnitude of the driving signal is not related to the threshold voltage of the twelfth transistor M12, so that an influence of a threshold voltage of the driving transistor on the display effect is avoided. As for details, reference may be made to the foregoing descriptions, which will not be repeated here.

In the process of generating and outputting the driving signal by the twelfth transistor M12, the second transistor M2 is turned on under the control of the third scan timing signal s3 to connect the second node N2 and the sixth node N6, so that the voltage of the sixth node N6 is equal or approximately equal to the voltage of the second node N2. The sixth node N6 is coupled to the seventh node N7 and the eighth node N8, so that the voltage of the second node N2, the voltage of the seventh node N7 and the voltage of the eighth node N8 are equal or approximately equal According to the off-state current formula of the transistor in the off state, it will be seen that when the transistor is in the off state, the amount of the leakage current of the transistor may be effectively reduced by controlling the voltage difference $V_{ds}$ between the source and the drain of the transistor to be relatively small or close to zero. The first electrode and the second electrode of the fourth transistor M4 are coupled between the second node N2 and the seventh node NT and the first electrode and the second electrode of the sixth transistor M6 are coupled between the second node N2 and the eighth node N8, so that the voltage difference $V_{ds}$ between the source and the drain of the fourth transistor M4 is relatively small or close to zero, and the voltage difference $V_d s$ between the source and the drain of the sixth transistor M6 is relatively small or close to zero. Therefore, the amounts of the leakage current of the fourth transistor M4 and the sixth transistor M6 may be effectively reduced, so that the current leakage of the second node N2 through two current leakage paths may be suppressed. As a result, the voltage holding rate of the fourth capacitor C4 may be improved, the driving signal generated by the twelfth transistor M12 is more stable, and in turn, the stability of the luminance of the light emitting diode L is improved.

Figure 13A:
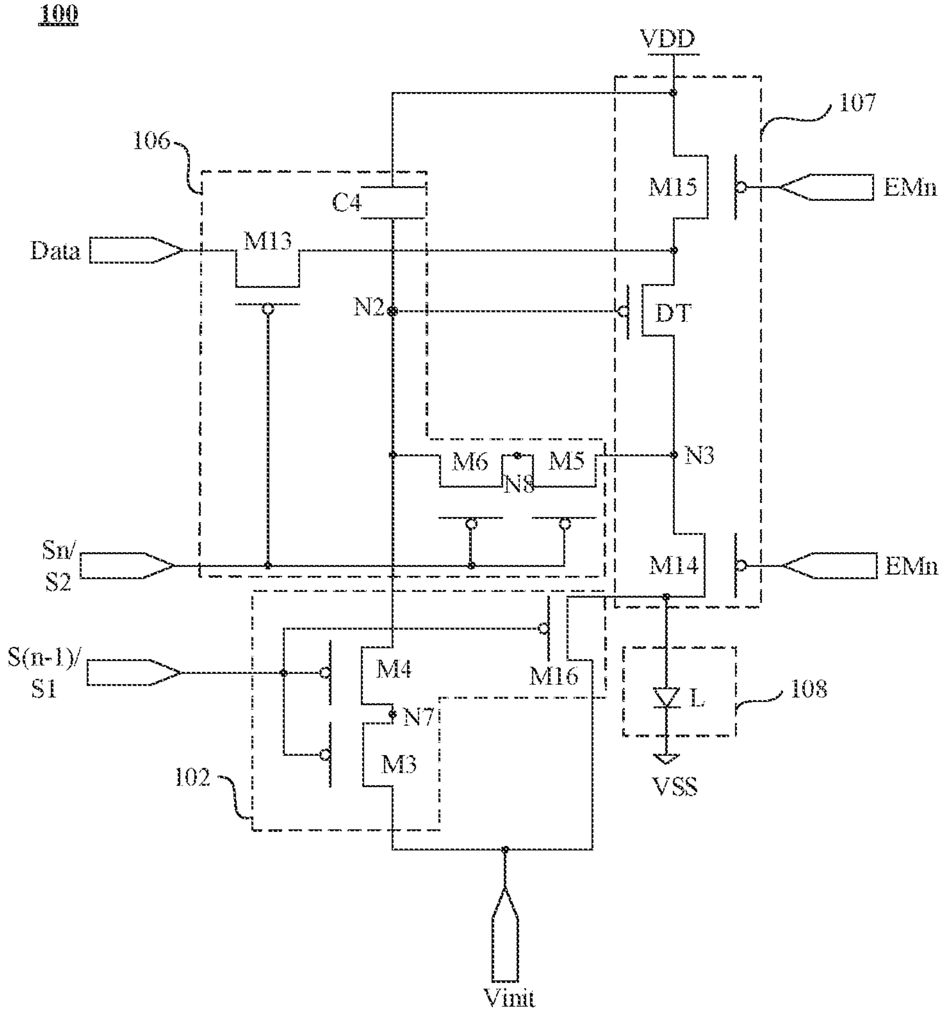
FIG. 13A is a circuit diagram of yet another pixel driving circuit, in accordance with some embodiments.

Some embodiments of the present disclosure provide a pixel driving circuit 100, referring to FIG. 13A, the pixel driving circuit 100 includes a data writing sub-circuit 106, a light-emitting control sub-circuit 107 and a reset sub-circuit 102.

The data writing sub-circuit 106 is coupled to a second scan timing signal terminal S2, a data signal terminal Data, a first voltage signal terminal VDD the reset sub-circuit 102 and the light-emitting control sub-circuit 107. The data writing sub-circuit 106 is configured to: in the input and compensation phase, store the compensation signal in response to the second scanning timing signal from the second scanning timing signal terminal S2; and in the light-emitting phase, auxiliary control the light-emitting control sub-circuit 107 to be turned on according to the compensation signal.

The data writing sub-circuit 106 includes a fourth capacitor C4. The light-emitting control sub-circuit 107 includes a fifteenth transistor M15, a driving transistor DT and a fourteenth transistor M14.

A first terminal of the fourth capacitor C4 is coupled to the first voltage signal terminal VDD, and a second terminal of the fourth capacitor C4 is coupled to a control electrode of the driving transistor DT. A control electrode of the fifteenth transistor M15 is coupled to the light-emitting timing signal terminal EMn, a first electrode of the fifteenth transistor M15 is coupled to the first voltage signal terminal VDD, and a second electrode of the fifteenth transistor M15 is coupled to a first electrode of the driving transistor DT. A control electrode of the fourteenth transistor M14 is coupled to the light-emitting timing signal terminal EMn, a first electrode of the fourteenth transistor M14 is coupled to a second electrode of the driving transistor DT, and a second electrode of the fourteenth transistor M14 is coupled to an anode of a light-emitting device 108. A cathode of the light-emitting device 108 is coupled to a second voltage signal terminal VSS.

The reset sub-circuit 102 is coupled to the first scan timing signal terminal S1, the initial signal terminal Vinit, the data writing sub-circuit 106 and the light-emitting device 103. The reset sub-circuit 102 is configured to: in the reset phase, in response to the first scanning timing signal from the first scanning timing signal terminal S1, transmit an initial signal from the initial signal terminal Vinit to the data writing sub-circuit 106 and the light-emitting device 108, so as to reset the data writing sub-circuit 106 and the light-emitting device 108.

The light-emitting device 108 may be a diode L having a self-luminous characteristic, such as the OLED, the QLED, the LED or the like. Those skilled in the art may selectively set according to actual requirements.

The first voltage signal terminal VDD is configured to provide the first voltage signal such as a direct-current high-level signal. The second voltage signal terminal VSS is configured to provide the second voltage signal, such as a direct-current low-level signal.

The fifteenth transistor M15 and the fourteenth transistor M14 are switching transistors that are coupled to the light-emitting timing signal terminal EMn and are controlled to be turned on or turned off by the light-emitting timing signal transmitted by the light-emitting timing signal terminal EMn. The driving transistor DT is coupled to the second terminal of the fourth capacitor C4 and is controlled to be turned on or turned off by the compensation signal stored in the fourth capacitor C4. Therefore, when the fifteenth transistor M15, the driving transistor DT and the fourteenth transistor M14 are all turned on, the light-emitting control sub-circuit 107 is turned on, so as to drive the light-emitting device 108 to emit light.

The second terminal of the fourth capacitor C4 is the signal holding terminal, and the driving transistor DT is the twelfth transistor M12 mentioned above. For convenience of description, a connection point between the control electrode of the driving transistor DT and the second terminal of the fourth capacitor C4 is defined as a second node N2 below.

With continued reference to FIG. 13A, the data writing sub-circuit 106 further includes a thirteenth transistor M13 and a compensation transistor group. The compensation transistor group includes at least two transistors connected in series. A control electrode of the thirteenth transistor T13 is coupled to the second scan timing signal terminal S2, a first electrode of the thirteenth transistor T13 is coupled to the data signal terminal Data, and a second electrode of the thirteenth transistor T13 is coupled to the first electrode of the driving transistor DT. The compensation transistor group includes a fifth transistor M5 and a sixth transistor M6 connected in series, a control electrodes of the fifth transistor M5 and the sixth transistor M6 are both coupled to the second scan timing signal terminal S2, a first electrode of the fifth transistor M5 is coupled to a second electrode of the driving transistor DT (i.e., a third node N3), and a second electrode of the sixth transistor M6 is coupled to the second node N2. A connection point between the fifth transistor M5 and the sixth transistor M6 is an eighth node N8.

The reset sub-circuit 102 includes a reset transistor group and a sixteenth transistor M16. A control electrode of the sixteenth transistor M16 is coupled to the first scan timing signal terminal S1, a first electrode of the sixteenth transistor M16 is coupled to the initial signal terminal Vinit, and a second electrode of the sixteenth transistor M16 is coupled to the anode of the light-emitting device 108. The reset transistor group includes a third transistor M3 and a fourth transistor M4 connected in series, control electrodes of the third transistor M3 and the fourth transistor M4 are both coupled to the first scan timing signal terminal S1, a first electrode of the third transistor M3 is coupled to the initial signal terminal Vinit, and a second electrode of the fourth transistor M4 is coupled to the second node N2. A connection point between the third transistor M3 and the fourth transistor M4 is the seventh node N7.

In the pixel driving circuit 100, in the light-emitting phase, the transistors in the compensation transistor group and the transistors in the reset transistor group are all in the off state, and each have leakage current, so that the second node N2 leaks current through the transistors in the compensation transistor group and the transistors in the reset transistor group. As a result, the compensation signal stored in the fourth capacitor C4 fluctuates due to the current leakage of the compensation transistor group and the reset transistor group coupled thereto, which causes instability of the luminance of the light-emitting device 108.

The compensation transistor group includes two transistors connected in series and the reset transistor group includes two transistors connected in series, so that a voltage difference between the second node N2 and the initial signal terminal Vinit may be shared by the two transistors connected in series, and a voltage difference between the second node N2 and the third node N3 may be shared by the two transistors connected in series, that is, a voltage difference Vas between a source and a drain of a single transistor is reduced. For example, a voltage difference between the second node and the eighth node is less than a voltage difference between the second node and the third node. Therefore, amounts of the leakage current of the third transistor M3, the fourth transistor M4, the fifth transistor M5 and the sixth transistor M6 may be significantly reduced, so that the current leakage of the second node N2 is suppressed. The two transistors connected in series may be considered as a double-gate transistor.

However, since a parasitic capacitance and an intrinsic channel capacitance in the thin film transistor inevitably exist in the pixel driving circuit 100, when the voltages of the first scan timing signal and the second scan timing signal change suddenly, the voltages of the seventh node N7 and the eighth node N8 are affected, so that each of them is coupled to a higher voltage, which affects the second node N2 to make the second node N2 to leak current. As a result, the voltage of the second node N2 fluctuates greatly, resulting in a flickering phenomenon when the display apparatus performs display.

Figure 13B:
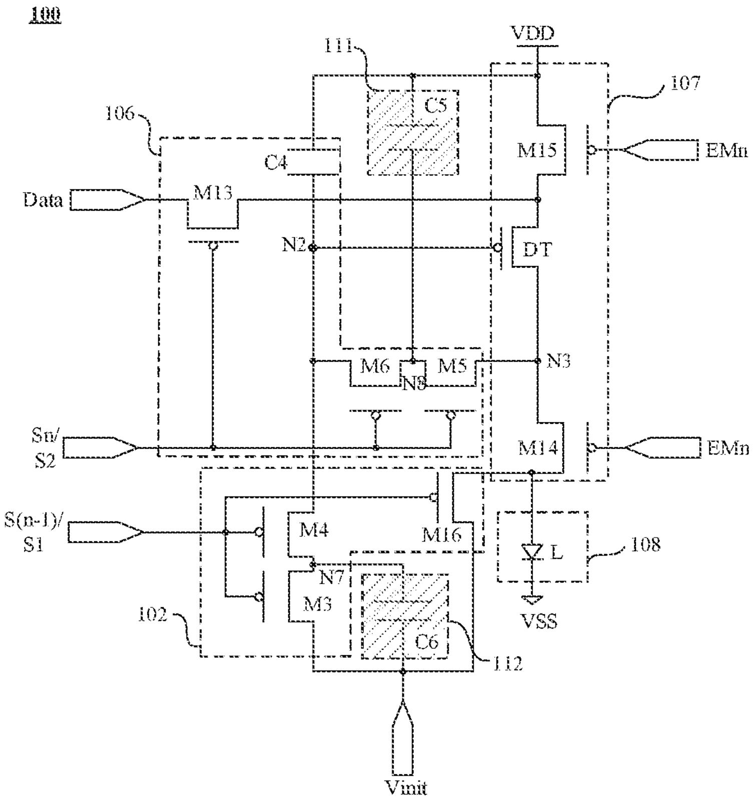
FIG. 13B is a circuit diagram of yet another pixel driving circuit, in accordance with some embodiments.

Based on this, as shown in FIG. 13B, the pixel driving circuit provided by the embodiments of the present disclosure further includes a first voltage stabilizing sub-circuit 111 and a second voltage stabilizing sub-circuit 112.

The first voltage stabilizing sub-circuit 111 is coupled to the data writing sub-circuit 106 and a first auxiliary voltage signal terminal, and the first voltage stabilizing sub-circuit 111 is configured to: in the input and compensation phase, be charged to store the compensation signal; and in the light-emitting phase, be discharged to continuously provide the compensation signal for the data writing sub-circuit 10, so that a voltage of a node (i.e., the eighth node N8) of the data writing sub-circuit 106 coupled to the first voltage stabilizing sub-circuit 111 is kept stable. The first auxiliary voltage signal terminal is configured to provide a constant voltage. For example, the first auxiliary voltage signal terminal is the first voltage signal terminal VDD.

The second voltage stabilizing sub-circuit 112 is coupled to the reset sub-circuit 102 and a second auxiliary voltage signal terminal, and the second voltage stabilizing sub-circuit 112 is configured to: in the reset phase, store the initial signal; and in the light-emitting phase, be discharged to continuously provide the initial signal for the reset sub-circuit 102, so that a voltage of a node (i.e., the seventh node N7) of the reset sub-circuit 102 coupled to the second voltage stabilizing sub-circuit 112 is kept stable. The second auxiliary voltage signal terminal is configured to provide a constant voltage. For example, the second auxiliary voltage signal terminal is the initial signal terminal Vinit.

In some examples, as shown in FIG. 13B, the first voltage stabilizing sub-circuit 111 includes a fifth capacitor C5, a first terminal of the fifth capacitor C5 is coupled to the eighth node, and a second terminal of the fifth capacitor C5 is coupled to the first auxiliary voltage signal terminal. The fifth capacitor C5 is configured to: in the input and compensation phase, be charged to store the compensation signal; and in the light-emitting phase, be discharged to continuously provide the compensation signal for the data writing sub-circuit 106, so that the voltage of the eighth node N8 of the data writing sub-circuit 106 is kept stable.

The second voltage stabilizing sub-circuit 112 includes a sixth capacitor C6, a first terminal of the sixth capacitor C6 is coupled to the seventh node, and a second terminal of the sixth capacitor C6 is coupled to the second auxiliary voltage signal terminal. The sixth capacitor C6 is configured to: in the reset phase, store the initial signal; and in the light-emitting phase, be discharged to continuously provide the initial signal for the reset sub-circuit 102, so that the voltage of the seventh node N7 of the reset sub-circuit 102 is kept stable.

By providing the first voltage stabilizing sub-circuit 111 and the second voltage stabilizing sub-circuit 112, the voltages of the eighth node N8 and the seventh node N7 may be kept stable, and when the voltages of the first scan timing signal and the second scan timing signal change suddenly, coupled degrees of the voltages of the eighth node NB and the seventh node N7 are reduced, so that an effect of the double-gate transistor on suppressing the current leakage is ensured.

Moreover, in the light-emitting phase, the compensation signal stored in the fourth capacitor C4 may make a voltage of the second electrode of the sixth transistor M6 of the compensation transistor group that is coupled to the fourth capacitor C4 to be equal or close to a voltage of the first electrode of the sixth transistor M6 (i.e., the voltage difference $V_{ds}$ between the source and the drain of the sixth transistor M6 tend to zero), so as to avoid the current leakage of the sixth transistor M6. That is, the compensation signal may suppress the current leakage of the data writing sub-circuit 106, so as to further ensure the voltage of the second node N2 to be stable.

In some examples, capacitance of the fifth capacitor C5 may be set according to actual requirements. In order to ensure sufficient achievement of voltage stabilizing effect of the fifth capacitor C5 on the eighth node N8 and current leakage suppressing effect on the second node N2, the capacitance of the fifth capacitor C5 is set to be relatively large. For example, the capacitance of the fifth capacitor C5 is equal to or greater than capacitance of the fourth capacitor C4.

In a process of driving the pixel driving circuit, when the data of the current frame is refreshed, in the reset phase, the second terminal of the fifth capacitor C5 cannot be reset (that is, the eighth node N8 cannot be reset), so that the eighth node N8 may have a residual voltage signal of a previous frame period. Thus, in the input and compensation phase P2, the compensation signal stored in the data writing sub-circuit 106 includes the data signal and the residual voltage signal of the previous frame period, which affect an accuracy of the compensation signal stored in the fourth capacitor C4. In addition, since the data signal input in the previous frame is different from the data signal input in the current frame (even if the data signal, that is same as the data signal input in the previous frame, is written in the current frame), the generated compensation signals in the previous frame and the current frame are different, and magnitudes of the driving signals corresponding thereto in the light-emitting phase are also different. Thus, there is a significant difference in the luminance of the light-emitting device. Moreover, the larger the capacitance of the fifth capacitor C5, the more charges remained at the eighth node N8 in the previous frame period, and the more significant the difference in the luminance of the light-emitting device.

Figure 13C:
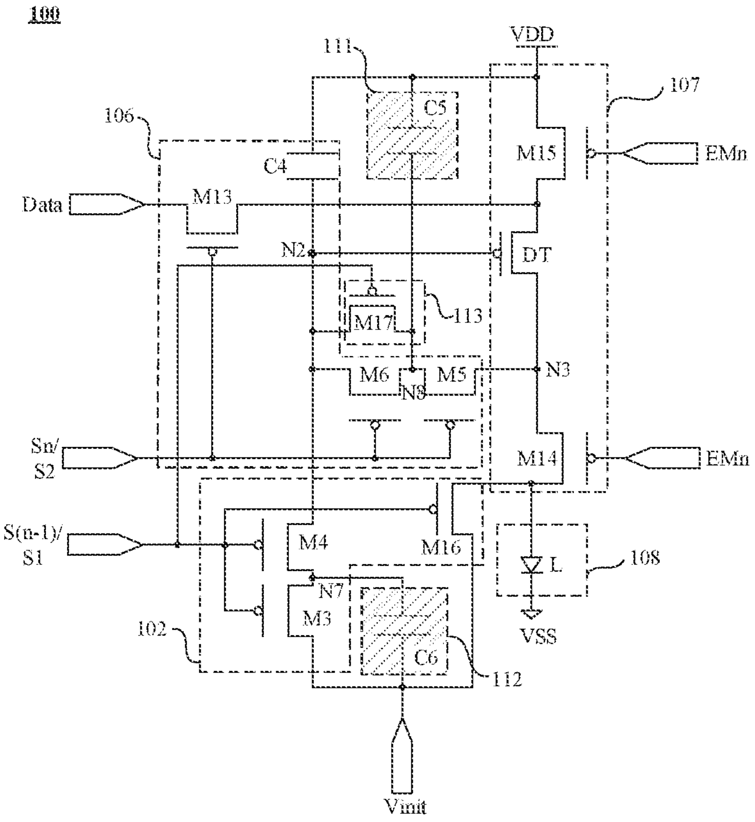

Based on this, as shown in FIG. 13C, in some embodiments, the pixel driving circuit 100 provided by the embodiments of the present disclosure further includes an accessory reset sub-circuit 113. The accessory reset sub-circuit 113 is coupled to the first scan timing signal terminal S1, the reset sub-circuit 102 and the first voltage stabilizing sub-circuit 111, and the accessory reset sub-circuit 113 is configured to: in the reset phase, transmit the initial signal vinit from the reset sub-circuit 102 to the first voltage stabilizing sub-circuit 111 in response to the first scan timing signal s1 from the first scan timing signal terminal S1, so as to reset the first voltage stabilizing sub-circuit 111.

In this way, in the reset phase, the initial signal vinit is transmitted to the first voltage stabilizing sub-circuit 111 by the accessory reset sub-circuit 113, so that the charges remained at the first voltage stabilizing sub-circuit 111 in the previous frame period may be cleared away by resetting the first voltage stabilizing sub-circuit 111, an influence of voltage information of the previous frame on the compensation signal of the present frame is avoided, and an accuracy of the compensation signal written in the present frame is ensured, and in turn, the luminance of the light-emitting device 108 is ensured to be normal.

In some embodiments, the accessory reset sub-circuit 113 includes a seventeenth transistor M17, and a control electrode of the seventeenth transistor M17 is coupled to the first scan timing signal terminal S1, a first electrode of the seventeenth transistor M17 is coupled to the reset sub-circuit 102, and a second electrode of the seventeenth transistor M17 is coupled to the first voltage stabilizing sub-circuit 111. For example, in a case where the reset sub-circuit 102 includes the reset transistor group, the first electrode of the seventeenth transistor M17 is coupled to the second electrode of the fourth transistor M4 in the reset transistor group, that is, the first electrode of the seventeenth transistor M17 is coupled to the second node N2. In a case where the first voltage stabilizing sub-circuit 111 includes the fifth capacitor C5, the second electrode of the seventeenth transistor M17 is coupled to the second terminal of the fifth capacitor C5, that is, the second electrode of the seventeenth transistor M17 is coupled to the eighth node N8.

The seventeenth transistor M17 is configured to be turned on under the control of the first scan timing signal to transmit the initial signal to the second terminal of the fifth capacitor C5, so as to reset the second terminal of the fifth capacitor C5.

Based on the structure of the pixel driving circuit 100 described in any one of the above embodiments, some embodiments of the present disclosure provide a driving method of the pixel driving circuit 100.

Figure 14:
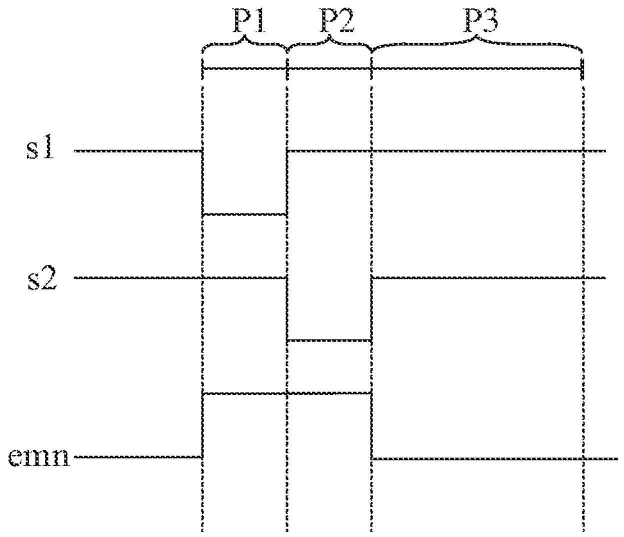
FIG. 14 is yet another timing diagram corresponding to a pixel driving circuit, in accordance with some embodiments.

As shown in FIGS. 13C and 14, in a case where a display substrate including the pixel driving circuit 100 needs to display an image, in a single frame period, the process of driving the pixel driving circuit 100 at least includes a reset phase P1, an input and compensation phase P2 and a light-emitting phase P3.

In the reset phase P1:

in response to the first scan timing signal s1 from the first scan timing signal terminal S1, the reset sub-circuit 102 transmits the initial signal vinit from the initial signal terminal Vinit to the data writing sub-circuit 106, the light-emitting device 108 and the second voltage stabilizing sub-circuit 112, respectively, so as to reset the data writing sub-circuit 106, the second voltage stabilizing sub-circuit 112 and the light-emitting device 108; and in response to the first scan timing signal s1, the accessory reset sub-circuit 113 transmits the initial signal vinit from the reset sub-circuit 102 to the first voltage stabilizing sub-circuit 111, so as to reset the first voltage stabilizing sub-circuit 111.

In the input and compensation phase P2:

in response to the second scan timing signal s2 from the second scan timing signal terminal S2, the data writing sub-circuit 106 stores the compensation signal, and writes the compensation signal into the first voltage stabilizing sub-circuit 111. The first voltage stabilizing sub-circuit 111 stores the compensation signal. Since the first voltage stabilizing sub-circuit 111 is reset in the reset phase, the compensation signal does not include the voltage information of the previous frame remained at the first voltage stabilizing sub-circuit 111.

In the light-emitting phase P3:

in response to the light-emitting timing signal emn provided by the light-emitting timing signal terminal EMn and the compensation signal stored in the data writing sub-circuit 106, the light-emitting control sub-circuit 107 is turned on to drive the light-emitting device 108 to emit light. The first voltage stabilizing sub-circuit 111 is discharged to continuously provide the compensation signal for the data writing sub-circuit 106, so that the voltage of the node (i.e., the eighth node N6) of the data writing sub-circuit 106 coupled to the first voltage stabilizing sub-circuit 111 is kept stable, and the current leakage of the data writing sub-circuit 106 is suppressed. The second voltage stabilizing sub-circuit 112 is discharged to continuously provide the initial signal vinit for the reset sub-circuit 102, so that the voltage of the node (i.e., the seventh node N7) of the reset sub-circuit 102 coupled to the second voltage stabilizing sub-circuit 112 is kept stable.

For example, a specific working process of the pixel driving circuit 100 shown in FIG. 14 will be described in detail with reference to FIG. 13C. In the following description, all transistors in the pixel driving circuit 100 are the P-type transistors, the first voltage signal vdd transmitted by the first voltage signal terminal VDD is a high-level signal, the second voltage signal vss transmitted by the second voltage signal terminal VSS is a low-level signal, and the initial signal vinit transmitted by the initial signal terminal Vinit is a low-level signal. It will be Understood by those skilled in the art that, in the pixel driving circuit 100, if a circuit between the first voltage signal terminal VDD and the second voltage signal terminal VSS is turned on, the light-emitting device 108 emits light.

For example, in the following description, "0" is represented as a low level, and "1" is represented as a high level.

In the reset phase P1, EM=1, S1=0, and S2=1.

The sixteenth transistor M16 is turned on to transmit the initial signal vinit from the initial signal terminal Vinit to the anode of the light-emitting device 108, so as to reset the light-emitting device 108.

The third transistor M3 and the fourth transistor M4 in the reset transistor group are both turned on, the third transistor M3 transmits the initial signal vinit from the initial signal terminal Vinit to the sixth capacitor C6 and the fourth transistor M4, and the fourth transistor M4 transmits the initial signal vinit to the second node N2 to reset the fourth capacitor C4. Therefore, the fourth capacitor C4 and the sixth capacitor C6 respectively store the initial signal vinit.

The seventeenth transistor M17 is turned on to transmit the initial signal vinit to the fifth capacitor C5 to reset the fifth capacitor C5, so that the fifth capacitor C5 stores the initial signal vinit.

Therefore, voltages of the second node N2, the seventh node N7 and the eighth node N8 are all reset voltages, which are related to the voltage of the initial signal vinit.

The fifth transistor M5, the sixth transistor M6, the thirteenth transistor M13, the fourteenth transistor M14, the fifteenth transistor M15 and the driving transistor DT are all turned off, and the light-emitting device 108 does not emit light.

In the input and compensation phase P2, EM=1, S1=1, and S2=0.

The fourth capacitor C4 is discharged (the voltage of the second node N2 is a voltage corresponding to the initial signal vinit stored in the fourth capacitor C4) to control the driving transistor DT to be turned on. The thirteenth transistor M13 is turned on under the control of the second scan timing signal s2. The fifth transistor M5 and the sixth transistor M6 in the compensation transistor group are both turned on under the control of the second scan timing signal s2. Thus, the compensation signal is written into both the fourth capacitor C4 and the fifth capacitor C5.

Here, the threshold voltage of the driving transistor DT is represented by $V_{th}$, and the voltage of the data signal data is represented by $V_{data}$; and due to actions of the data signal data from the data signal terminal Data and the threshold voltage of the driving transistor DT, a voltage of the compensation signal is ($V_{data}+V_{th}$). It will be understood that if the driving transistor DT is the P-type transistor, $V_{th}$ is a negative value.

The third transistor M3, the fourth transistor M4, the fourteenth transistor M14, the fifteenth transistor M15, the sixteenth transistor M16 and the seventeenth transistor M17 are all turned off, and the light-emitting device 108 does not emit light.

In the light-emitting phase P3, EM=0, S1=1, and S2=1.

The fifteenth transistor M15 and the fourteenth transistor M14 are both turned on under the control of the light-emitting timing signal emn. The first voltage signal vdd provided by the first voltage signal terminal VDD is transmitted to the first electrode of the driving transistor DT The fourth capacitor C4 is discharged, and the voltage of the second node N2 is ($V_{data}+V_{th}$), that is, a voltage of the control electrode of the driving transistor DT is ($V_{data}+V_{th}$).

By controlling the data signal data provided by the data signal terminal Data, the voltage of the control electrode of the driving transistor DT is less than a voltage of the first electrode thereof (that is, ($V_{data}+V_{th}$) is less than $V_{dd}$ ($V_{data}+V_{th}<V_{dd}$)), so that the driving transistor DT is controlled to be turned on, and generates the driving signal according to the first voltage signal vdd and output the driving signal.

In this case, the circuit between the first voltage signal terminal VDD and the second voltage signal terminal VSS is a turned on, so that the light-emitting device 108 emits light, and the sub-pixel driven by the pixel driving circuit 100 achieves a display function.

In addition, each transistor (the third transistor M3 and the fourth transistor M4) in the reset transistor group is turned off, and each transistor (the fifth transistor M5 and the sixth transistor M6) in the compensation transistor group is turned off. The fifth capacitor C5 is discharged, so that the voltage of the eighth node N8 is ($V_{data}+V_{th}$). A voltage difference between the source and the drain of the sixth transistor M6 coupled between the second node N2 and the eighth node N8 is 0, so that the sixth transistor MG does not leak current. In this way, the current leakage of the second node N2 through the compensation transistor group is suppressed, so that the voltage of the second node N2 is able to be kept stable, to control the driving transistor DT stably. As a result, the driving signal generated by the driving transistor DT is ensured to be stable, so that the light-emitting device 108 is able to continuously emit light with uniform luminance.

Figure 15:
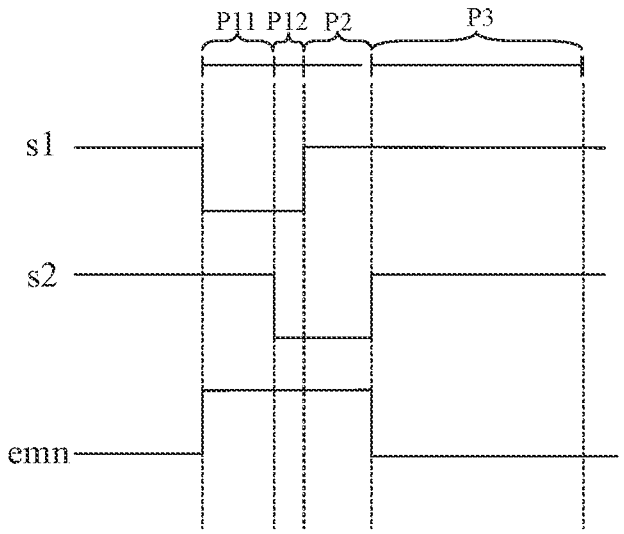
FIG. 15 is yet another timing diagram corresponding to a pixel driving circuit, in accordance with some embodiments.

In some other embodiments, based on the pixel driving circuit as shown in FIG. 13B, in order to solve a problem that the second terminal of the fifth capacitor C5 cannot be reset, the embodiments of the present disclosure provide a new driving timing of the pixel driving circuit, as shown in FIG. 15, a time of the first scan timing signal s1 at a low level overlaps a time of the second scan timing signal s2 at a low level with a set time Δt, and during the set time Δt, the pixel driving circuit 100 simultaneously performs the resetting and the data writing, so as to achieve the resetting of the second terminal of the fifth capacitor C5 (i.e., the eighth node N8).

In order to avoid that the reset process occupies too much time of the data writing process during the set time Δt to affect the writing of normal data signal, the set time Δt should be set as small as possible. For example, the set time Δt is in a range from 0.5 μs to 1 μs, so as to achieve the rapidly resetting of the second terminal of the fifth capacitor C5.

Thus, as shown in FIGS. 13C and 15, in the frame period, the pixel driving method of the pixel driving circuit 100 includes a first reset phase P11, a second reset phase P12, an input and compensation phase P2 and a light-emitting phase P3.

In the first reset phase P11:

in response to the first scan timing signal s1 from the first scan timing signal terminal S1, the reset sub-circuit 102 transmits the initial signal vinit from the initial signal terminal Vinit to the data writing sub-circuit 106, the light-emitting device 108 and the second voltage stabilizing sub-circuit 112, respectively, so as to reset the data writing sub-circuit 106, the second voltage stabilizing sub-circuit 112 and the light-emitting device 108.

In the second reset phase P12:

in response to the first scan timing signal s1, the reset sub-circuit 102 continuously resets the data writing sub-circuit 106, the second voltage stabilizing sub-circuit 112 and the light-emitting device 108; and in response to the second scan timing signal s2 from the second scan timing signal terminal S2, the data writing sub-circuit 106 transmits the initial signal vinit to the first voltage stabilizing sub-circuit 111, so as to reset the first voltage stabilizing sub-circuit 111.

In the input and compensation phase P2:

in response to the second scan timing signal s2, the data writing sub-circuit 106 stores the compensation signal and writes the compensation signal into the first voltage stabilizing sub-circuit 111. The first voltage stabilizing sub-circuit 111 stores the compensation signal. Since the first voltage stabilizing sub-circuit 111 is reset in the second reset phase P12, the compensation signal does not include the voltage information of the previous frame remained at the first voltage stabilizing sub-circuit 111.

In the light-emitting phase P3:

in response to the light-emitting timing signal emn provided by the light-emitting timing signal terminal EMn and the compensation signal stored in the data writing sub-circuit 106, the light-emitting control sub-circuit 107 is turned on to drive the light-emitting device 108 to emit light. The first voltage stabilizing sub-circuit 111 is discharged to continuously provide the compensation signal for the data writing sub-circuit 106, so that the voltage of the node (i.e., the eighth node N8) of the data writing sub-circuit 106 coupled to the first voltage stabilizing sub-circuit 111 is kept stable, and the current leakage of the data writing sub-circuit 10 is suppressed. The second voltage stabilizing sub-circuit 112 is discharged to continuously provide the initial signal vinit for the reset sub-circuit 102, so that the voltage of the node (i.e., the seventh node N7) of the reset sub-circuit 102 coupled to the second voltage stabilizing sub-circuit 112 is kept stable.

For example, a specific working process of the pixel driving circuit 100 shown in FIG. 13C will be described in detail with reference to FIG. 15. In the following description, all transistors in the pixel driving circuit 100 are the P-type transistors, the first voltage signal vdd transmitted by the first voltage signal terminal VDD is the high level signal, the second voltage signal vss transmitted by the second voltage signal terminal VSS is the low level signal, and the initial signal vinit transmitted by the initial signal terminal Vinit is the low level signal. It will be understood by those skilled in the art that, in the pixel driving circuit 100, if the circuit between the first voltage signal terminal VDD and the second voltage signal terminal VSS is turned on, the light-emitting device 108 emits light.

For example, in the following description, "0" is represented as the low level, and "1" is represented as the high level.

In the first reset phase P11, EM=1, S1=0, and S2=1.

The sixteenth transistor M16 is turned on to transmit the initial signal vinit from the initial signal terminal Vinit to the anode of the light-emitting device 108, so as to reset the light-emitting device 108.

The third transistor M3 and the fourth transistor M4 in the reset transistor group are both turned on, the third transistor M3 transmits the initial signal vinit from the initial signal terminal Vinit to the sixth capacitor C6 and the fourth transistor M4, and the fourth transistor M4 transmits the initial signal vinit to the second node N2, so that the fourth capacitor C4 is reset. Thus, the fourth capacitor C4 and the sixth capacitor C6 respectively store the initial signal vinit.

Therefore, voltages of the second node N2 and the seventh node N7 are both the reset voltages, which are related to the voltage of the initial signal vinit.

The fifth transistor M5, the sixth transistor M6, the thirteenth transistor M13, the fourteenth transistor M14, the fifteenth transistor M15 and the driving transistor DT are all turned off, and the light-emitting device 108 does not emit light.

In the second reset phase P12, EM=1, S1=0, and S2=0.

The sixteenth transistor M16 is turned on to continuously transmit the initial signal vinit to the anode of the light-emitting device 108, so as to reset the light-emitting device 108.

The third transistor M3 and the fourth transistor M4 in the reset transistor group are both turned on, the third transistor M3 continuously transmits the initial signal vinit from the initial signal terminal Vinit to the sixth capacitor C6 and the fourth transistor M4, and the fourth transistor M4 transmits the initial signal vinit to the second node N2, so that the fourth capacitor C4 is reset. Thus, the fourth capacitor C4 and the sixth capacitor C6 respectively store the initial signal vinit.

The sixth transistor M6 is turned on to transmit the initial signal vinit to the fifth capacitor C5 to reset the fifth capacitor C5.

Therefore, the voltages of the second node N2, the seventh node N7 and the eighth node N8 are all the reset voltages, which are related to the voltage of the initial signal vinit.

It will be noted that, in this phase, the fifth transistor M5 and the thirteenth transistor M13 are both turned on, and the driving transistor DT is turned on under the control of the voltage of the second node N2, so that the data signal data received at the data signal terminal Data is supposed to be transmitted to the eighth node N8 and the second node N2 to achieve the writing of the compensation signal. However, in this phase, since the initial signal vinit is continuously written into the fourth capacitor C4 and the fifth capacitor C5 to achieve the reset, the writing of the compensation signal is unable to be achieved even if the fifth transistor M5, the thirteenth transistor M13 and the driving transistor DT are all turned on, which is equivalent to a case where paths are formed between the eighth node N8 and the initial signal terminal Vinit and between the second node N2 and the initial signal terminal Vinit, so that the compensation signal transmitted to the eighth node N8 and the second node N2 is reset.

The fourteenth transistor M14 and the fifteenth transistor M15 are turned off, and the light-emitting device 108 does not emit light.

In the input and compensation phase P2, EM=1, S1=1, and S2=0.

The fourth capacitor C4 is discharged (the voltage of the second node N2 is the voltage corresponding to the initial signal vinit stored in the fourth capacitor C4) to control the driving transistor DT to be turned on. The thirteenth transistor M13 is turned on under the control of the second scan timing signal s2. The fifth transistor M5 and the sixth transistor M6 in the compensation transistor group are both turned on under the control of the second scan timing signal s2. Thus, the compensation signal is written into both the fourth capacitor C4 and the fifth capacitor C5.

Here, the threshold voltage of the driving transistor DT is represented by $V_{th}$, and the voltage of the data signal data is represented by $V_{data}$; and due to the actions of the data signal data from the data signal terminal Data and the threshold voltage of the driving transistor DT, the voltage of the compensation signal is $(V_{data}+V_{th})$. It will be understood that if the driving transistor DT is the P-type transistor, $V_{th}$ is the negative value.

The third transistor M3, the fourth transistor M4, the fourteenth transistor M14, the fifteenth transistor M15, the sixteenth transistor M16 and the seventeenth transistor M17 are all turned off, and the light-emitting device 108 does not emit light.

In the light-emitting phase P3, EM=0, S1=1, and S2=1.

The fifteenth transistor M15 and the fourteenth transistor M14 are both turned on under the control of the light-emitting timing signal emn. The first voltage signal vdd provided by the first voltage signal terminal VDD is transmitted to the first electrode of the driving transistor DT. The fourth capacitor C4 is discharged, and the voltage of the second node N2 is $(V_{data}+V_{th})$, that is, the voltage of the control electrode of the driving transistor DT is $(V_{data}+V_{th})$.

By controlling the data signal data provided by the data signal terminal Data, the voltage of the control electrode of the driving transistor DT is less than the voltage of the first electrode thereof (that is, $(V_{data}+V_{th})$ is less than $V_{dd}$ $(V_{data}+V_{th}<V_{dd})$), so that the driving transistor DT is controlled to be turned on, and generates the driving signal according to the first voltage signal vdd and output the driving signal.

In this case, the circuit between the first voltage signal terminal VDD and the second voltage signal terminal VSS is turned on, so that the light-emitting device 108 emits light, and the sub-pixel driven by the pixel driving circuit 100 achieves the display function.

In addition, each transistor in the reset transistor group is turned off, and each transistor in the compensation transistor group is turned off. The fifth capacitor C5 is discharged, so that the voltage of the eighth node N8 is $(V_{data}+V_{th})$. The voltage difference between the source and the drain of the sixth transistor M6 coupled between the second node N2 and the eighth node N8 is zero or close to zero, so that the sixth transistor M6 does not leak current. In this way, the current leakage of the second node N2 through the compensation transistor group is suppressed, so that the voltage of the second node N2 is able to be kept stable to control the driving transistor DT stably. As a result, the driving signal generated by the driving transistor DT is ensured to be stable, so that the light-emitting device 108 is able to continuously emit light with uniform luminance.

It will be noted that in the embodiments of the present disclosure, specific implementation manners of the energy storage sub-circuit 101, the reset sub-circuit 102, the compensation sub-circuit 103, the driving sub-circuit 104, the data writing sub-circuit 106, the reference voltage sub-circuit 105, the light-emitting control sub-circuit 107 and the current leakage suppression sub-circuit 109 are not limited to the manners described above, and may employ any implementation manner, such as conventional connection methods well known to those skilled in the art, as long as corresponding functions can be guaranteed to be achieved. The above examples are not intended to limit the protection scope of the present disclosure. In practical applications, those skilled in the art may choose to use or not to use one or more of the above circuits according to the situations, and variations based on various combinations of the above circuits do not depart from the principle of the present disclosure, which will not be described in detail herein.

The transistors used in the pixel driving circuit provided by the embodiments of the present disclosure may be thin film transistors, field effect transistors or other switching devices with the same characteristics, and the embodiments of the present disclosure are described by taking the thin film transistors as an example.

In some embodiments, a control electrode of each transistor used in the pixel driving circuit is a gate of the transistor, a first electrode of the transistor is one of a source and a drain of the transistor, and a second electrode of the transistor is the other of the source and the drain of the transistor. Since a source and a drain of a transistor may be symmetrical in structure, the source and the drain thereof may be indistinguishable in structure. That is, the first electrode and the second electrode of the transistor in the embodiments of the present disclosure may be indistinguishable in structure. For example, in a case where the transistor is the P-type transistor, the first electrode of the transistor is the source, and the second electrode of the transistor is the drain. For example, in a case where the transistor is the N-type transistor, the first electrode of the transistor is the drain, and the second electrode of the transistor is the source.

In addition, in the pixel driving circuit provided by the embodiments of the present disclosure, the transistors are all described by taking an example in which the first transistor M1 is the N-type transistor, the eleventh transistor M11 is the N-type transistor, and other transistors except the first transistor M1 and the eleventh transistor M11 are the P-type transistors, and it will be noted that the embodiments of the present disclosure include but are not limited thereto. For example, one or more transistors in circuits provided by the embodiments of the present disclosure may be N-type transistors, and it is only necessary to connect each electrode of a transistor in a selected type with reference to each electrode of a corresponding transistor in the embodiments of the present disclosure and make a corresponding voltage terminal provide a corresponding high voltage or low voltage.

In the embodiments of the present disclosure, the capacitor may be a capacitor device separately manufactured by a process. For example, the capacitor device is achieved by manufacturing special capacitor electrodes, and each capacitor electrode of the capacitor may be achieved by a metal layer, a semiconductor layer (e.g., doped polysilicon), etc. Alternatively, the capacitor may be a parasitic capacitance between transistors, or may be achieved by the transistors themselves and other devices and wirings, or may be achieved by a parasitic capacitance between wirings of circuits themselves. Optionally, capacitance values of the first capacitor C1, the second capacitor C2, the third capacitor C3 and the fifth capacitor C5 may be equal to or different from a capacitance value of the fourth capacitor C4. The capacitance values of the first capacitor C1, the second capacitor C2, the third capacitor C3 and the fifth capacitor C5 in various embodiments are set to significantly suppress the current leakage of the second node.

In the circuits provided by the embodiments of the present disclosure, the first node N1, the second node N2, the third node N3, the fourth node N4, the fifth node N5, the sixth node N6, the seventh node N7 and the eighth node N8 do not represent actual existing components, but represents junction points of relevant electrical connections in circuit diagrams. That is, these nodes are nodes equivalent to the junction points of the relevant electrical connections in the circuit diagrams.

Some embodiments of the present disclosure provide the display panel 01, as described above, as shown in FIG. 1, the display panel 01 includes the plurality of sub-pixels 10, the plurality of scan timing signal lines GL, the plurality of light-emitting timing signal lines EL and the plurality of data signal lines DL. The pixel driving circuit 100 as provided by the embodiments of the present disclosure is disposed in a sub-pixel 10.

Figure 16:
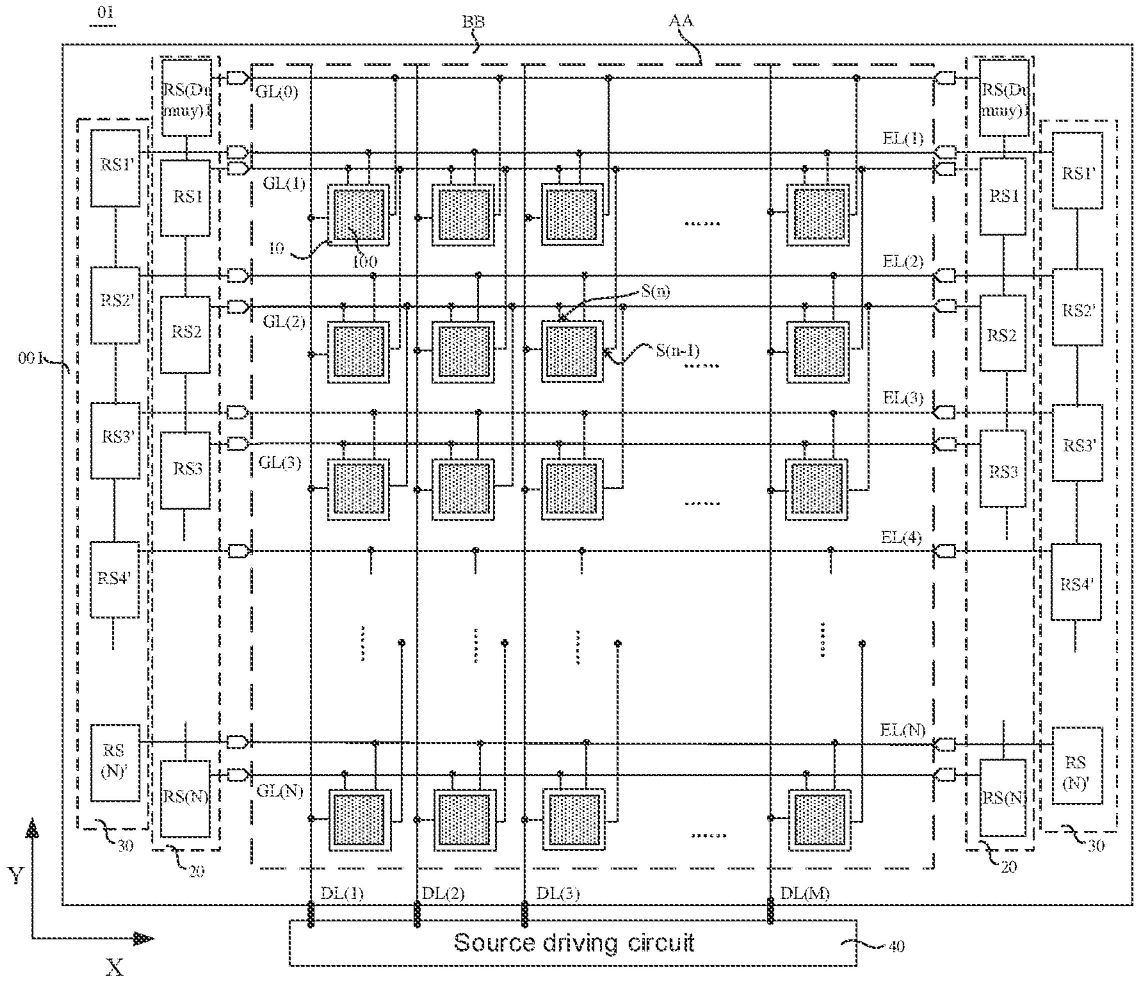
FIG. 16 is a structural diagram of another display panel, in accordance with some embodiments of the present disclosure.

For example, as shown in FIG. 16, the plurality of sub-pixels 10 are arranged in N rows and M columns. There are N scan timing signal lines GL, which are represented by GL(1) to GL(N), respectively. There are N light-emitting timing signal lines EL, which are represented by EL(1) to EL(N), respectively. There are M data signal lines DL, which are represented by D(1) to D(M), respectively. N and M are each a positive integer.

Light-emitting timing signal terminals EMn of all pixel driving circuits 100 included in an n-th row of sub-pixels 10 are coupled to an n-th light-emitting timing signal line EL(n). For example, light-emitting timing signal terminals EM2 of all pixel driving circuits 100 included in a second row of sub-pixels 10 are coupled to a second light-emitting timing signal line EL(2). n is greater than or equal to 1, and n is less than or equal to N (1≤n≤N).

As shown in FIG. 16, second scan timing signal terminals Sn (i.e., S2) of all pixel driving circuits 100 included in the n-th row of sub-pixels 10 are coupled to an n-th scan timing signal line GL(n). Except a first row of sub-pixels, first scan timing signal terminals S(n−1) (i.e., S1) of all pixel driving circuits included in the n-th row of sub-pixels are coupled to a (n−1)-th scan timing signal line. For example, first scan timing signal terminals S(n−1) of all pixel driving circuits 100 included in the second row of sub-pixels 10 are coupled to a first scan timing signal line GL(1), and second scan timing signal terminals Sn thereof are coupled to a second scan timing signal line GL(2). n is greater than or equal to 1, and n is less than or equal to N (1≤n≤N).

Figure 17:
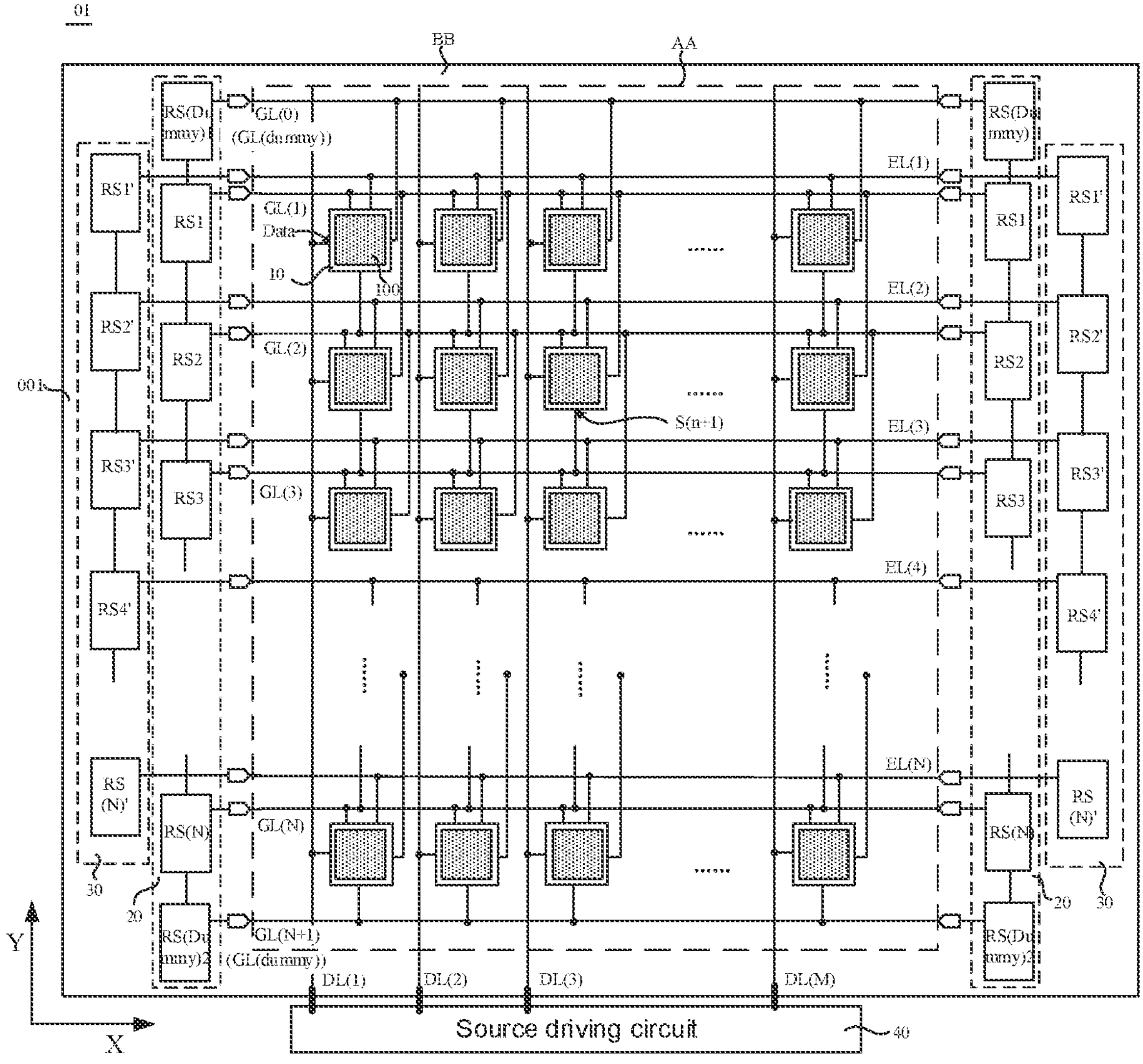
FIG. 17 is a structural diagram of yet another display panel, in accordance with some embodiments of the present disclosure.

As shown in FIG. 17, in a case where the current leakage suppression sub-circuit 109 in the pixel driving circuit 100 is further coupled to the third scan timing signal terminal S(n+1) (i.e., S3), except a last row of sub-pixels, third scan timing signal terminals S(n+1) of all pixel driving circuits included in the n-th row of sub-pixels are coupled to a (n+1)-th scan timing signal line. For example, third scan timing signal terminals S(n+1) of all pixel driving circuits 100 included in the second row of sub-pixels 10 are coupled to a third scan timing signal line GL(3). n is greater than or equal to 1, and n is less than or equal to N (1≤n≤N).

In some embodiments, the display panel 01 further includes at least one row of dummy cells disposed before the first row of sub-pixels and at least one row of dummy cells disposed after the last row of sub-pixels (an N-th row of sub-pixels). The at least one row of dummy cells has the same structure as the sub-pixels described above, but has no corresponding display function when the display panel performs display. Due to process problems and circuit parasitic parameters, in a case where there is no the at least one row of dummy cells, in N rows of sub-pixels actually used for display, there are differences in electrical characteristics of pixel driving circuits 100 in edge sub-pixels (the first row of sub-pixels and the N-th row of sub-pixels) and electrical characteristics of pixel driving circuits 100 in inner sub-pixels, so that the display effect of the edge sub-pixels is different from the display effect of the inner sub-pixels. By providing the at least one row of dummy cells, the at least one row of dummy cells serve as an edge row of sub-pixels, so that differences between the edge sub-pixels and the inner sub-pixels in the N rows of sub-pixels actually used for display may be avoided, thereby ensuring normal display.

Thus, corresponding to the at least one row of dummy cells, the display panel 01 further includes corresponding dummy lines in addition to the N scan timing signal lines GL(1) to GL(N) and the N light-emitting timing signal lines EL(1) to EL(N). For example, the display panel 01 further includes a dummy scan timing signal line GL(dummy) and a dummy light-emitting timing signal line EL(dummy). For example, as shown in FIG. 17, the display panel further includes a dummy scan timing signal line GL(dummy) disposed before the first scan timing signal line GL(1) (for example, may be referred to as a 0-th scan timing signal line GL(0)), and a dummy scan timing signal line GL(dummy) disposed after an N-th scan timing signal line GL(N) (for example, may be referred to as a (N+1)-th scan timing signal line GL(N+1)).

In this way, first scan timing signal terminals S(n−1) of all pixel driving circuits 100 included in the first row of sub-pixels 10 are coupled to the 0-th scan timing signal line GL(0). The 0-th scan timing signal line GL(0) is configured to transmit the first scan timing signal s1 to the first scan timing signal terminals S(n−1) of all pixel driving circuits 100 included in the first row of sub-pixels 10.

Third scan timing signal terminals S(n+1) of all pixel driving circuits 100 included in the N-th row of sub-pixels 10 are coupled to the (N+1)-th scan timing signal line GL(N+1). The (N+1)-th scan timing signal line GL(N+1) is configured to transmit the third scan timing signal s3 to third scan timing signal terminals S(n+1) of all pixel driving circuits 100 included in the N row of sub-pixels 10.

As shown in FIG. 17, for example, data signal terminals Data of all pixel driving circuits 100 included in an m-th column of sub-pixels 10 are coupled to an m-th data signal line. For example, data signal terminals Data of all pixel driving circuits 100 included in a first column of sub-pixels 10 are coupled to a first data signal line DL(1), and data signal terminals Data of all pixel driving circuits 100 included in an M-th column of sub-pixels 10 are coupled to an M-th data signal line DL(M).

In this way, the scan timing signal line GL provides the scan timing signals for the first scan timing signal terminal S(n−1), the second scan timing signal terminal Sn and the third scan timing signal terminal S(n+1). The light-emitting timing signal line EL provides the light-emitting timing signal for the light-emitting timing signal terminal EMn, and the data signal line DL provides the data signal data for the data signal terminal Data.

It will be noted that an arrangement of a plurality of signal lines included in the display panel 01 described above, and wiring diagrams of the display panel 01 shown in FIGS. 16 and 17 are merely examples and do not limit the structure of the display panel 01.

In addition, the display panel 01 further includes other signal lines such as a plurality of reference voltage signal lines, a plurality of initial signal lines and a plurality of first voltage signal lines, and the present disclosure does not limit wiring methods thereof.

In some embodiments, as shown in FIGS. 16 and 17, the display panel 01 further includes gate driving circuits 20 and light-emitting driving circuits 30 that are disposed in the peripheral area BB. In some embodiments, the gate driving circuits 20 and the light-emitting driving circuits 30 may be disposed on sides in an extending direction of the scan timing signal line L.

It will be understood that the display apparatus further includes a source driving circuit 40, the source driving circuit 40 is bonded to the display panel, and is configured to provide the data signal for each data signal line DL.

In some examples, the gate driving circuits 20 may be gate driving integrated circuits (ICs), and the light-emitting driving circuits 30 may be light-emitting driving ICs.

In some other examples, the gate driving circuits 20 may be gate driver on array (GOA) circuits, and the light-emitting driving circuits 30 may be an emitter on array (EOA) circuits. That is, the gate driving circuits 20 and the light-emitting driving circuits 30 are directly integrated in an array substrate of the display panel 01. Thus, the costs of manufacturing the display panel may be reduced; furthermore, a bezel of the display apparatus may be narrowed. Hereinafter, an example is described in which the gate driving circuits 20 are the GOA circuits and the light-emitting driving circuits 30 may be the EOA circuits.

It will be noted that, in some examples, the gate driving circuit 20 and the light-emitting driving circuit 30 are provided on a single side of the peripheral area BB of the display panel 01, and all scan timing signal lines GL and all light-emitting timing signal lines EL are driven row by row from the single side by the gate driving circuit 20 and the light-emitting driving circuit 30, respectively, which is a single-side driving manner.

In some other examples, as shown in FIG. 17, the gate driving circuits 20 are provided on both sides in the horizontal direction X in the peripheral area BB of the display panel 01 respectively, and all scan timing signal lines GL are sequentially driven row by row from both sides simultaneously by the two gate driving circuits 20; the light-emitting driving circuit 30 is provided on both sides in the horizontal direction X, and all light-emitting timing signal lines EL are sequentially driven row by row from both sides simultaneously by two light-emitting driving circuits 30 respectively, which is a double-side driving manner.

The gate driving circuit 20 is configured to provide the scan timing signals. For example, the gate driving circuit 20 includes N cascaded shift registers (RS1, RS2, . . . , RS(N)), and the N cascaded shift registers (RS1, RS2, . . . , RS(N)) are respectively coupled to the N scan timing signal lines GL(1) to GL(N) to output corresponding scan timing signal to the respective scan timing signal line.

In a case where the display panel further includes the 0-th scan timing signal line GL(0) and the (N+1)th scan timing signal line GL(N+1), the gate driving circuit 20 further includes a first dummy shift register RS(Dummy) 1 and a second dummy shift register RS(Dummy) 2, the first dummy shift register RS(Dummy) 1 is coupled to a first shift register RS1 and the 0-th scan timing signal line GL(0), and the second dummy shift register RS(Dummy) 2 is coupled to an N-th shift register RSN and the (N+1)-th scan timing signal line GL(N+1). That is, the gate driving circuit 20 includes (N+2) cascaded shift registers to output the respective scan timing signals to the scan timing signal lines GL.

The light-emitting driving circuit 30 is configured to provide the light-emitting timing signals. For example, the light-emitting driving circuits 30 includes N cascaded shift registers (RS1', RS2', . . . , RS(N)'), and the N cascaded shift registers (RS1', RS2', . . . , RS(N)') are respectively coupled to the N light-emitting timing signal lines EL(1) to EL(N).

In some examples, the number of shift registers included in the light-emitting driving circuit 30 is less than the number of N light-emitting timing signal lines, and a shift register has at least two output terminals that are configured to output the respective light-emitting signals to at least two light-emitting timing signal lines. For example, the light-emitting driving circuit 30 includes N/2 cascaded shift registers (RS1', RS2', . . . , RS(N/2)'), and a shift register is coupled to two light-emitting timing signal lines EL.

In some embodiments, corresponding to the pixel driving circuit 100 that is shown in FIG. 135B and a corresponding driving timing diagram shown in FIG. 15 that are provided by the present disclosure, in the display panel provided by the embodiments of the present disclosure, the gate driving circuit uses a manner of respectively driving odd rows and even rows. For example, in N shift registers (RS1, RS2, . . . , RS(N)) included in the gate driving circuit 20, odd numbered shift registers (RS1, RS3, RS5, . . . ) are an odd group of shift registers, and the shift registers in the odd group of shift registers are cascaded in sequence; even numbered shift registers (RS2, RS4, RS6, . . . ) are an even group of shift registers, and the shift registers in the even group of shift registers are cascaded in sequence; the N shift registers (RS1, RS2, . . . , RS(N)) are respectively coupled to the N scan timing signal lines GL(1) to GL(N) to output the respective scan timing signals to the scan timing signal lines.

The odd group of shift registers and the even group of shift registers are respectively controlled by two sets of clock signals, and a phase difference of the two sets of clock signals is the set time Δt. For example, the odd group of shift registers are controlled by a first clock signal and a second clock signal, the even group of shift registers are controlled by a third clock signal and a fourth clock signal; a phase difference of the first clock signal and the third clock signal is the set time Δt, and a phase difference of the second clock signal CLK2 and the fourth clock signal CLK4 is the set time Δt. By setting in this way, it may be ensured that a gate scan timing signal output by the gate driving circuit satisfies the form shown in FIG. 15, that is, times of two gate scan timing signals, output by two adjacent shift registers, at a low level overlap with the set time Δt.

since the pixel driving circuit 100 provided by the embodiments of the present disclosure is able to improve the voltage holding rate of the fourth capacitor 104 so as to improve a stability of the luminance of the light-emitting device 108 and ensure the uniformity of the luminance of all light-emitting devices 108; thus, the display effect of the display panel 01 is good, and the display panel 01 has effects of low flickering in visual sense and uniform display luminance.

Figure 18:
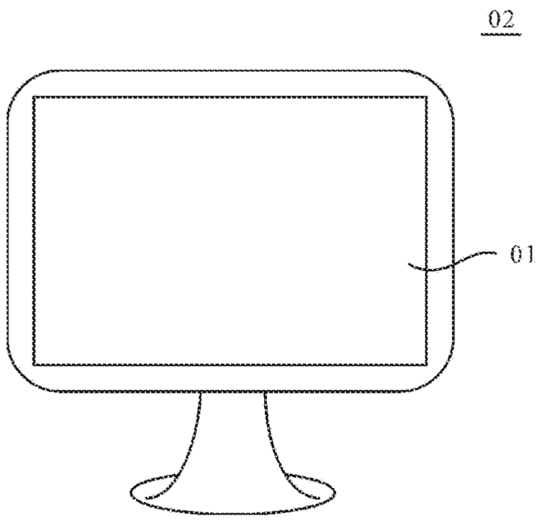
FIG. 18 is a structural diagram of a display apparatus, in accordance with some embodiments of the present disclosure.

Some embodiments of the present disclosure provide a display apparatus 02, as shown in FIG. 18, the display apparatus includes the display panel 01.

In some examples, the display apparatus further includes a frame, a circuit board, a display driver IC and other electronic accessories, and the display panel 01 is disposed in the frame.

The display apparatus provided by the embodiments of the present disclosure may be any apparatus that displays an image whether in motion (e.g., a video) or stationary (e.g., a still image), and whether textual or graphical. More specifically, it is anticipated that the embodiments may be implemented in a variety of electronic apparatuses or associated with a variety of electronic apparatuses. The variety of electronic apparatuses include (but are not limited to), for example, mobile phones, wireless apparatuses, personal data assistants (PDAs), hand-held or portable computers, OPS receivers/navigators, cameras, MP4 video players, video cameras, game consoles, watches, clocks, calculators, television monitors, flat panel displays, computer monitors, automobile displays (e.g., odometer displays), navigators, cockpit controllers and/or displays, displays of camera views (e.g., displays of rear-view cameras in vehicles), electronic photos, electronic billboards or signs, projectors, building structures, packaging and aesthetic structures (e.g., displays for displaying an image of a piece of jewelry).

The display apparatus provided by the embodiments of the present disclosure has the same beneficial effects as the display panel, and the beneficial effects will not be described in detail here.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel driving circuit, comprising: an energy storage sub-circuit, a reset sub-circuit, a compensation sub-circuit, a driving sub-circuit and a current leakage suppression sub-circuit; wherein the energy storage sub-circuit is coupled to a first node and a second node;

the reset sub-circuit is coupled to the second node, a first scan timing signal terminal and an initial signal terminal;

the compensation sub-circuit is coupled to the second node, a third node and a second scan timing signal terminal;

the driving sub-circuit is coupled to the second node, the third node and a first voltage signal terminal;

the current leakage suppression sub-circuit is coupled to the energy storage sub-circuit, the reset sub-circuit and the compensation sub-circuit;

the reset sub-circuit is configured to transmit, in response to a first scan timing signal received at the first scan timing signal terminal, an initial signal received at the initial signal terminal to the second node to reset the second node;

the compensation sub-circuit is configured to cause the driving sub-circuit to be in a self-saturation state in response to a second scan timing signal received at the second scan timing signal terminal;

the driving sub-circuit is configured to: be in the self-saturation state due to at least an action of the compensation sub-circuit; generate a compensation signal according to a first voltage signal received at the first voltage signal terminal; and transmit the compensation signal to the second node;

the energy storage sub-circuit is configured to: be charged due to actions of voltages of the first node and the second node; couple the voltage of the second node according to the voltage of the first node; and maintain a coupled voltage of the second node;

the driving sub-circuit is further configured to: generate a driving signal due to a coupling action of the energy storage sub-circuit; and transmit the driving signal to the third node;

the current leakage suppression sub-circuit is configured to suppress current leakage of the energy storage sub-circuit in a process of generating and transmitting the driving signal by the driving sub-circuit; and the pixel driving circuit further including: a reference voltage sub-circuit, a data writing sub-circuit and a light-emitting control sub-circuit; wherein the reference voltage sub-circuit is coupled to the first node, the first scan timing signal terminal and a reference voltage signal terminal, or the reference voltage sub-circuit is coupled to the first node, the second scan timing signal terminal and the reference voltage signal terminal;

the reference voltage sub-circuit is configured to transmit a reference voltage signal received at the reference voltage signal terminal to the first node in response to the first scan timing signal or the second scan timing signal;

the data writing sub-circuit is coupled to the first node, the second scan timing signal terminal and a data signal terminal; the data writing sub-circuit is configured to transmit a data signal received at the data signal terminal to the first node in response to the second scan timing signal;

the light-emitting control sub-circuit is coupled to the third node and a light-emitting timing signal terminal, and is configure to be coupled to a light-emitting device; the light-emitting control sub-circuit is configured to transmit the driving signal from the driving sub-circuit to the light-emitting device in response to a light-emitting timing signal received at the light-emitting timing signal terminal, so as to drive the light-emitting device to emit light.

2. The pixel driving circuit according to claim 1, wherein the current leakage suppression sub-circuit is coupled to the second node, so that the current leakage suppression sub-circuit is coupled to the energy storage sub-circuit through the second node;

the current leakage suppression sub-circuit is further coupled to a fourth node and the light-emitting timing signal terminal;

the compensation sub-circuit is coupled to the fourth node, so that the compensation sub-circuit is coupled to the second node through the fourth node and the current leakage suppression sub-circuit;

the reset sub-circuit is coupled to the fourth node, so that the reset sub-circuit is coupled to the second node through the fourth node and the current leakage suppression sub-circuit;

the current leakage suppression sub-circuit is configured to be turned off under control of the light-emitting timing signal to suppress the current leakage of the energy storage sub-circuit; and is further configured to: transmit the initial signal from the reset sub-circuit to the second node in response to the light-emitting timing signal; be turned on under control of the light-emitting timing signal; and cause the driving sub-circuit to be in the self-saturation state due to a combined action of the current leakage suppression sub-circuit and the compensation sub-circuit that is in an on state.

3. The pixel driving circuit according to claim 2, wherein the reset sub-circuit, the compensation sub-circuit, the driving sub-circuit and the current leakage suppression sub-circuit each include at least one transistor;

transistors included in the reset sub-circuit, the compensation sub-circuit and the driving sub-circuit are low temperature poly-silicon thin film transistors;

a transistor included in the current leakage suppression sub-circuit is an oxide-thin film transistor or an amorphous silicon thin film transistor; and on/off types of the transistors included in the reset sub-circuit, the compensation sub-circuit and the driving sub-circuit are each opposite to an on/off type of the transistor included in the current leakage suppression sub-circuit.

4. The pixel driving circuit according to claim 3, wherein the current leakage suppression sub-circuit includes a first transistor;

a control electrode of the first transistor is coupled to the light-emitting timing signal terminal, a first electrode of the first transistor is coupled to the fourth node, and a second electrode of the first transistor is coupled to the second node.

5. The pixel driving circuit according to claim 2, further comprising: an accessory current leakage suppression sub-circuit;

the accessory current leakage suppression sub-circuit is coupled to the first node and the fourth node; the accessory current leakage suppression sub-circuit is configured to: be charged due to actions of voltages of the first node and the fourth node; couple, according to the voltage of the first node, the voltage of the fourth node to keep the voltage of the fourth node equal to the voltage of the second node; and maintain a coupled voltage of the fourth node to suppress an current leakage of the second node.

6. The pixel driving circuit according to claim 5, wherein the accessory current leakage suppression sub-circuit includes a first capacitor; a first terminal of the first capacitor is coupled to the first node, and a second terminal of the first capacitor is coupled to the fourth node.

7. The pixel driving circuit according to claim 1, wherein the current leakage suppression sub-circuit is coupled to the first node, so that the current leakage suppression sub-circuit is coupled to the energy storage sub-circuit through the first node;

the reset sub-circuit and the compensation sub-circuit are both directly coupled to the second node;

the current leakage suppression sub-circuit, the compensation sub-circuit and the reset sub-circuit are further coupled to a fifth node;

the current leakage suppression sub-circuit is configured to: be charged due to actions of voltages of the first node and the fifth node; couple, according to the voltage of the first node, the voltage of the fifth node to keep the voltage of the fifth node equal to the voltage of the second node; and maintain a coupled voltage of the fifth node to suppress an current leakage of the second node.

8. The pixel driving circuit according to claim 7, wherein the current leakage suppression sub-circuit includes a second capacitor; a first terminal of the second capacitor is coupled to the first node, and a second terminal of the second capacitor is coupled to the fifth node.

9. The pixel driving circuit according to claim 1, wherein the current leakage suppression sub-circuit is coupled to the second node, so that the current leakage suppression sub-circuit is coupled to the energy storage sub-circuit through the second node;

the reset sub-circuit and the compensation sub-circuit are both directly coupled to the second node;

the current leakage suppression sub-circuit, the compensation sub-circuit and the reset sub-circuit are further coupled to a sixth node;

the current leakage suppression sub-circuit is further coupled to a third scan timing signal terminal and a constant voltage signal terminal; the constant voltage signal terminal is configured to provide a constant voltage signal;

the current leakage suppression sub-circuit is configured to: be charged due to actions of voltages of the sixth node and a constant voltage signal from the constant voltage signal terminal; and keep the voltage of the sixth node equal to the voltage of the second node in response to a third scanning timing signal received at the third scanning timing signal terminal, so as to suppress current leakage of the second node.

10. The pixel driving circuit according to claim 9, wherein the current leakage suppression sub-circuit includes a third capacitor and a second transistor;

a first terminal of the third capacitor is coupled to the constant voltage signal terminal, and a second terminal of the third capacitor is coupled to the sixth node;

a control electrode of the second transistor is coupled to the third scan timing signal terminal, a first electrode of the second transistor is coupled to the second node, and a second electrode of the second transistor is coupled to the sixth node.

11. The pixel driving circuit according to claim 1, wherein the reset sub-circuit includes a third transistor and a fourth transistor connected in series;

a control electrode of the third transistor is coupled to the first scan timing signal terminal, a first electrode of the third transistor is coupled to the initial signal terminal, a second electrode of the third transistor is coupled to a first electrode of the fourth transistor, a control electrode of the fourth transistor is coupled to the first scan timing signal terminal, and a second electrode of the fourth transistor is coupled to the second node; and the compensation sub-circuit includes a fifth transistor and a sixth transistor connected in series;

a control electrode of the fifth transistor is coupled to the second scan timing signal terminal, a first electrode of the fifth transistor is coupled to the third node, a second electrode of the fifth transistor is coupled to a first electrode of the sixth transistor, a control electrode of the sixth transistor is coupled to the second scan timing signal terminal, and a second electrode of the sixth transistor is coupled to the second node.

12. The pixel driving circuit according to claim 11, wherein the current leakage suppression sub-circuit is further coupled to the second node and the light-emitting timing signal terminal, and the current leakage suppression sub-circuit, the compensation sub-circuit and the reset sub-circuit are all coupled to the fourth node, wherein the second electrode of the fourth transistor is coupled to the fourth node, so that the fourth transistor is coupled to the second node via the fourth node and the current leakage suppression sub-circuit; the second electrode of the sixth transistor is coupled to the fourth node, so that the sixth transistor is coupled to the second node via the fourth node and the current leakage suppression sub-circuit; or the current leakage suppression sub-circuit is coupled to the first node, the reset sub-circuit and the compensation sub-circuit are both directly coupled to the second node, and the current leakage suppression sub-circuit, the compensation sub-circuit and the reset sub-circuit are all coupled to a fifth node, wherein the first electrode of the fourth transistor is further coupled to the fifth node; the first electrode of the sixth transistor is further coupled to the fifth node; or the current leakage suppression sub-circuit is coupled to the second node, a third scan timing signal terminal and a constant voltage signal terminal, the reset sub-circuit and the compensation sub-circuit are both directly coupled to the second node, and the current leakage suppression sub-circuit, the compensation sub-circuit and the reset sub-circuit are further coupled to a sixth node, wherein the first electrode of the fourth transistor is further coupled to the sixth node; the first electrode of the sixth transistor is further coupled to the sixth node.

13. The pixel driving circuit according to claim 1, wherein in a case where the reference voltage sub-circuit is coupled to the first scan timing signal terminal, the reference voltage sub-circuit is further coupled to the light-emitting timing signal terminal;

the reference voltage sub-circuit is further configured to transmit the reference voltage signal to the first node in response to the light-emitting timing signal; and the reference voltage sub-circuit includes a ninth transistor and a tenth transistor; a control electrode of the ninth transistor is coupled to the first scan timing signal terminal, a first electrode of the ninth transistor is coupled to the reference voltage signal terminal, and a second electrode of the ninth transistor is coupled to the first node; a control electrode of the tenth transistor is coupled to the light-emitting timing signal terminal, a first electrode of the tenth transistor is coupled to the reference voltage signal terminal, and a second electrode of the tenth transistor is coupled to the first node;

in a case where the reference voltage sub-circuit is coupled to the second scan timing signal terminal, the reference voltage sub-circuit includes an eleventh transistor; a control electrode of the eleventh transistor is coupled to the second scan timing signal terminal, a first electrode of the eleventh transistor is coupled to the reference voltage signal terminal, and a second electrode of the eleventh transistor is coupled to the first node;

the reset sub-circuit, the compensation sub-circuit, the driving sub-circuit, the data writing sub-circuit and the light-emitting control sub-circuit each include at least one transistor; and on/off types of transistors included in the reset sub-circuit, the compensation sub-circuit, the driving sub-circuit, the data writing sub-circuit and the light-emitting control sub-circuit are each opposite to an on/off type of the eleventh transistor.

14. The pixel driving circuit according to claim 1, further comprising: an accessory current leakage suppression sub-circuit; wherein the current leakage suppression sub-circuit includes a first transistor, the first transistor is an oxide-thin film transistor or an amorphous silicon thin film transistor; the energy storage sub-circuit includes a fourth capacitor; the driving sub-circuit includes a twelfth transistor; the data writing sub-circuit includes a thirteenth transistor; the light-emitting control sub-circuit includes a fourteenth transistor; the reset sub-circuit includes a third transistor and a fourth transistor connected in series, or the reset sub-circuit includes a seventh transistor; the compensation sub-circuit includes a fifth transistor and a sixth transistor connected in series, or the compensation sub-circuit includes an eighth transistor; the reference voltage sub-circuit includes a ninth transistor and a tenth transistor, or the reference voltage sub-circuit includes an eleventh transistor; the accessory current leakage suppression sub-circuit includes a first capacitor;

a control electrode of the first transistor is coupled to a light-emitting timing signal terminal, a first electrode of the first transistor is coupled to a fourth node, and a second electrode of the first transistor is coupled to the second node;

a first terminal of the fourth capacitor is coupled to the first node, and a second terminal of the fourth capacitor is coupled to the second node;

a control electrode of the twelfth transistor is coupled to the second node, a first electrode of the twelfth transistor is coupled to the first voltage signal terminal, and a second electrode of the twelfth transistor is coupled to the third node;

a control electrode of the thirteenth transistor is coupled to the second scan timing signal terminal, a first electrode of the thirteenth transistor is coupled to a data signal terminal, and a second electrode of the thirteenth transistor is coupled to the first node;

a control electrode of the fourteenth transistor is coupled to the light-emitting timing signal terminal, a first electrode of the fourteenth transistor is coupled to the third node, and a second electrode of the fourteenth transistor is configured to be coupled to a light-emitting device;

in a case where the reset sub-circuit includes the third transistor and the fourth transistor connected in series, a control electrode of the third transistor is coupled to the first scan timing signal terminal, a first electrode of the third transistor is coupled to the initial signal terminal, a second electrode of the third transistor is coupled to a first electrode of the fourth transistor, a control electrode of the fourth transistor is coupled to the first scan timing signal terminal, and a second electrode of the fourth transistor is coupled to the fourth node;

in a case where the reset sub-circuit includes the seventh transistor; a control electrode of the seventh transistor is coupled to the first scan timing signal terminal, a first electrode of the seventh transistor is coupled to the initial signal terminal, and a second electrode of the seventh transistor is coupled to the fourth node;

in a case where the compensation sub-circuit includes the fifth transistor and the sixth transistor connected in series, a control electrode of the fifth transistor is coupled to the second scan timing signal terminal, a first electrode of the fifth transistor is coupled to the third node, a second electrode of the fifth transistor is coupled to a first electrode of the sixth transistor, a control electrode of the sixth transistor is coupled to the second scan timing signal terminal, and a second electrode of the sixth transistor is coupled to the fourth node;

in a case where the compensation sub-circuit includes the eighth transistor, a control electrode of the eighth transistor is coupled to the second scan timing signal terminal, a first electrode of the eighth transistor is coupled to the third node, and a second electrode of the eighth transistor is coupled to the fourth node;

in a case where the reference voltage sub-circuit includes the ninth transistor and the tenth transistor, a control electrode of the ninth transistor is coupled to the first scan timing signal terminal, a first electrode of the ninth transistor is coupled to a reference voltage signal terminal, and a second electrode of the ninth transistor is coupled to the first node; a control electrode of the tenth transistor is coupled to the light-emitting timing signal terminal, a first electrode of the tenth transistor is coupled to the reference voltage signal terminal, and a second electrode of the tenth transistor is coupled to the first node;

in a case where the reference voltage sub-circuit includes the eleventh transistor, a control electrode of the eleventh transistor is coupled to the first scan timing signal terminal, a first electrode of the eleventh transistor is coupled to the reference voltage signal terminal, and a second electrode of the eleventh transistor is coupled to the first node; an on/off type of the eleventh transistor is the same as an on/off type of the first transistor, and the on/off type of the first transistor is opposite to on/off types of transistors except the first transistor and the eleventh transistor in the pixel driving circuit;

a first terminal of the first capacitor is coupled to the first node, and a second terminal of the first capacitor is coupled to the fourth node.

15. The pixel driving circuit according to claim 1, wherein the current leakage suppression sub-circuit includes a second capacitor; the energy storage sub-circuit includes a fourth capacitor; the driving sub-circuit includes a twelfth transistor; the data writing sub-circuit includes a thirteenth transistor; the light-emitting control sub-circuit includes a fourteenth transistor; the reset sub-circuit includes a third transistor and a fourth transistor connected in series; the compensation sub-circuit includes a fifth transistor and a sixth transistor connected in series; the reference voltage sub-circuit includes a ninth transistor and a tenth transistor, or the reference voltage sub-circuit includes an eleventh transistor;

a first terminal of the second capacitor is coupled to the first node, and a second terminal of the second capacitor is coupled to a fifth node;

a first terminal of the fourth capacitor is coupled to the first node, and a second terminal of the fourth capacitor is coupled to the second node;

a control electrode of the twelfth transistor is coupled to the second node, a first electrode of the twelfth transistor is coupled to the first voltage signal terminal, and a second electrode of the twelfth transistor is coupled to the third node;

a control electrode of the thirteenth transistor is coupled to the second scan timing signal terminal, a first electrode of the thirteenth transistor is coupled to a data signal terminal, and a second electrode of the thirteenth transistor is coupled to the first node;

a control electrode of the fourteenth transistor is coupled to a light-emitting timing signal terminal, a first electrode of the fourteenth transistor is coupled to the third node, and a second electrode of the fourteenth transistor is configured to be coupled to a light-emitting device;

a control electrode of the third transistor is coupled to the first scan timing signal terminal, a first electrode of the third transistor is coupled to the initial signal terminal, a second electrode of the third transistor is coupled to a first electrode of the fourth transistor, a control electrode of the fourth transistor is coupled to the first scan timing signal terminal, and a second electrode of the fourth transistor is coupled to the second node; the first electrode of the fourth transistor is further coupled to the fifth node;

a control electrode of the fifth transistor is coupled to the second scan timing signal terminal, a first electrode of the fifth transistor is coupled to the third node, a second electrode of the fifth transistor is coupled to a first electrode of the sixth transistor, a control electrode of the sixth transistor is coupled to the second scan timing signal terminal, and a second electrode of the sixth transistor is coupled to the second node; the first electrode of the sixth transistor is further coupled to the fifth node;

in a case where the reference voltage sub-circuit includes the ninth transistor and the tenth transistor, a control electrode of the ninth transistor is coupled to the first scan timing signal terminal, a first electrode of the ninth transistor is coupled to a reference voltage signal terminal, and a second electrode of the ninth transistor is coupled to the first node; a control electrode of the tenth transistor is coupled to the light-emitting timing signal terminal, a first electrode of the tenth transistor is coupled to the reference voltage signal terminal, and a second electrode of the tenth transistor is coupled to the first node;

in a case where the reference voltage sub-circuit includes the eleventh transistor, a control electrode of the eleventh transistor is coupled to the second scan timing signal terminal, a first electrode of the eleventh transistor is coupled to the reference voltage signal terminal, and a second electrode of the eleventh transistor is coupled to the first node; an on/off type of the eleventh transistor is opposite to on/off types of transistors except the eleventh transistor in the pixel driving circuit.

16. The pixel driving circuit according to claim 1, wherein the current leakage suppression sub-circuit includes a third capacitor and a second transistor; the energy storage sub-circuit includes a fourth capacitor; the driving sub-circuit includes a twelfth transistor; the data writing sub-circuit includes a thirteenth transistor; the light-emitting control sub-circuit includes a fourteenth transistor; the reset sub-circuit includes a third transistor and a fourth transistor connected in series; the compensation sub-circuit includes a fifth transistor and a sixth transistor connected in series; the reference voltage sub-circuit includes a ninth transistor and a tenth transistor, or the reference voltage sub-circuit includes an eleventh transistor;

a first terminal of the third capacitor is coupled to a constant voltage signal terminal, and a second terminal of the third capacitor is coupled to a sixth node;

a control electrode of the second transistor is coupled to a third scan timing signal terminal, a first electrode of the second transistor is coupled to the second node, and a second electrode of the second transistor is coupled to the sixth node;

a first terminal of the fourth capacitor is coupled to the first node, and a second terminal of the fourth capacitor is coupled to the second node;

a control electrode of the twelfth transistor is coupled to the second node, a first electrode of the twelfth transistor is coupled to the first voltage signal terminal, and a second electrode of the twelfth transistor is coupled to the third node;

a control electrode of the thirteenth transistor is coupled to the second scan timing signal terminal, a first electrode of the thirteenth transistor is coupled to a data signal terminal, and a second electrode of the thirteenth transistor is coupled to the first node;

a control electrode of the fourteenth transistor is coupled to a light-emitting timing signal terminal, a first electrode of the fourteenth transistor is coupled to the third node, and a second electrode of the fourteenth transistor is configure to be coupled to a light-emitting device;

a control electrode of the third transistor is coupled to the first scan timing signal terminal, a first electrode of the third transistor is coupled to the initial signal terminal, a second electrode of the third transistor is coupled to a first electrode of the fourth transistor, a control electrode of the fourth transistor is coupled to the first scan timing signal terminal, and a second electrode of the fourth transistor is coupled to the second node; the first electrode of the fourth transistor is further coupled to the sixth node;

a control electrode of the fifth transistor is coupled to the second scan timing signal terminal, a first electrode of the fifth transistor is coupled to the third node, a second electrode of the fifth transistor is coupled to a first electrode of the sixth transistor, a control electrode of the sixth transistor is coupled to the second scan timing signal terminal, and a second electrode of the sixth transistor is coupled to the second node; the first electrode of the sixth transistor is further coupled to the sixth node;

in a case where the reference voltage sub-circuit includes the ninth transistor and the tenth transistor, a control electrode of the ninth transistor is coupled to the first scan timing signal terminal, a first electrode of the ninth transistor is coupled to a reference voltage signal terminal, and a second electrode of the ninth transistor is coupled to the first node; a control electrode of the tenth transistor is coupled to the light-emitting timing signal terminal, a first electrode of the tenth transistor is coupled to the reference voltage signal terminal, and a second electrode of the tenth transistor is coupled to the first node;

in a case where the reference voltage sub-circuit includes the eleventh transistor, a control electrode of the eleventh transistor is coupled to the second scan timing signal terminal, a first electrode of the eleventh transistor is coupled to the reference voltage signal terminal, and a second electrode of the eleventh transistor is coupled to the first node; an on/off type of the eleventh transistor is opposite to on/off types of transistors except the eleventh transistor in the pixel driving circuit.

17. A pixel driving method, applied to the pixel driving circuit according to claim 1; wherein the pixel driving circuit includes the energy storage sub-circuit, the reset sub-circuit, the compensation sub-circuit, a light-emitting control sub-circuit, the driving sub-circuit, a data writing sub-circuit, a reference voltage sub-circuit and the current leakage suppression sub-circuit; the data writing sub-circuit is coupled to the first node, the second scan timing signal terminal and a data signal terminal; the light-emitting control sub-circuit is coupled to the third node and a light-emitting timing signal terminal and is configure to be coupled to a light-emitting device; the reference voltage sub-circuit is coupled to the first node, the first scan timing signal terminal and a reference voltage signal terminal, or the reference voltage sub-circuit is coupled to the first node, the second scan timing signal terminal and the reference voltage signal terminal;

the pixel driving method comprises a frame period including a reset phase, an input and compensation phase and a light-emitting phase; wherein in the reset phase:

the reference voltage sub-circuit transmits a reference voltage signal received at the reference voltage signal terminal to the first node in response to the first scan timing signal received at the first scan timing signal terminal or the second scan timing signal received at the second scan timing signal terminal; and the reset sub-circuit transmits, in response to the first scan timing signal, the initial signal received at the initial signal terminal to the second node to reset the second node;

in the input and compensation phase:

the data writing sub-circuit transmits a data signal received at the data signal terminal to the first node in response to the second scan timing signal;

the compensation sub-circuit causes the driving sub-circuit to be in the self-saturation state under control of the second scan timing signal;

the driving sub-circuit is in the self-saturation state due to at least the action of the compensation sub-circuit, generates the compensation signal according to the first voltage signal received at the first voltage signal terminal, and transmits the compensation signal to the second node; and the energy storage sub-circuit is charged due to the actions of the voltages of the first node and the second node;

in the light-emitting phase:

the reference voltage sub-circuit transmits the reference voltage signal to the first node;

the energy storage sub-circuit couples the voltage of the second node according to the voltage of the first node, and maintains the coupled voltage of the second node;

the driving sub-circuit generates the driving signal due to the coupling action of the energy storage sub-circuit, and transmits the driving signal to the third node;

the light-emitting control sub-circuit transmits the driving signal from the driving sub-circuit to the light-emitting device in response to a light-emitting timing signal, so as to drive the light-emitting device to emit light; and the current leakage suppression sub-circuit suppresses the current leakage of the energy storage sub-circuit.

18. A display panel, comprising a plurality of pixel driving circuits according to claim 1.

19. A display apparatus, comprising the display panel according to claim 18.

* * * * *